(12) United States Patent
Filler et al.

(10) Patent No.: US 11,741,733 B2
(45) Date of Patent: Aug. 29, 2023

(54) ARRANGEMENTS FOR DIGITAL MARKING AND READING OF ITEMS, USEFUL IN RECYCLING

(71) Applicant: Digimarc Corporation, Beaverton, OR (US)

(72) Inventors: Tomas Filler, Beaverton, OR (US); Ravi K. Sharma, Portland, OR (US); Tony F. Rodriguez, Portland, OR (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 110 days.

(21) Appl. No.: 17/214,455

(22) Filed: Mar. 26, 2021

(65) Prior Publication Data

US 2021/0299706 A1 Sep. 30, 2021

Related U.S. Application Data

(60) Provisional application No. 63/146,631, filed on Feb. 6, 2021, provisional application No. 63/093,207, filed on
(Continued)

(51) Int. Cl.
*G06T 7/90* (2017.01)
*G06V 30/224* (2022.01)
(Continued)

(52) U.S. Cl.
CPC .......... *G06V 30/224* (2022.01); *B07C 5/3416* (2013.01); *B07C 5/3422* (2013.01);
(Continued)

(58) Field of Classification Search
CPC ............... B07C 5/3422; B07C 5/3416; B07C 2501/0054; B65G 47/493; G05B 13/027;
(Continued)

(56) References Cited

U.S. PATENT DOCUMENTS

| 5,314,072 A | * | 5/1994 | Frankel | ................... B07C 5/365 |
| | | | | 209/580 |
| 6,882,738 B2 | | 4/2005 | Davis | |

(Continued)

FOREIGN PATENT DOCUMENTS

| EP | 3838427 | 6/2021 |
| EP | 3865222 | 8/2021 |

(Continued)

OTHER PUBLICATIONS

Kosior et al., End Markets for Recycled Detectable Black PET Plastics, Research Project IMT003-002, Waste and Resources Action Programme (WRAP), 36 pp., Jul. 2013.

(Continued)

*Primary Examiner* — Ali Bayat
(74) *Attorney, Agent, or Firm* — Digimarc Corporation

(57) ABSTRACT

Images depicting items in a waste flow on a conveyor belt are provided to two analysis systems. The first system processes images to decode digital watermark payload data found on certain of the items (e.g., plastic containers). This payload data is used to look up corresponding attribute metadata for the items in a database, such as the type of plastic in each item, and whether the item was used as a food container or not. The second analysis system can be a spectroscopy system that determines the type of plastic in each item by its absorption characteristics. When the two systems conflict in identifying the plastic type, a sorting logic processor applies a rule set to arbitrate the conflict and determine which plastic type is most likely. The item is then sorted into one of several different bins depending on a combination of the final plastic identification, and whether the item was used as a food container or not. A variety of other features and arrangements are also detailed.

10 Claims, 21 Drawing Sheets

Related U.S. Application Data on Oct. 17, 2020, provisional application No. 63/011,195, filed on Apr. 16, 2020, provisional application No. 63/000,471, filed on Mar. 26, 2020.

(51) Int. Cl.

| | |
|---|---|
| *B07C 5/34* | (2006.01) |
| *B07C 5/342* | (2006.01) |
| *B65G 47/49* | (2006.01) |
| *G05B 13/02* | (2006.01) |
| *G06T 1/00* | (2006.01) |
| *G06T 7/00* | (2017.01) |
| *H04N 7/18* | (2006.01) |
| *G06F 18/21* | (2023.01) |
| *G06F 18/24* | (2023.01) |
| *H04N 23/56* | (2023.01) |
| *H04N 23/73* | (2023.01) |
| *G06V 10/80* | (2022.01) |
| *G06V 10/82* | (2022.01) |
| *G06V 10/44* | (2022.01) |
| *G06V 10/58* | (2022.01) |

(52) U.S. Cl.
CPC ......... *B65G 47/493* (2013.01); *G05B 13/027* (2013.01); *G06F 18/21* (2023.01); *G06F 18/24* (2023.01); *G06T 1/0014* (2013.01); *G06T 1/0021* (2013.01); *G06T 7/0004* (2013.01); *G06T 7/90* (2017.01); *G06V 10/454* (2022.01); *G06V 10/811* (2022.01); *G06V 10/82* (2022.01); *H04N 7/18* (2013.01); *H04N 23/56* (2023.01); *H04N 23/73* (2023.01); *B07C 2501/0054* (2013.01); *G06T 2207/10024* (2013.01); *G06T 2207/10048* (2013.01); *G06T 2207/20084* (2013.01); *G06T 2207/30108* (2013.01); *G06V 10/58* (2022.01)

(58) Field of Classification Search
CPC .. G06K 9/6217; G06K 9/6267; G06K 9/6293; G06T 1/0014; G06T 1/0021; G06T 7/0004; G06T 7/90; G06T 2207/10024; G06T 2207/10048; G06T 2207/20084; G06T 2207/30108; H04N 5/2256; H04N 5/2353; H04N 7/18; G06V 10/454; G06V 10/811; G06V 10/82; G06V 10/58; G06V 2201/06; G06V 30/224

USPC .......................................................... 382/153
See application file for complete search history.

(56) References Cited

U.S. PATENT DOCUMENTS

| | | | |
|---|---|---|---|
| 2011/0034176 A1* | 2/2011 | Lord ...................... | G06V 10/96 348/241 |
| 2011/0244919 A1* | 10/2011 | Aller ...................... | G06Q 30/06 382/165 |
| 2013/0048722 A1* | 2/2013 | Davis ................... | G07G 1/0036 235/383 |
| 2014/0043421 A1 | 2/2014 | Lindner | |
| 2019/0306385 A1 | 10/2019 | Sharma | |
| 2021/0229133 A1* | 7/2021 | Kumar ...................... | B07C 5/34 |
| 2021/0346916 A1* | 11/2021 | Kumar ...................... | B07C 5/34 |
| 2022/0004832 A1 | 1/2022 | Doheny, II | |
| 2022/0339673 A1 | 10/2022 | Jochen | |

FOREIGN PATENT DOCUMENTS

| | | |
|---|---|---|
| WO | 19043231 | 3/2019 |
| WO | 2020186234 | 9/2020 |
| WO | 2022185340 | 9/2022 |

OTHER PUBLICATIONS

Black Plastics: A Farewell Tour or is There Life After Death, PackagingInsights.com, 2 pp., Mar. 26, 2019.

Invisible Markers to Boost Plastics Recycling Quality, Lavels & Labeling, Feb. 24, 2016.

Paben, Stakeholders Advance Project to Coordinate Marker Technologies, Plastics Recycling Update, Resource Recycling, Inc., 2 pp., Jun. 15, 2018.

* cited by examiner

FIG. 14
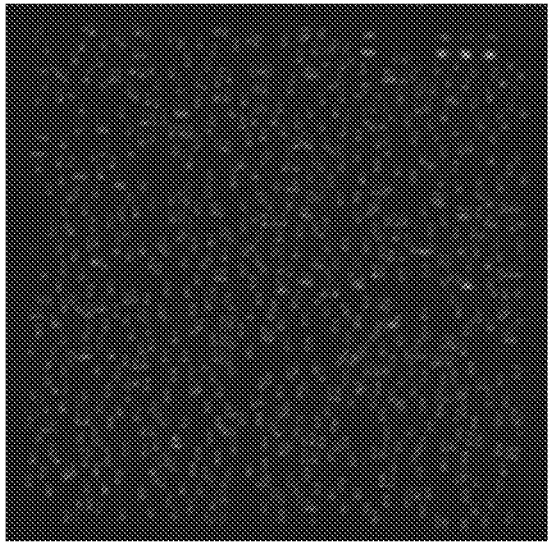
FIG. 15
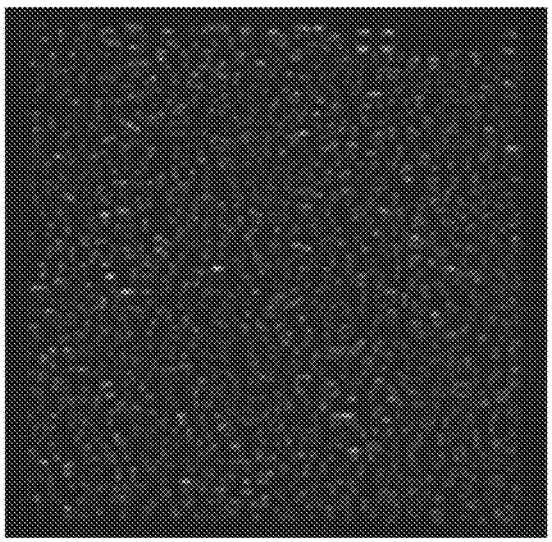
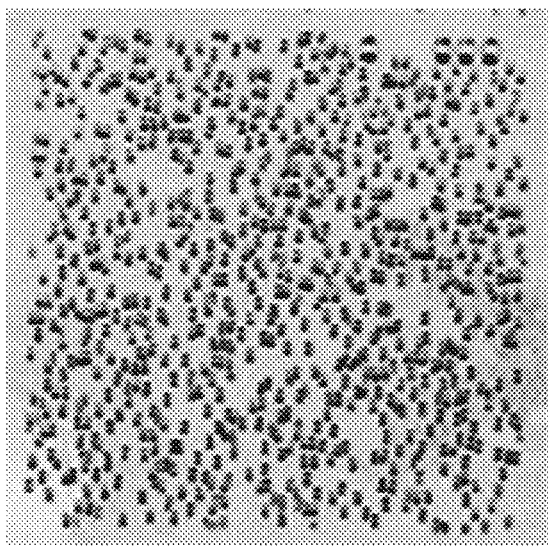
FIG. 14A
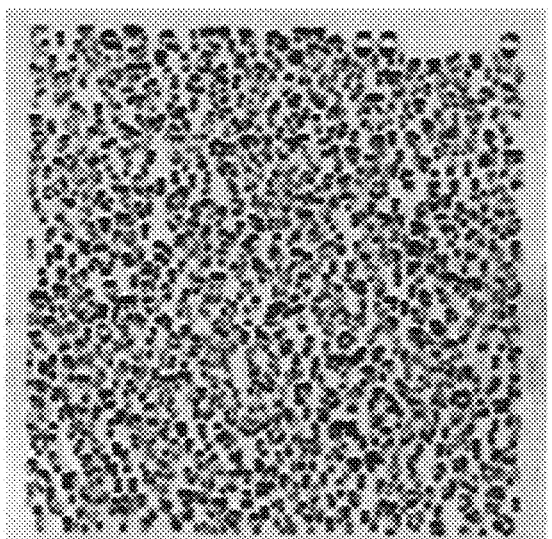
FIG. 15A

ARRANGEMENTS FOR DIGITAL MARKING AND READING OF ITEMS, USEFUL IN RECYCLING

RELATED APPLICATION DATA

This application claims priority to provisional applications 63/146,631, filed Feb. 6, 2021, 63/093,207, filed Oct. 17, 2020, 63/011,195, filed Apr. 16, 2020, and 63/000,471, filed Mar. 26, 2020.

The subject matter of this application expands on that of application Ser. No. 16/435,292, filed Jun. 7, 2019 (published as 20190306385), which claims priority to provisional applications 62/854,754, filed May 30, 2019, 62/845,230, filed May 8, 2019, 62/836,326, filed Apr. 19, 2019, 62/830,318, filed Apr. 5, 2019, 62/818,051, filed Mar. 13, 2019, 62/814,567, filed Mar. 6, 2019, and 62/812,711, filed Mar. 1, 2019. Application Ser. No. 16/435,292 is also a continuation-in-part of application Ser. No. 15/823,138, filed Nov. 27, 2017 (published as 20180338068), which is a continuation of application Ser. No. 14/611,515, filed Feb. 2, 2015 (published as 20150302543), which claims priority to provisional application 61/934,425, filed Jan. 31, 2014.

The subject matter of this application also expands on that of application PCT/US20/22801, filed Mar. 13, 2020 (published as WO2020186234), which claims priority to applications 62/968,106, filed Jan. 30, 2020, 62/967,557, filed Jan. 29, 2020, 62/956,493, filed Jan. 2, 2020, and 62/923,274, filed Oct. 18, 2019.

The subject matter of this application is also related to that of application Ser. No. 16/944,136, filed Jul. 30, 2020.

The disclosures of the above applications are incorporated herein by reference.

BACKGROUND AND INTRODUCTION

Applicant's patent publications US20190306385 and WO2020186234 detail novel recycling methods and systems to help recover, by recycling or re-use, some of the millions of tons of consumer plastic that are presently lost each year to landfills or incinerators. Disclosed in those documents are improved ways of marking plastic items to facilitate their recognition, and improved methods for processing such items in materials recovery facilities. Various digital watermarking technologies and improvements are particularly detailed.

The present specification builds on the teachings in those publications. The reader is presumed to be familiar with that work.

In one illustrative aspect, the technology involves a waste recovery facility in which items are transported for sorting on a conveyor belt. One or more cameras capture images of items on the belt. The images are provided to two analysis systems. The first analysis system processes imagery to decode digital watermark payload data found on certain of the items (e.g., plastic containers). This payload data is used to look up corresponding attribute metadata for the items in a database, such as the type of plastic in each item, and whether the item was used as a food container or not.

The second analysis system can be a spectroscopy system that determines the type of plastic in each item by its absorption characteristics. Sometimes the type of plastic identified by the second analysis system conflicts with the type of plastic identified by the first analysis system. In such case a sorting logic processor applies a rule set to arbitrate the conflict and determine which plastic type is most likely. The item is then sorted into one of several different bins depending on a combination of (a) the final plastic identification, and (b) whether the item was used as a food container or not.

In another embodiment the second analysis system is a convolutional neural network trained to classify items in the imagery by their apparent degree of contamination (e.g., external soiling or residual contents within). Items are then sorted into different bins depending on (a) the plastic identification as determined by the first analysis system, and (b) the contamination state (e.g., clean or dirty) as determined by the second analysis system.

In a variant embodiment the convolutional neural network is trained to distinguish plastic bottles with caps from plastic bottles without caps. Again, items are sorted into different bins based on data from both of the analysis systems, with capped bottles of a first plastic type being sorted into one bin, and uncapped plastic bottles of that first plastic type being sorted into a different bin.

The foregoing and a great number of other features and aspects of the present technology will be more readily apparent from the following detailed description, which proceeds with reference to the accompanying drawings.

BRIEF DESCRIPTION OF THE DRAWINGS

FIG. 14 shows an excerpt of one thermoformed signal pattern.

FIG. 14A is a variant of FIG. 14.

FIG. 15 shows an excerpt of a different thermoformed signal pattern.

FIG. 15A is a variant of FIG. 15.

DETAILED DESCRIPTION

There is a critical need for high-reliability identification of plastic items, e.g., for sorting waste streams. Digital watermarks are suited to this task.

Digital watermarks provide 2D optical code signals that enable machine vision in waste sorting systems to determine the types of material (e.g., variety of plastic) in each object. Encoded identification signals imparted into and onto containers (e.g., via printed labels, textured molds, laser engraving of plastic, etc.) can be sensed and used to control sorting based on container material and other factors. Since digital watermark signals can be spread over a container and/or its labels in ways that provide identification even when the object is damaged, soiled or partially occluded, the technology is particularly advantageous for waste sorting purposes.

Figure 1:
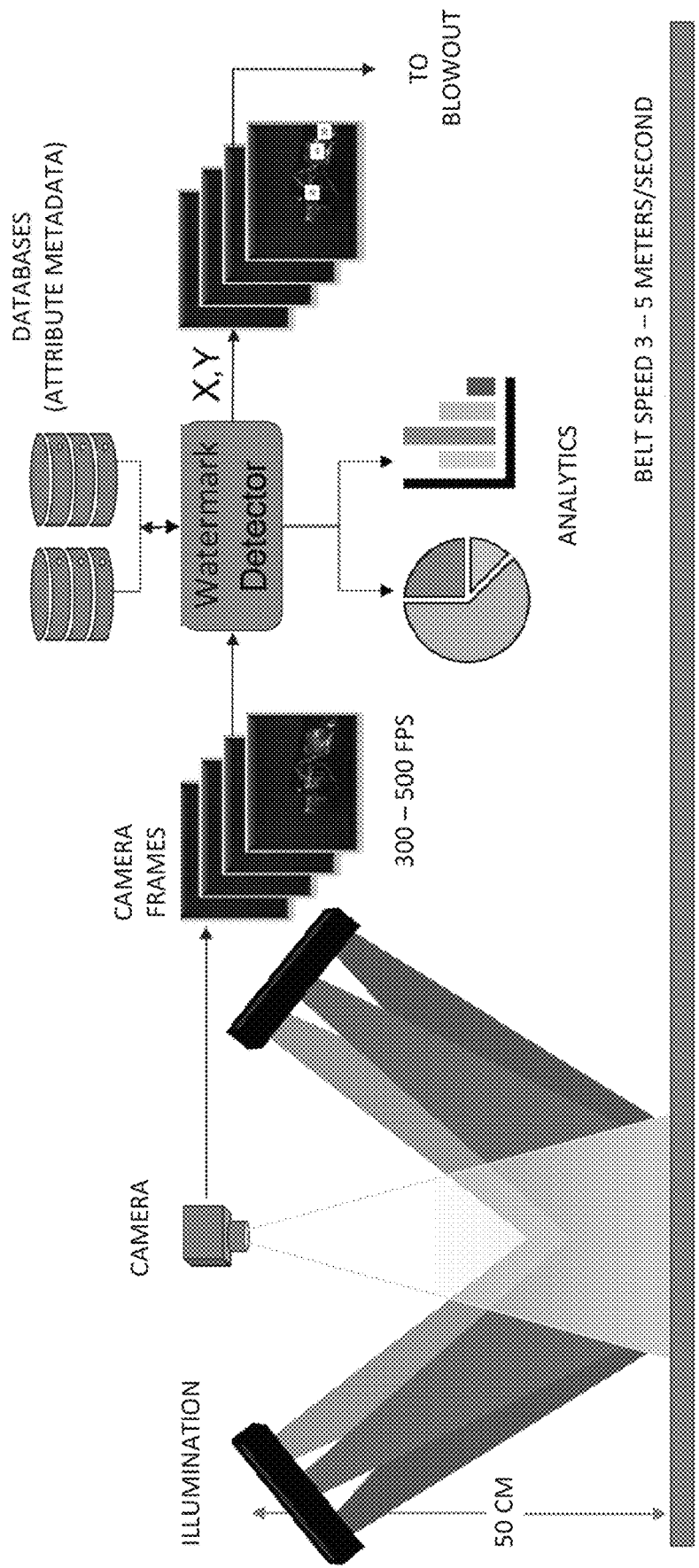
FIG. 1 illustrates a system that can employ certain aspects of the present technology.

An illustrative recycling apparatus employing aspects of the present technology is shown in FIG. 1 and employs one or more cameras, and typically light sources, to capture imagery depicting watermarked plastic items traveling in a waste stream on a conveyor belt. Depending on implementation, the conveyor area imaged by a camera system (i.e., its field of view) may be as small as about 2 by 3 inches, or as large as about 20 by 30 inches, or larger—primarily dependent on camera sensor resolution and lens focal length. In some implementations, multiple imaging systems are employed to capture imagery that collectively span the width of the conveyor. A conveyor may be up to two meters in width in a mass-feed system. (Singulated-feed systems, in which items are metered onto the conveyor one at a time, are narrower, e.g., 50 cm in width.) Conveyor speeds of 1-5 meters/second are common.

Image frames depicting an item are provided to a detector that decodes watermark payload data for an item from small blocks of imagery. The watermark payload data comprises a short identifier (e.g., 50-100 bits), which is associated with a collection of related metadata in a database (sometimes termed a "resolver database"). This metadata can detail a lengthy set of attributes about the plastic used in the item, such as its chemistry and properties, e.g., its melt index, melt flow ratio, resin specific gravity, bulk density, melt temperature, fillers and additives, color pigments, etc. The metadata can further provide non-plastic information, such as dimensions of the item, whether the item was used as a food container or not, whether the package is a multi-layer composite or includes a sleeve, the corporate brand responsible for the item, etc.

The locations of decoded watermark signal blocks within captured image frames are mapped to corresponding physical areas on the conveyor belt. The belt speed is known, so the system can predict when watermark-identified items will be in position to be diverted from the belt into an appropriate receptacle, or onto a selected further conveyor. Familiar diversion means can be used, such as force air "blowout."

Plastic items can be encoded with multiple watermarks. One watermark can be printed—typically by ink—on a label or sleeve applied to the item (or printed on the item itself), and another can be formed by 3D texturing of the plastic surface. The payload of a printed watermark commonly conveys a retail payload (e.g., a GTIN, a Global Trade Item Number), which is designed primarily for use by a point-of-sale terminal scanner, as it contains or points to a product name, price, weight, expiration date, package date, etc., to identify and price an item at a retail checkout. ("Points to" refers to use of the payload information to identify a corresponding database record, from which further information about the item is obtained.) The texture watermark may comprise the same payload, or one specific to recycling, e.g., containing or pointing to data relating to the plastic.

Watermarking Technology

Certain inventive aspects of the present technology concern improvements to watermarking technology, so we provide an introductory discussion of illustrative watermark encoding and decoding arrangements. (The following details are phrased in the context of print, but the application of such methods to surface texturing is straightforward, e.g., given teachings elsewhere in this disclosure and in the cited documents.)

In an exemplary encoding method, a plural-symbol message payload (e.g., 47 binary bits, which may represent a product's Global Trade Identification Number (GTIN), or a container identification code, together with 24 associated CRC bits), is applied to an error correction coder. This coder transforms the symbols of the message payload into a much longer array of encoded message elements (e.g., binary or M-ary elements) using an error correction method. (Suitable coding methods include block codes, BCH, Reed Solomon, convolutional codes, turbo codes, etc.) The coder output may comprise hundreds or thousands of binary bits, e.g., 1024, which may be termed raw signature bits. These bits may be scrambled by XORing with a scrambling key of the same length, yielding a scrambled signature.

Each bit of the scrambled signature modulates a pseudo-random noise modulation sequence (spreading carrier) of length 16, e.g., by XORing. Each scrambled signature bit thus yields a modulated carrier sequence of 16 "chips," producing an enlarged scrambled payload sequence of 16,384 elements. This sequence is mapped to elements of a square block having 128×128 embedding locations in accordance with data in a map or scatter table, yielding a 2D payload signature pattern comprised of 128×128 watermark elements ("waxels"). In a particular embodiment, the scatter table assigns 4 chips for each scrambled signature bit to each of four 64×64 quadrants in the 128×128 block.

Each location in the 128×128 block is associated with a waxel (chip) value of either 0 or 1 (or −1 or 1, or black or white)—with about half of the locations having each state. This bimodal signal is frequently mapped to a larger bimodal signal centered at an eight-bit greyscale value of 128, e.g., with values of 95 and 161. Each of these embedding locations may correspond to a single pixel, resulting in a 128×128 pixel watermark message block. Alternatively, each embedding location may correspond to a small region of pixels, such as a 2×2 patch, termed a "bump," resulting in a 256×256 pixel message block.

Figure 2A:
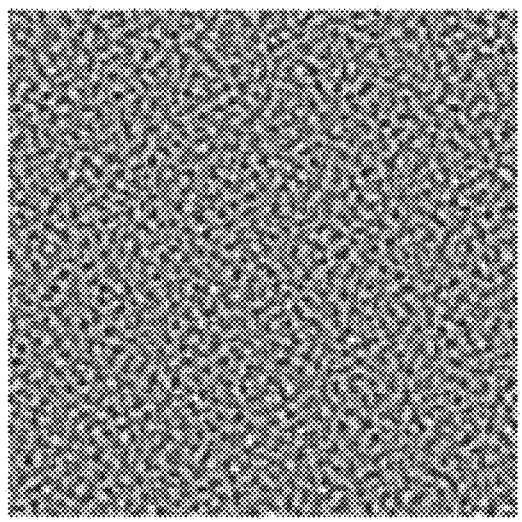
FIG. 2A show an illustrative watermark reference signal in the pixel domain.

A synchronization component is commonly included in a digital watermark to help discern parameters of any affine transform to which the watermark has been subjected prior to decoding, so that the payload can be correctly decoded. A particular synchronization component takes the form of a reference signal comprised of a dozen or more 2D sinusoids of different frequencies and pseudorandom phases in the pixel (spatial) domain, which corresponds to a pattern or constellation of peaks of pseudorandom phase in the Fourier (spatial frequency) domain. Such alternate representations of an illustrative reference signal are shown in FIG. 2A (pixel domain) and FIG. 2B (Fourier domain). As a matter of practice, this signal is commonly defined in the Fourier domain and transformed into the pixel domain at a size corresponding to that of the watermark message block, e.g., 256×256 pixels. This pixel reference signal, which may comprise floating-point values between −1 and 1, can be magnitude-scaled to a range of −40 to 40. Such reference signal elements are then combined with corresponding elements of the 256×256 pixel payload block to yield a final watermark signal block, e.g., having values ranging from 55 (i.e., 95-40) to 201 (i.e., 161+40). For print applications such signal can then be summed with host imagery, after first scaling-down in magnitude to render it inconspicuous.

If such a watermark signal block is rendered at a spatial resolution of 300 dots per inch (DPI), a signal block of about 0.85 inches square results. Since the 0.85 inch side dimension corresponds to 128 waxels, this works out to 150 waxels per inch. (Naturally, other sizes can be employed, e.g., 75, 200, 300 and 750 waxels per inch, etc.) Such blocks can be tiled edge-to-edge for marking a larger surface—in some cases spanning an object completely.

The just-described watermark signal may be termed a "continuous tone" watermark signal. In print it is often characterized by multi-valued data, i.e., not being just on/off (or 1/0, or black/white)—thus the "continuous" moniker. Each pixel of the host content (or region within the host content) is associated with one corresponding element of the watermark signal. A majority of pixels in a host image (or image region) are changed in value by combination with their corresponding watermark elements. The changes are typically both positive and negative, e.g., changing the local luminance of the imagery up in one location, while changing it down in another. And the changes may be different in degree—some pixels are changed a relatively smaller amount, while other pixels are changed a relatively larger amount. Typically, the amplitude of the watermark signal is low enough that its presence within the image escapes notice by casual viewers (i.e., it is steganographic).

(Due to the highly redundant nature of the encoding, some embodiments can disregard pixel changes in one direction or another. For example, one such embodiment only changes pixel values in a positive direction. Pixels that would normally be changed in a negative direction are left unchanged. The same approach can be used with surface texturing, i.e., changes can be made in one direction only.)

In a variant continuous tone print watermark, the signal acts not to change the local luminance of artwork pixels, but rather their color. Such a watermark is termed a "chrominance" watermark (instead of a "luminance" watermark). An example is detailed, e.g., in U.S. Pat. No. 9,245,308.

"Sparse" or "binary" watermarks are different from continuous tone watermarks. They do not change a majority of pixel values in the host image (or image region). Rather, they have a print density (which may sometimes be set by the user) that typically results in marking between about 3% and 45% of pixel locations in the image. Adjustments are usually all made in the same direction, e.g., reducing luminance. Sparse elements are commonly bitonal, e.g., being either white or black. Although sparse watermarks may be formed on top of other imagery, they are often presented in regions of artwork that are blank or colored with a uniform tone. In such cases a sparse marking may contrast with its background, rendering the marking visible to casual viewers. Although sparse marks can take the form of a field of seemingly-random dots, they can also take the form of line structures, as detailed elsewhere. As with continuous tone watermarks, sparse watermarks generally take the form of signal blocks that are tiled across an area of imagery.

A sparse watermark can be produced from a continuous-tone watermark in various ways. One is by thresholding. That is, the darkest elements of the summed reference signal/payload signal blocks are copied into an output signal block until a desired density of dots is achieved. Such a watermark may be termed a thresholded binary watermark.

Patent publication US20170024840 details various other forms of sparse watermarks. In one embodiment, a watermark signal generator starts with two 128×128 inputs. One is a payload signal block, with its locations filled with a binary (0/1, black/white) enlarged scrambled payload sequence, as described above. The other is a spatial domain reference signal block, with each location assigned a floating point number between −1 and 1. The darkest (most negative) "x"% of these reference signal locations are identified, and set to black; the others are set to white. Spatially-corresponding elements of the two blocks are ANDed together to find coincidences of black elements between the two blocks. These elements are set to black in an output block; the other elements are left white. By setting "x" higher or lower, the output signal block can be made darker or lighter. Such a code may be termed an ANDed, or a Type 1, binary watermark.

Publication US20190332840 details additional sparse encoding embodiments. One embodiment uses a reference signal generated at a relatively higher resolution (e.g., 384× 384 pixels), and a payload signature spanning a relatively lower resolution array (e.g., 128×128). The latter signal has just two values (i.e., it is bitonal); the former signal has more values (i.e., it is multi-level, such as binary greyscale or comprised of floating-point values). The payload signal is interpolated to the higher resolution of the reference signal, and in the process is converted from bitonal form to multi-level. The two signals are combined at the higher resolution (e.g., by summing in a weighted ratio), and a thresholding operation is applied to the result to identify locations of extreme (e.g., dark) values. These locations are marked to produce a sparse block (e.g., of 384×384). The threshold level establishes the dot density of the resulting sparse mark. Such a code may be termed an interpolated, or a Type 2, binary watermark.

A different embodiment orders samples in a block of a reference signal by value (darkness), yielding a ranked list of the darkest N locations (e.g., 1600 locations), each with a location (e.g., within a 128×128 element array). The darkest of these N locations may be always-marked in an output block (e.g., 400 locations, or P locations), to ensure the reference signal is strongly expressed. The others of the N locations (i.e., N-P, or Q locations) are marked, or not, depending on values of message signal data that are mapped to such locations (e.g., by a scatter table in the encoder). Locations in the sparse block that are not among the N darkest locations (i.e., neither among the P or Q locations) never convey watermark signal, and they are consequently affirmatively ignored by the decoder. By setting the number N larger or smaller, sparse marks with more or fewer dots are produced. This embodiment is termed the "fourth embodiment" in earlier-cited publication US20190332840, and may also be termed a Type 3 binary watermark.

In generating a binary (sparse) mark, a spacing constraint can be applied to candidate mark locations to prevent clumping. The spacing constraint may take the form of a keep-out zone that is circular, elliptical, or of other (e.g., irregular) shape. The keep-out zone may have two, or more, or less, axes of symmetry (or none). Enforcement of the spacing constraint can employ an associated data structure having one element for each location in the tile. As dark marks are added to the output block, corresponding data is stored in the data structure identifying locations that—due to the spacing constraint—are no longer available for possible marking.

This process can involve assessing candidate dot locations to assure that a keep-out region around previously-selected dots is observed. Consider a candidate dot at row 11 and column 223. If the keep-out region is a distance of 4 elements (pixels), then one implementation looks to see if any dot has previously been selected in rows 7-15. This set of previously-selected dots is further examined to determine whether any is found in columns 219-227. If so, then the distance between such previously-selected dot and the candidate dot is determined, by computing the square root of the sum of the row difference, squared, and the column distance, squared. If any such distance is less than 4, then the candidate dot is discarded.

Applicant has found that a substantial computational saving can be achieved by a different algorithm. This different algorithm maintains a look-up data structure (table) having dimensions equal to that of the dense code, plus a border equal to the keep-out distance. The data structure thus has dimensions of 392 rows×392 columns, in the case of a 384×384 element dense code (and a keep out of 4). Each element in the data structure is initialized to a value of 0—signifying that the corresponding position in the sparse block is available for a dot.

When a first dot is selected for inclusion in the sparse block, the corresponding location in the data structure—and neighboring locations within a distance of 4—are changed to a value of 1—signifying that they are no longer available for a dot. When a second candidate dot is considered at a given row/column of the sparse signal block, the corresponding row/column of the data structure is checked to see if its value is 0 or 1. If 0, the dot is written to the sparse output block, and a corresponding neighborhood of locations in the data structure are changed in value to 1—preventing any other dots from violating the keep out constraint. This process continues, with the location of each candidate dot being checked against the corresponding location in the data structure and, if still a 0, the dot is written to the sparse output block and the data structure is updated accordingly.

In some embodiments, the reference signal can be tailored to have a non-random appearance (in contrast to that of FIG. 2A), by varying the relative amplitudes of spatial frequency peaks, so that they are not all of equal amplitude. Such variation of the reference signal has consequent effects on the sparse signal appearance.

A sparse pattern can be rendered in various forms. Most straight-forward is as a seemingly-random pattern of dots. But more artistic renderings are possible, including Voronoi and Delaunay line patterns, and stipple patterns, as detailed in our patent publication US20190378235.

Other overt, artistic patterns conveying watermark data are detailed in patent publication US20190139176. In one approach, a designer creates a candidate artwork design or selects one from a library of designs. Vector art in the form of lines or small, discrete print structures of desired shape work well in this approach. A payload is input to a signal generator, which generates a raw data signal in the form of two-dimensional tile of data signal elements. The method then edits the artwork at spatial locations according to the data signal elements at those locations. When artwork with desired aesthetic quality and robustness is produced, it is applied to an object.

Other techniques for generating visible artwork bearing a robust data signal are detailed in assignee's patent publications US20190213705 and US20200311505. In some embodiments, a neural network is applied to imagery including a machine-readable code, to transform its appearance while maintaining its machine readability. One particular method trains a neural network with a style image having various features. (Van Gogh's The Starry Night painting is often used as an exemplary style image.) The trained network is then applied to an input pattern that encodes a plural-symbol payload. The network adapts features from the style image (e.g., distinctive colors and shapes) to express details of the input pattern, to thereby produce an output image in which features from the style image contribute to encoding of the plural-symbol payload. This output image can then be used as a graphical component in product packaging, such as a background, border, or pattern fill. In some embodiments, the input pattern is a watermark pattern, while in others it is a host image that has been previously watermarked.

Still other such techniques do not require a neural network. Instead, a continuous tone watermark signal block is divided into sub-blocks. A style image is then analyzed to find sub-blocks having the highest correlation to each of the watermark signal sub-blocks. Sub-blocks from the style image are then mosaiced together to produce an output image that is visually evocative of the style image, but has signal characteristics mimicking the watermark signal block. Yet another technique starts with a continuous tone watermark, divides it into sub-blocks, and combines each sub-block with itself in various states of rotation, mirroring and/or flipping. This yields a watermark block comprised of stylized sub-blocks that appear somewhat like geometrically-patterned symmetrical floor tiles.

Watermark reading has two parts: finding a watermark, and decoding the watermark.

In one implementation, finding the watermark (sometimes termed watermark detection) involves analyzing a received frame of captured imagery to locate the known reference signal, and more particularly to determine its scale, rotation, and translation.

The received imagery is desirably high-pass filtered so that the fine detail of the watermark code is maintained, while the low frequency detail of the item on which it is marked is relatively attenuated. Oct-axis filtering can be used.

In one oct-axis filtering arrangement, each pixel is assigned a new value based on some function of the original pixel's value relative to its neighbors. An exemplary embodiment considers the values of eight neighbors—the pixels to the north, northeast, east, southeast, south, southwest, west and northwest. An exemplary function sums a −1 for each neighboring pixel with a lower value, and a +1 for each neighboring pixel with a higher value, and assigns the resulting value to the central pixel. Each pixel is thus re-assigned a value between −8 and +8. (These values may all be incremented by 8 to yield non-negative values, with the results divided by two, to yield output pixel values in the range of 0-8.) Alternatively, in some embodiments only the signs of these values are considered—yielding a value of −1, 0 or 1 for every pixel location. This form can be further modified to yield a two-state output by assigning the "0" state, either randomly or alternately, to either "−1" or "1." Such technology is detailed in Digimarc's U.S. Pat. Nos. 6,580,809, 6,724,914, 6,631,198, 6,483,927, 7,688,996, 8,687,839, 9,544,516 and 10,515,429. (A variant filtering function, the "freckle" transform, is detailed in U.S. Pat. No. 9,858,681. A further variant, "oct-vector," is detailed in pending application Ser. No. 16/994,251, filed Aug. 14, 2020.)

A few to a few hundred candidate blocks of filtered pixel imagery (commonly overlapping) are selected from the filtered image frame in an attempt to identify one or more watermarked items depicted in the image frame. (An illustrative embodiment selects 300 overlapping blocks.) Each selected block can have dimensions of the originally-encoded watermark block, e.g., 64×64, 128×128, 256×256, etc. We focus on the processing applied to a single candidate block, which is assumed to be 128×128 pixels in size.

To locate the reference signal, the selected pixel block is first transformed into the Fourier domain, e.g., by a Fast Fourier Transform (FFT) operation. If a watermark is present in the selected block, the reference signal will be manifested as a constellation of peaks in the resulting Fourier magnitude domain signal. The scale of the watermark is indicated by the difference in scale between the original reference signal constellation of peaks (FIG. 2B), and the constellation of peaks revealed by the FFT operation on the received, filtered imagery. Similarly, the rotation of the watermark is indicated by the angular rotation difference between the original reference signal constellation of peaks (FIG. 2B), and the constellation of peaks reveals on the FFT operation on the received, filtered imagery.

A direct least squares, or DLS technique is commonly used to determine these scale and rotation parameters, with each of a thousand or more candidate, or "seed," affine transformations of the known reference signal being compared to the magnitude data from the FFT transform of the input imagery. The parameters of the one or more seed affine transforms yielding FFT magnitude data that most nearly matches that of the block of filtered input imagery are iteratively adjusted to improve the match, until a final scale/rotation estimate is reached that describes the pose of the reference signal within the analyzed block of imagery.

Once the scale and rotation of the watermark within the received image block are known, the watermark's (x,y) origin (or translation) is determined. Methods for doing so are detailed in our U.S. Pat. Nos. 6,590,996, 9,959,587 and 10,242,434 and can involve, e.g., a Fourier Mellin transform, or phase deviation methods. (The just-noted patents also provide additional detail regarding the DLS operations to determine scale and rotation; they detail decoding methods as well.)

Once known, the scale, rotation and translation information (collectively, "pose" information) establishes a spatial relationship between waxel locations in the 128×128 watermark signal block, and corresponding locations within the image signal block. That is, one of the two signal blocks can be scaled, rotated and shifted so that each waxel location in the watermark code is spatially-aligned with a corresponding location in the image block.

Next, the original image data is geometrically transformed in accordance with the just-determined pose information and is resampled to determine image signal values at an array of 128×128 locations corresponding to the locations of the 128×128 waxels. Since each waxel location typically falls between four pixel locations sampled by the camera sensor, it is usually necessary to apply bilinear interpolation to obtain an estimate of the image signal at the desired location, based on the values of the nearest four image pixels. The known reference signal has served its purposes at this point, and now just acts as noise, so it can be subtracted if desired. Oct-axis filtering is again applied. This yields a 128×128 waxel-registered array of filtered image data. From this data the watermark payload can be decoded.

In particular, the decoder examines the mapped locations for each of the 16 chips corresponding to a particular bit of the scrambled signature, and inverts each filtered image value—or not—in accordance with a corresponding element of the earlier-applied XOR spreading carrier. The resulting 16 values are then summed—optionally after each is weighted by a linear pattern strength metric (or grid strength metric) indicating strength of the reference signal in the watermark sub-block from which the value was sampled. (Suitable strength metrics are detailed in U.S. Pat. Nos. 10,217,182 and 10,506,128.) The sign of this sum is an estimate of the scrambled signature bit value—a negative value indicates −1, a positive value indicates +1. The magnitude of the sum indicates reliability of the estimated bit value. This process is repeated for each of the 1024 elements of the scrambled signature, yielding a 1024 element string. This string is descrambled, using the earlier-applied scrambling key, yielding a 1024 element signature string. This string, and the per-bit reliability data, are provided to a Viterbi soft decoder, which returns the originally-encoded payload data and CRC bits. The decoder then computes a CRC on the returned payload and compares it with the returned CRC. If no error is detected, the read operation terminates by outputting the decoded payload data, together with coordinates—in the image frame of reference—at which the decoded block is located (e.g., its center, or its upper right corner "origin"). The payload data is passed to the database to acquire corresponding item attribute metadata. The coordinate data and metadata needed for sorting are passed to a sorting logic (diverter) controller. Metadata not needed for sorting but logged for statistical purposes are passed to a log file.

In some embodiments, pose parameters are separately refined for overlapping sub-blocks within the 128×128 waxel block. Each waxel may fall into, e.g., four overlapping sub-blocks, in which case there may be four interpolated, filtered values for each waxel, each corresponding to a different set of pose parameters. In such case these four values can be combined (again, each weighted in accordance with a respective grid strength metric), prior to inversion—or not—in accordance with the corresponding element of the earlier-applied XOR spreading carrier.

Relatedly, once pose parameters for the image block are known, surrounding pixel data can be examined to see if the reference signal is present there too, with the same or similar pose parameters. If so, case addition chip information can be gathered. (Since the watermark block is typically tiled, chip values should repeat at offsets of 128 waxels in vertical and horizontal directions.) Chip values from such neighboring locations can be weighted in accordance with the grid strength of the sub-block(s) in which they are located, and summed with other estimates of the chip value, to gain still further confidence.

The just-described accumulation of chip data from beyond a single watermark block may be termed intraframe signature combination. Additionally, or alternatively, accumulation of chip or waxel data from the same or corresponding locations across patches depicted in different image frames can also be used, which may be termed interframe signature combination.

In some embodiments plural frames that are captured by the camera system, e.g., under different illumination conditions and/or from different viewpoints, are registered and combined before submission to the detector system.

In print, the different values of watermark elements are signaled by ink that causes the luminance (or chrominance) of the substrate to vary. In texture, the different values of watermark elements are signaled by variations in surface configuration that cause the reflectance of the substrate to vary. The change in surface shape can be, e.g., a bump, a depression, or a roughening of the surface.

Such changes in surface configuration can be achieved in various ways. For mass-produced items, molding (e.g., thermoforming, injection molding, blow molding) can be used. The mold surface can be shaped by, e.g., CNC or laser milling, or chemical or laser etching. Non-mold approaches can also be used, such as forming patterns on the surface of a container by direct laser marking.

Laser marking of containers and container molds is particularly promising due to the fine level of detail that can be achieved. Additionally, laser marking is well-suited for item serialization—in which each instance of an item is encoded differently.

One application of serialization is to identify reusable bottles that are submitted for refilling, e.g., by a drink producer. After a bottle has been refilled, e.g., 20 times, it can be retired from service. See, e.g., patent publication US20180345326.

More generally, watermark serialization data can be used to help track individual bottles and other items of packaging through their respective lifecycles, from fabrication to recycling/re-use, and to provide data that makes possible an incentive system—including refunds of fees and rebates of taxes—to help encourage involvement by the many different participants needed to achieve the vision of a circular economy (e.g., bottle producers, brands, distributors, retailers, consumers, waste collection companies, material recovery facilities, recyclers, extended producer responsibility organizations, etc.).

In addition to the references cited elsewhere, details concerning watermark encoding and reading that can be included in implementations of the present technology are disclosed in applicant's previous patent filings, including U.S. Pat. Nos. 6,985,600, 7,403,633, 8,224,018, 10,958,807, and in pending application Ser. No. 16/823,135, filed Mar. 18, 2020.

Further information about thermoforming (molding) of plastic items is detailed in application 63/076,917, filed Sep. 10, 2020. Further information about injection molding is detailed in application 63/154,394, filed Feb. 26, 2021. Further information about laser marking of containers (which technology is also applicable to laser marking of molds) is detailed in application 63/113,700, filed Nov. 13, 2020.

Illustrative Hardware

The following discussion provides a summary of an illustrative imaging system, including illumination and imaging components.

Figure 3:
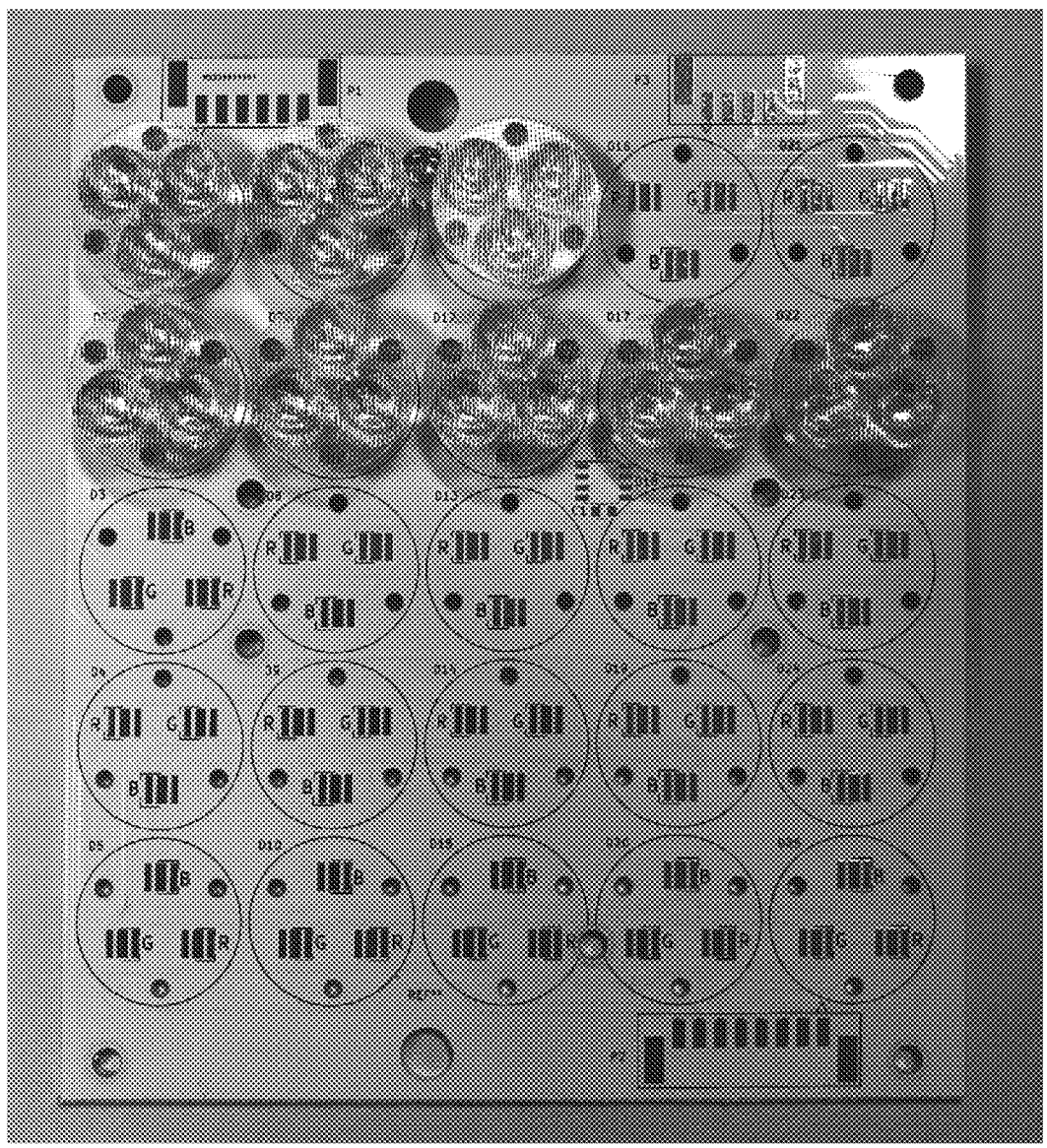
FIG. 3 depicts a partially-assembled illumination module.

An exemplary illumination system for watermark image capture is fashioned from circuit board modules. A partially-assembled example is shown in FIG. 3. This board is populated with LEDs of the Cree XP-E2 series, arrayed as 25 triples, each with its own lens (e.g., Carclo Technical Plastic part number 10510). Additional information about this board, and several variants, are detailed in patent publication WO2020186234.

Such modules can be placed edge-to-edge to span the width of the conveyor belt. As shown in FIG. 1, the belt is desirably illuminated from two directions.

The LEDs may all be of the same color, or LEDs of different colors can be included. In an exemplary arrangement, blue, red and infrared LEDs are employed, each with a spectral peak bandwidth (FWHM) of 40 or 30 nanometers or less at respective wavelengths of 450, 660 and 730 nanometers. These LEDs can be operated in tandem, but more commonly are operated in a monochrome fashion, e.g., a flash of blue, followed by a flash of red, followed by a flash of infrared. Each flash is synchronized to capture of a frame by the camera system. In such arrangement each frame in a triplet of frames is captured under a different illumination spectrum. (Naturally other colors can be employed, including white, green and ultraviolet.)

A variant illumination module does not use the circular lens assemblies of FIG. 3, but rather uses linear lenses. This permits the LEDs, and the rows of LEDs, to be spaced more closely, thereby providing more light for a given size module. Suitable linear lenses are available from Khatod (e.g., the PL1629NAST), Fusion Optix (e.g., the LEDMate Linear-Convex), Carclo (e.g., model 10398) and Gaggione (e.g., LLL15N7). Desirably, each lens projects a beam that spans the camera field of view along the length dimension of the belt (e.g., 10-20 cm, nominally 14 cm), when spaced 50 cm from the belt. The LEDs that are mounted in a row under a common lens may all be of the same color, or each row may include multiple colors. The LEDs may be spaced as closely within the row as thermal considerations permit.

In another embodiment, one or more elliptical light shaping diffusor sheets are employed. These sheets scatter LED or laser illumination, incident on one side, to produce a shaped pattern exiting the other side. Different output patterns are available, such as with a spread of between 1 to 60 degrees in one dimension, and a spread of between 10 and 80 degrees in the perpendicular dimension. The longer dimension (which in a particular embodiment may be 40-60 degrees) is typically oriented to illuminate across the width dimension of the belt.

By using such a diffusor over circuit board modules of LEDs, the LEDs may be spaced still more densely because the separate lens assemblies may be omitted. (Exemplary LEDs are less than 4 mils on a side, permitting up to 25 to be mounted in a 2×2 cm area.) Denser placement allows brighter illumination, and enables use of a greater diversity of LED colors than is described above. Still brighter illumination may be achieved by selection of narrower dispersion patterns. For example, a 45×8 degree dispersion pattern generally provides doubles the light intensity of a 45×16 degree dispersion pattern—all other things being equal. Increased illumination permits shorter exposure intervals and/or smaller lens apertures, leading to reduction of motion blur and/or increase in depth of field. (Moreover, such diffusors typically have efficiencies of over 90%, as contrasted with efficiencies of below 90% for plastic LED lenses.)

Luminit LLC, of Torrance, Calif., and Bright View Technologies Corporation, of Durham, N.C., are suppliers of suitable diffusor sheets.

Typically each light source has an apparent width of at least 5 cm. The light sources are pulsed at the camera frame rate and desirably are active only when the camera is exposing an image.

Applicant surprisingly has found that watermark detection from crumpled objects (e.g., plastic bottles) sometimes works best if the imagery is analyzed in elongated excerpts, rather than square. For example, instead of operating on patches of imagery sized to span about 128×128 or 32×32 waxels, better results may be achieved by operating on imagery corresponding to 32×16, or 32×8, waxels. In such case, the longer dimension of the analysis excerpt is desirably aligned to be parallel to any elongation in the illumination pattern. For example, if the illumination is shaped to span a greater distance along the width of the belt than along its length, then the analysis excerpts of imagery are desirably taken with their longer axes oriented in the pixel direction that corresponds to the width of the belt.

Applicant's U.S. patent application 63/117,828, filed Nov. 24, 2020, provides additional details on suitable illumination systems.

The illumination system is desirably positioned as close as the belt as possible, to provide the brightest illumination and thereby permit the shortest possible camera capture (exposure) intervals. However, sufficient clearance must be provided to enable items to pass beneath on the belt. In a particular embodiment, a distance of between 15-20 cm is used. Depending on the types of items on the belt, a higher clearance (e.g., of 25-60 cm.) may be required. The sorting system may include a crusher that serves to reduce height variation of the plastic surfaces before items are imaged. (Crushing also reduces tumbling.)

Specular reflection from smooth plastic surfaces can be a hindrance. Sometimes, however, it can be a help—depending on circumstance. (Imaging black plastic is one circumstance in which it can be a help. Another is where marking effects a roughening of a plastic surface, so that markings are distinguished in captured imagery by localized absences of specular reflection.) One advantageous arrangement employs plural separately-operable light sources that are positioned—relative to the camera—in manners configured so that one (or more) is adapted to lead to specular reflection in captured imagery, while one (or more) is adapted to avoid specular reflection in captured imagery.

Turning to the camera, the larger the sensor, the more sensitive it is, and the shorter the exposures can be. Desirably the sensor has pixels larger than 3.5 micrometers on a side, and preferably larger than 5 micrometers on a side. Ideally, sensors with pixels of 10 or 15 micrometer size would be used, although costs are a factor. (An example is the SOPHIA 2048B-152 from Princeton Instruments—a 2K×2K sensor, with a pixel size of 15 micrometers.) An alternative is to use "binning" with a higher resolution sensor, e.g., a 2.5K×2.5K sensor with 5 micrometer pixels, in which adjoining 2×2 sets of pixels are binned together to yield performance akin to that of a 1.25K×1.25K sensor with 10 micrometer pixels. Suitable candidates include the Sony IMX420 sensor (with 9 micrometer effective pixel size after binning, and with a 10-bit analog-to-digital converter) and the Sony IMX425 sensor (again with 9 micrometer effective pixel size, but with a 12-bit ADC). Global shutter image capture is desirably used (as contrasted with rolling shutter) to avoid motion artifacts.

Either monochrome or color camera sensors can be used. Some printed labels are encoded using "chroma" watermarking in which, e.g., cyan and magenta inks are used in combination. These two inks have different spectral reflectance curves which, when illuminated by white (red-green-blue) illumination, enable differences between red- and blue- (and/or green-) channel camera responses to be subtracted to yield an image in which the watermark signal is accentuated. (See, e.g., U.S. Pat. No. 9,245,308.) Yet despite the signal increase achieved by such technique, applicant has found that illuminating such labels with red light alone, and sensing with a monochrome sensor, can yield stronger and less noisy recovered watermark signals. (Moreover, red LEDs are more efficient than, e.g., green and blue LEDs—sometimes by a factor of two or more. This translates to less heat, which in turn allows more LEDs to be used, producing greater luminous flux output.)

In still other embodiments, printed labels can be encoded with machine readable data (e.g., sparse watermark patterns) formed with yellow ink, for encoding of recycling-related data.

Sensitivity of human vision is particularly acute in the green spectrum, so watermark data is often not encoded in a green color channel of product artwork, in order to help keep the marking imperceptible. Thus, in some embodiments, illumination and camera systems that minimize use of green (e.g., but instead emphasize blue and higher wavelengths up into ultraviolet, and red and lower wavelengths down into infrared) are used. One sensor optimized for digital watermark reading—in non-green visible wavelengths—is detailed in our U.S. Pat. No. 10,455,112. A particular embodiment detailed in that patent uses a color filter array over a monochrome sensor, in which there are three magenta-filtered photocells for every green-filtered photocell.

The lens used with the camera should minimize barrel distortion and chromatic aberration (e.g., with consistent focus at both blue and infrared, such as at 450 and 730 nanometers). Lenses in the Fujinon CF-ZA-1S series are satisfactory. The lens should be focused at half of the camera depth of field, e.g., 5 cm from the surface of the belt. 50 and 35 mm lenses have been used successfully, with longer lenses usually being preferred to lessen perspective distortion.

In an exemplary system the belt moves at about 3-5 meters per second. The camera system desirably looks straight down at the belt (i.e., with the lens axis perpendicular to the belt) and captures monochrome frames at a rate of 150-700 frames per second, and most typically at a rate of 300-500 frames per second. Exposure times are normally 100 microseconds or less, with 33 to 66 microseconds being more usual. An HB-1800-S-M camera system by Emergent Vision Technologies is suited for such capture requirements and employs the earlier-referenced Sony IMX425 sensor. (If desired, multiple cameras with lower frame capture rates and overlapping fields of view can be synchronized together to meet the frame rate requirements.) The camera system depth of field is typically at least 5 cm, with 10-15 cm or more being preferred. Desirably the lens aperture is f/5.6 or smaller, such as f/8 or f/11. The distance between the camera and the belt is again limited by the constraint of needing adequate clearance for items to pass underneath.

The camera optics are desirably chosen, in conjunction with the imaging distance, so that captured imagery depicts items in the middle of the depth of field with a resolution of about 0.7 to 2 pixels per waxel, and more usually between 1 and 1.5 pixels per waxel. (If captured image frames are 1280×1024 pixels, and the 1024 pixels depicts a length of belt measuring 14 cm, this works out to a sampling resolution of 73 pixels per cm, or about 185 pixels per inch. At 150 waxels per inch, this is 1.23 pixels per waxel.)

If the belt is moving at 5 meters per second, and the camera system is providing 500 frames per second of imagery, then the computational resources needed to process the imagery from a camera may be met using, e.g., between 4 and 7 Intel i9 9960X 16-core AVX512 CPUs. In a particular embodiment, the imagery from a camera is provided to an execution thread on one core which serves as a dispatcher process, distributing the imagery to other cores and threads based on their current utilization.

The field of view of a single camera may be about 18×14 centimeters. The width of the entire belt is typically imaged by providing multiple cameras, with fields of view of adjacent cameras overlapping by 2 cm or so.

The illumination system can be pulsed and synchronized with the camera system and can be cycled through different light configurations, such as: (a) capturing alternate image frames with infrared, then blue; (b) capturing alternate image frames with the first frame illuminated with infrared plus blue, and the next frame illuminated with red; and (c) capturing sequences of three frames: red, infrared, blue. Each image can be tagged with metadata indicating the color illumination with which it was captured.

Figure 4:
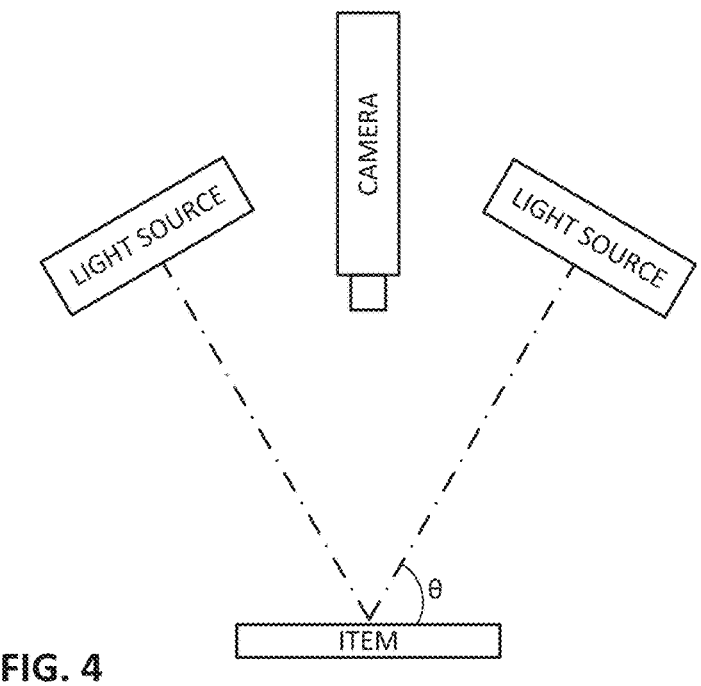
FIG. 4 depicts a geometrical relationship between light sources, a camera, and an item being imaged.

The spatial relationship of the components is desirably such that the illumination angle θ (FIG. 4) onto an item surface in the middle of the camera's depth of field is 40 degrees or more. (The figure shows an illumination angle of 60 degrees. Some embodiments have illumination angles of 75 or 80 degrees or more. If the camera has a straight-down orientation, the illumination source is this latter case is 15 or 10 degrees or less angularly displaced from the camera lens, as viewed from the middle of the camera's field of view, and a mid-depth of field location.) Low angles diminish the surface illumination by a $(1-\cos\theta)$ factor, requiring longer exposures.

(The angle of the light sources with respect to the camera optical axis is relevant as specular reflections from shiny objects often result in saturation of sensor pixels. The likelihood of seeing direct reflection of a light source in the field of view is a tradeoff, as specular reflections are desired for detection of watermark signals embossed in plastics, but are not desired for reading printed watermarks from shiny surfaces. A balance can be achieved by assessing location of reflection points when a mirror is placed on belt. Reflection points may be placed on the far top and bottom limits of the camera field of view.)

More on Feature Dimensions

As noted, one form of marking is a binary or sparse mark, in which information is conveyed as an array of dots or other marking features. Such marks are generally made in respective cells of a lattice, with intervening cells left unmarked. The earlier-referenced examples use a lattice of 128 rows by 128 columns of cells –16,384 in all.

Such cells are square in shape. Binary markings (whether printed, or formed by machining, laser, or other processes), in contrast, are typically rounded, but may sometimes be square. Applicant naturally understood that each mark should be confined to its respective cell. That is, the width of a mark should be less than or equal to the width of its corresponding cell, so as not to intrude into adjoining cells.

Surprisingly, applicant found that this need not be the case. A mark can intrude into adjoining cells while still enabling satisfactory decoding.

To give a specific example, consider a mold used for thermoforming plastic. A sparse mark (e.g., a Type 2 binary watermark, as detailed earlier) is to be formed in the mold at a resolution of 75 waxels per inch. At this scale each waxel corresponds to a square area that is $\frac{1}{75}^{th}$ of an inch on each side (13.33 mils). Such surface may be shaped (e.g., by machining or laser engraving) to form marks having the form of holes or depressions of circular cross section, e.g., with diameters of 16 or 20 mils. Each such depression thus extends into all four edge-adjoining waxels—by up to 1.33 mils in the case of a 16 mil hole, and by up to 3.33 mils in the case of a 20 mil hole. Looked at another way, 11% of a 16 mil hole's area falls within neighboring waxel cells, and 43% of a 20 mil hole's area falls within neighboring waxel cells. Nonetheless, when imagery depicting a plastic thermoform shaped by such mold is submitted for watermark decoding (e.g., using a known watermark decoder such as is described in U.S. Pat. Nos. 9,959,587 and 10,242,434, and available in the Apple Store as the Digimarc Discover app for the iPhone), the watermark payload is correctly extracted. This same result is achieved even if the 50% or more of each mark's area falls within adjoining waxels cells that the sparse pattern would leave unmarked.

Figure 5:
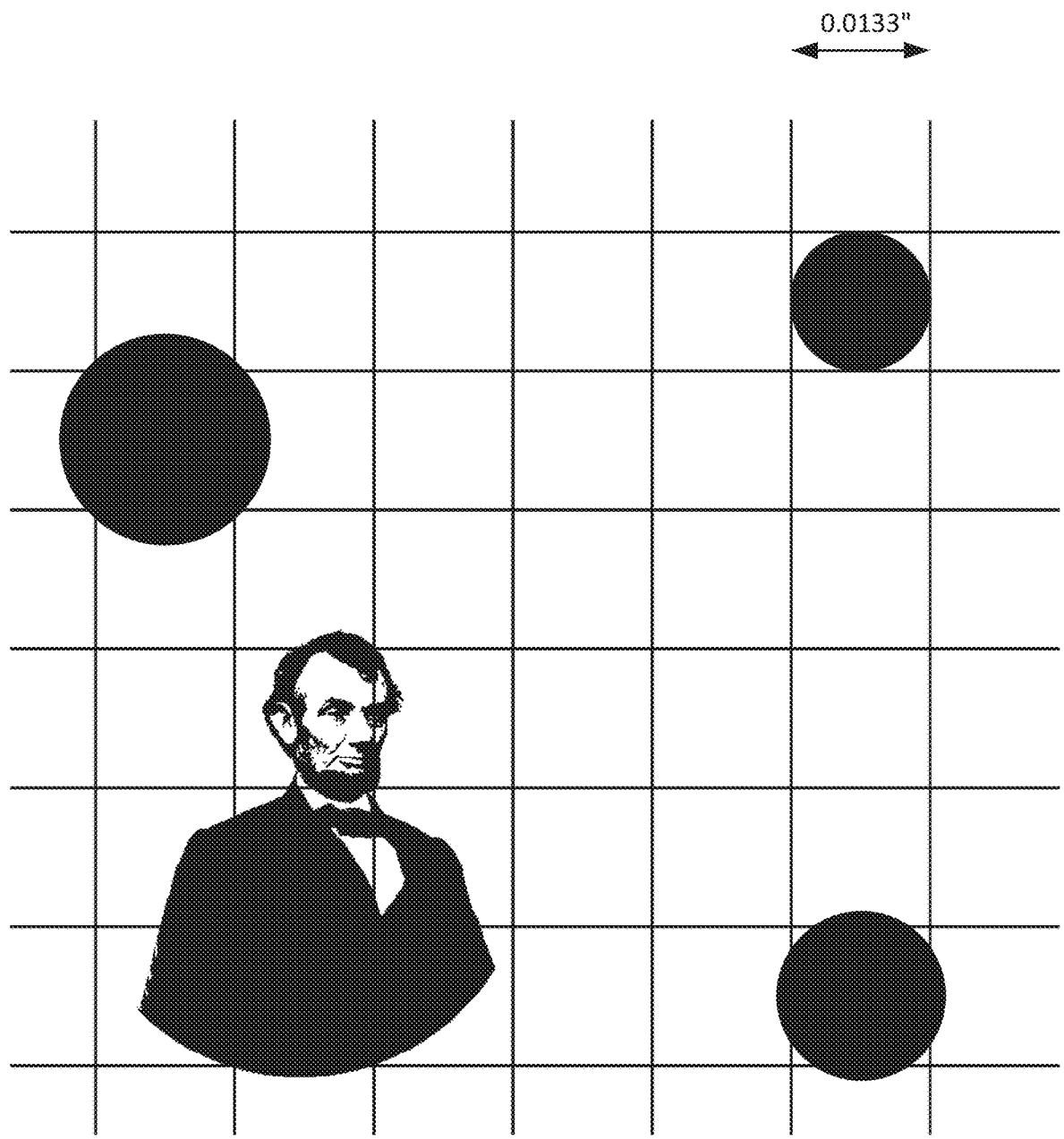
FIG. 5 shows relative sizes of different features within a lattice of cells scaled for 75 watermark elements per inch.

(To illustrate relative sizes, FIG. 5 depicts, in the upper right, a hole having a diameter equal to a waxel dimension of 0.0133 inches. In the upper left is a hole having a diameter of 0.02 inches. In the lower right is a hole having a diameter of 0.016 inches.)

This discovered ability to use marking features that are larger than waxel sizes is important due to cost and manufacturability concerns. Tooling needed to make small features is typically more expensive and less durable than tooling needed to make larger features. Thus, it is typically more economical to produce items with, e.g., 0.02 inch features than with 0.013 inch features. Such ability also enables use of higher WPI signal blocks, which, in turn, increases redundancy of signal coding across a container.

Figure 6:
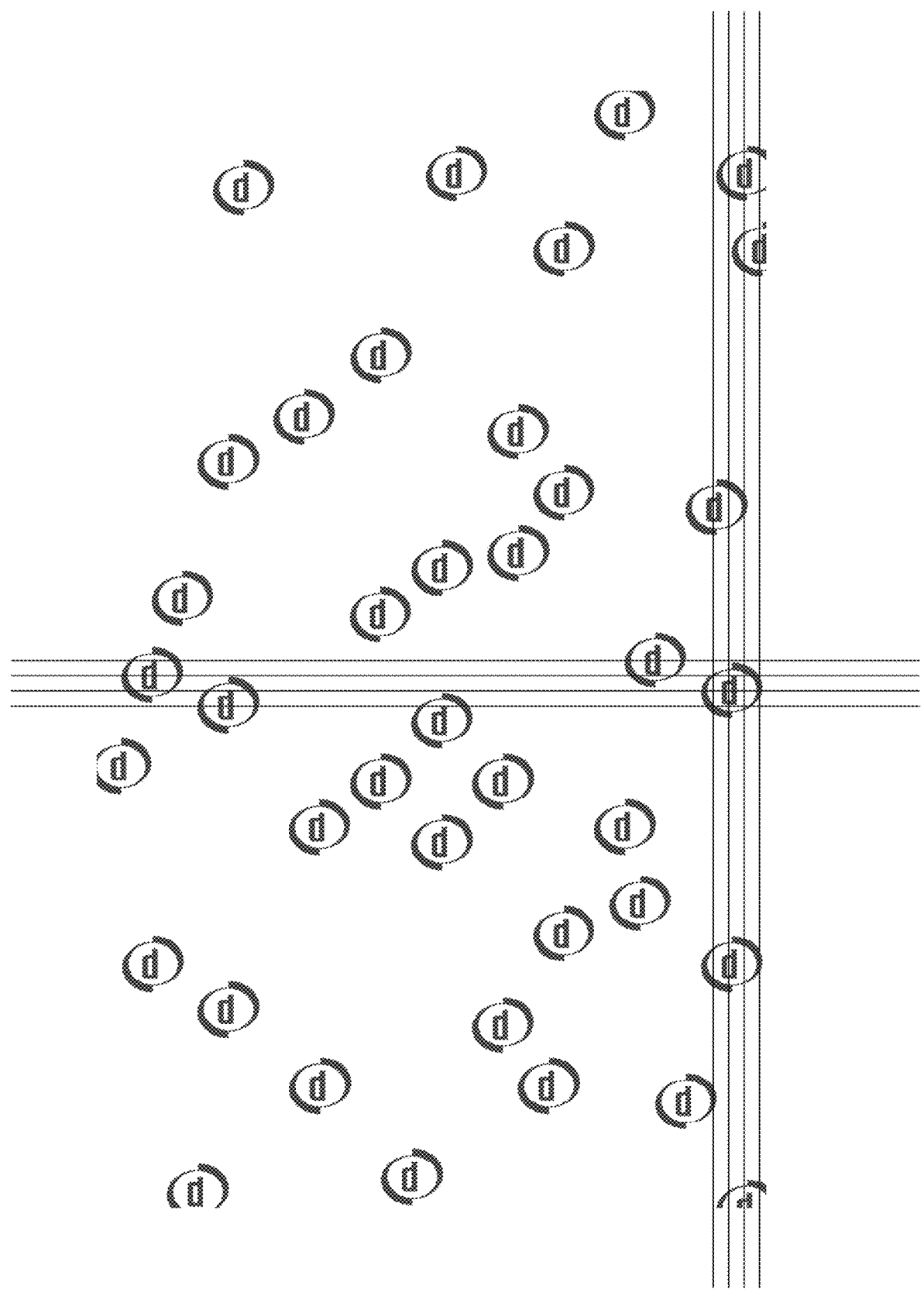
FIG. 6 illustrates use of logos as marks in a sparse watermark pattern.

As noted, laser marking can be used to form very fine features on surfaces. FIG. 6 shows an enlargement from a sparse watermark pattern (Type 2, 150 WPI), in which each sparse dot is rendered as a corporate logo. Faces, portraits, product or person silhouettes, and other graphic elements can be similarly utilized.

As just noted, the marks can be larger than the waxels—intruding into surrounding waxels' territories that the algorithm which generated the sparse pattern would leave unmarked. In FIG. 6, however, the intrusion isn't a fraction of a waxel. Rather, each of these logos is more than three waxels on a side. This is shown by the vertical and horizontal lines of FIG. 6, which show the centerlines of the columns and rows defining the lattice of waxel locations for this mark. Thus, more than 50% of each logo's cross-sectional area overlays waxels other than the central waxel that is to be marked. (More like 75 or 80% of the logo's area is outside the intended waxel.) FIG. 5 shows, in the lower left, a portrait that can serve as a marking feature, overlaid on a lattice of waxel locations.

Thus, an aspect of the present technology concerns a physical item bearing a machine-readable code comprising a pattern of marking features that collectively convey a plural-symbol message, where the machine-readable code is organized as a 2D lattice of edge-adjoining cells, and a first of the cells is marked with a feature that extends beyond an edge of said first cell.

Briefly, a process for producing artwork like that shown in FIG. 6 can involve first generating a desired sparse dot pattern, using a tool such as the Digimarc Plug-In for Adobe Illustrator. Next, the Image Trace feature of the Illustrator software is used to turn the raster objects representing the sparse dots into a corresponding array of identical vector boxes. Illustrator's Find-and-Replace scripting functionality is then used to replace one of the boxes with a vector graphic (e.g., a graphic depicting a corporate logo). The script is then used to similarly replace all of the other boxes with the same graphic. If desired, the resulting artwork can be converted into a pattern that can be used to fill any region of any artwork, such as product packaging, by using the Make New Pattern function of the Illustrator software. The resulting pattern swatch can then be stored or distributed for later use.

Robustness Improvements

Since objects on the conveyor belt can be soiled, crumpled, and/or overlay each other, it may be difficult to extract the watermark data. In particular, such phenomena tend to both attenuate the strength of desired reference and payload signals, and increase noise signals that can interfere with detection and reading of these desired signals. Various techniques can be used to increase the probability of reading the watermark data in such circumstances.

One technique is to disregard certain frames of imagery (or certain excerpts of certain frames of imagery) and to apply the computational resources that might otherwise be applied to such imagery, instead, to more intensively analyze other, more promising imagery (or image excepts). This technique can be used, e.g., when some or all of the belt depicted in a captured image is empty, i.e., it does not depict a waste item.

Consider an embodiment in which image frames are captured at a rate of 300 per second. About 250-300 blocks are processed from each frame, or 75,000+ blocks per second. To control sorting, the system must operate in real time. With the belt moving 3 or 5 meters per second, and the diverters located just a few meters down the belt, the system has a very small interval in which to complete a very large processing task. If analysis of a block (or frame) can be skipped, this time can instead be applied to further-process other imagery.

One way to further-process imagery is to more intensively attempt to detect the presence of a watermark signal in the imagery, e.g., through detection of the reference signal. One way this can be done is to try different 128×128 blocks (i.e., different block placements within the image frame). In an illustrative embodiment, after pre-filtering (e.g., by oct-axis filtering), a hundred or more different 128×128 pixel blocks are selected from each image frame. The selection can be random, or the blocks can be tiled in a uniform array, e.g., with each block having 50% overlap with the block to the left and with the block above. An FFT is then applied to each of these blocks (optionally after windowing to preserve only the center 96×96 pixel patch, with surrounding pixels zeroed), and the resulting spatial frequency data is analyzed for presence of the distinctive reference signal. The appearance of this reference signal reveals affine pose parameters by which the watermark block is depicted in the captured imagery, as described earlier.

If such an estimate of pose parameters for a watermark block is reached (e.g., using the noted DLS procedure), the resulting affine transform data can be used in a subsequent decoding operation, to identify waxel locations in the image data that should be sampled and provided to the decoder. (In a particular embodiment, waxel locations may be sampled from an area of about 300×300 pixels centered on the block, to take advantage of payload signals that may be readable outside the boundaries of the pixel block from which the reference signal was found). From such sample values the payload can then be decoded.

The number of blocks processed to attempt to detect the reference signal (e.g., 250-300 in an illustrative embodiment) is set to fully utilize the available processors. That is, the number of processed blocks is compute-bound.

If additional processing time is available (e.g., because an image frame or excerpt depicting empty belt is not being processed), then the process to find a reference signal can be performed more intensively. For example, 128×128 blocks may be more densely selected within the portion of the filtered image frame that does not depict empty belt. Perhaps from one of the densely-spaced blocks a reference signal will be detected that would otherwise be missed, permitting additional watermark data to be extracted corresponding to an object depicted in a corresponding area of the frame.

A second way to more thoroughly (intensively) analyze imagery, if additional processing time is available, is to employ a different (e.g., enlarged) set of DLS seed affine transforms—trying to find the reference signal at poses not specified by the usual selection of seeds. Each seed transform, in a particular embodiment, comprises a 2×2 matrix of parameters, defining rotation, scale, and two dimensions of shearing (i.e., four dimensions in all) that describe a possible geometric presentation of the watermark signal in the image block. The multitude of seeds may normally sample a subspace of these parameters in a first manner, such as rotation between 0 and 359 degrees at one degree increments, scale between 0.5× and 1.5× in increments of 0.1, etc. Again these parameters are normally chosen so that the processor(s) runs at 100% utilization. If additional processing is available (because the imagery depicts vacant regions of the belt that needn't be processed), the affine transform parameter subspace can be sampled in a second, different, manner. For example, these parameters can span broader ranges, thereby increasing the range of affine presentations at which a watermark reference signal on an object depicted in the occupied region of the image frame can be detected. Alternatively, these affine parameters can sample the subspace more finely (such as rotation at increments of 0.5 degrees), thereby reducing the chance that the iterative DLS procedure will hone-in on a final pose estimate that is sub-optimal.

Thus, for example, if the right half of an image frame is known to depict empty belt, then the number of DLS seeds employed in analyzing imagery from the left half of the image frame may be doubled, e.g., using 2000 seed transforms instead of 1000 (or 20,000 instead of 10,000). Processor utilization again reaches 100%, but such resource is applied more intensively to a smaller set of pixels.

Thus, a method employing certain aspects of the technology concerns a digital watermark reading system that operates on an image captured a camera that is viewing a waste stream on a conveyor belt. The method includes identifying a first region in the image depicting an empty region of the belt, and in response, region, enlarging a set of affine transform seeds employed by the digital watermark reading system in searching a second, different region of the image for a digital watermark.

Changing block boundaries and changing DLS seeds to increase the likelihood of finding watermarks reference signals are but two of many ways that additional processing time can be employed to more thoroughly analyze imagery. Alternatively, or additionally, the extra processing time can be applied to the payload decoding—rather than the reference signal detection—operations.

For example, if the reference signal is detected in several nearby (e.g., overlapping) 128×128 blocks, watermark decoding may normally be attempted on only one of the blocks. In a particular embodiment, the image frame is divided into eight sub-parts, and only one decode is attempted in each sub-part—based on the image block with the strongest grid strength metric. However, if extra processing time is available because not all of the frame merits analysis, the watermark decoding can be applied to two or more such blocks, to increase the chances of successful watermark extraction.

In some embodiments additional processing time is employed to attempt combining waxel data sampled from two or more different regions of a frame (or from different frames) to decode a single watermark payload. Such operation may not normally be undertaken, due to the short interval within which all frame processing must be completed. But with additional time (e.g., gained because not all of the image merits processing), such intraframe or interframe processing can be attempted.

Such processing assumes that the watermark reference signal has been detected in each such region, revealing the poses with which the waxel payload data is presented in the respective excerpts. Before combining waxel data from such excerpts, a check must be made that that two regions depict surfaces of the same item. (As noted, watermark data is typically encoded in redundant, tiled fashion across the surface of an object, so waxel data from different tiles can be combined. But only if the tiles are known to be from the same item.)

One way to check that two image excerpts, spaced apart within a frame, are from the same item is to perform a region-growing (blob detection) algorithm—extending out from one excerpt to see if the algorithm grows to encompass the second excerpt. Such methods are known to artisans, e.g., from the Wikipedia article entitled Blob Detection. If two excerpts appear to belong to the same item, as indicated by such a region-growing method, then waxel data from one image excerpt may be combined with waxel data from the other excerpt, e.g., in weighted fashion in accordance with the grid strength metrics of the respective regions, as described earlier.

A way to check that two image excerpts, taken from two different image frames, depict parts of the same item is to reverse the spatial movement that the belt movement has caused between the two frames, e.g., by shifting the second image up or down or left or right in the frame by a distance corresponding to the time interval between the two image captures. A spatial distance between the two excerpts—one original and one shifted—is then determined. If the center of one excerpt is within a threshold distance (e.g., 150 pixels) from the center of the other excerpt, then the two excerpts may be assumed to reliably depict the same item, and waxel data sampled from the two excerpts may then be combined for decoding, as described earlier.

Alternatively, a region-growing algorithm can be applied to the item region depicted in the first image to determine the extent of a connected blob of which it forms part. The second excerpt, shifted as described above, is then examined to see if it overlies the connected blob in the first image. If so, the waxel data in the two excerpts likely correspond to the same item, and again can be combined.

In both cases (i.e., excerpts spaced apart in a frame, or excerpts spaced apart in time) a correlation check can additionally or alternatively be performed. That is, a set of waxels that are depicted in common between the two excerpts are identified, and the pattern formed by such +1/−1 waxel values in one excerpt is correlated against the pattern of such waxel values in the second excerpt. If the correlation exceeds an empirically-determined threshold value, this indicates a likelihood that the two excerpts both convey the same payload information, indicating they both likely depict the same item. This can be used as an independent, or a supplemental, test for whether waxel data from the two excerpts should be combined for decoding.

The foregoing, more intensive decoding efforts can be invoked if computational resources are available due to part of the belt being empty and not warranting watermark analysis.

A belt that is vacant across its width can be detected by a simple photo-emitter/photo-detector pair that sends a light beam across the belt (a "breakbeam" arrangement). If the beam is received on the far side of the belt with its full strength, it is highly unlikely that there is an intervening object on the belt. An array of several such light beams can be projected across the belt, collectively checking a swath several centimeters in length (e.g., the length of belt depicted in the captured camera imagery). The light beams can be low to the belt, such as a centimeter or two above the belt, below the top surface of any plastic item that is likely to be conveyed by the belt.

Figure 7:
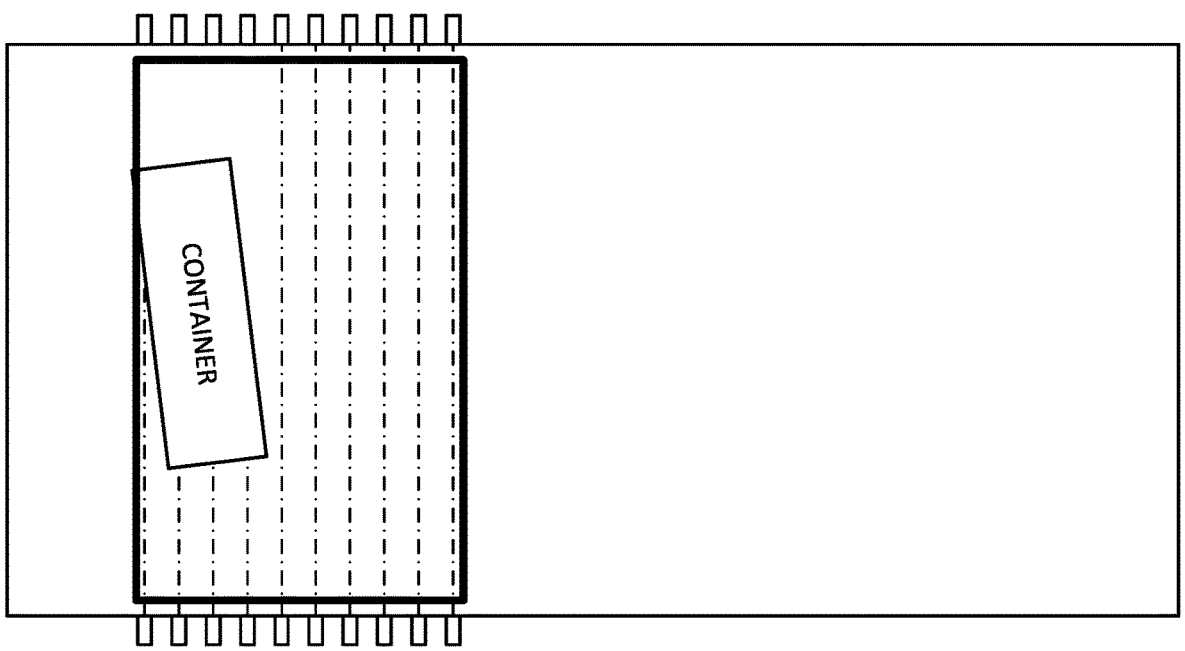
FIG. 7 schematically illustrates a breakbeam arrangement for sensing empty excerpts of a conveyor belt.

FIG. 7 is a plan view looking down onto a belt, and showing a plurality of LED emitters (with lenses, not shown) along the bottom side, and corresponding photocells along the top side, defining breakbeams shown by dashed lines. If the bold rectangle is the camera field of view, with the top to the right, it can be seen that the top 60% or so of this image frame can be disregarded, since no item is in this region of the belt. Processing resources that would normally be applied to this part of the imagery can be applied otherwise.

This breakbeam method works only if the entire width of the belt is free of an intervening object. A second arrangement is more flexible. In this arrangement a laser line is swept (e.g., by a rotating mirror) across the belt, from a projection system above the belt. A camera captures imagery of the area along the belt at which the laser is aimed, where the laser line is expected to appear. If the line is missing or appears displaced, this indicates an obstruction has intercepted the beam before it illuminated the belt (or has blocked the camera's view of the beam). That is, an item is present. As in the breakbeam arrangement, multiple such laser lines can be projected across the belt to localize where objects are present.

Figure 8:
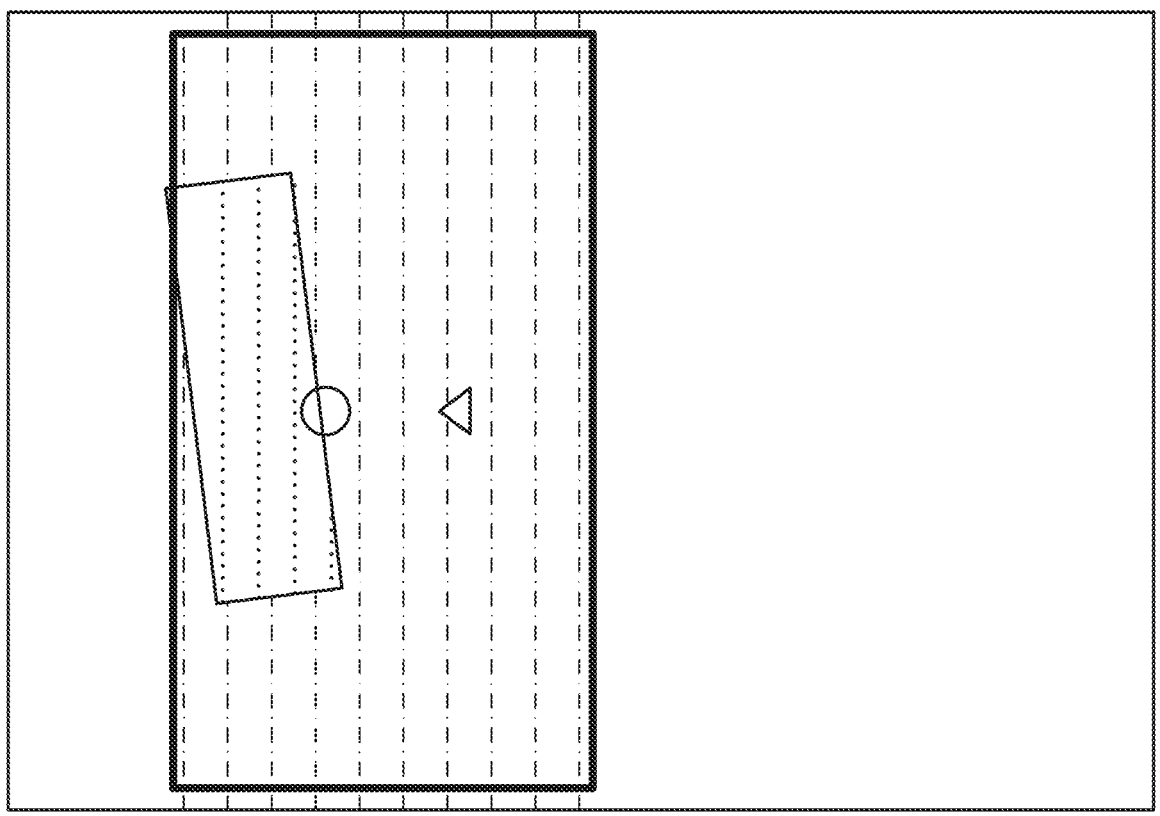
FIGS. 8 and 8A schematically illustrate a laser line-based arrangement for sensing empty excerpts of a conveyor belt.
Figure 8A:
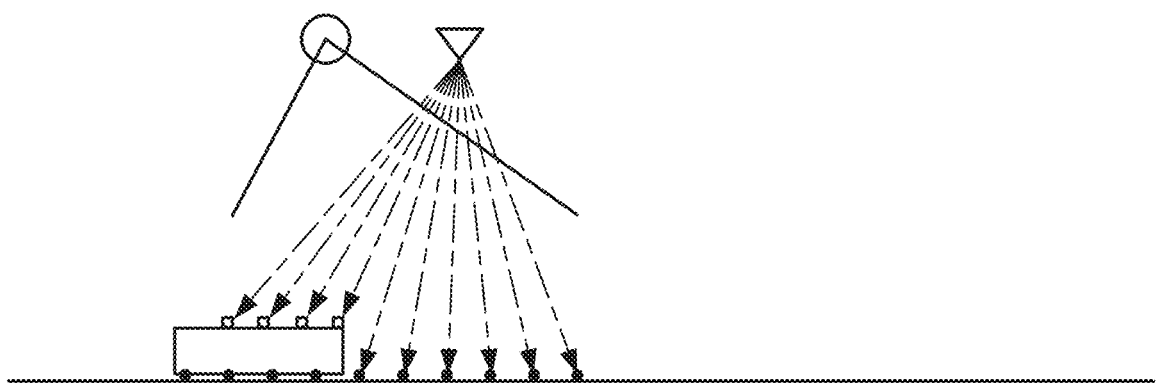

FIG. 8 is a plan view looking down at such an arrangement, with the laser lines shown in dash. Again, the bold rectangle indicates a camera view of the belt. The circle indicates an illustrative position of a viewing camera; the triangle indicates an illustrative position of the laser projector. The dotted lines show how the container on the belt causes the lines to appear displaced from their nominal positions, as seen by the camera. In locations where the laser lines appear straight along their intended paths, the system can infer the belt is empty. Again, such regions of imagery can be disregarded, and associated processing resources can be applied elsewhere. (FIG. 8A is a side view of the same arrangement, with small black dots indicating where the laser lines should fall if the belt is empty, and small squares indicating how the laser lines are displaced in the presence of an item on the belt.)

Many items on the belt may be crumpled or curved, so the straight laser lines may be distorted into non-linear traces when intercepted by such item surfaces. The angles and configurations (e.g., straight vs. linear) of these traces reveal information about the character and local orientation of object surfaces. For example, displaced lines that are straight indicate they are illuminating a planar surface. A planar surface on which two lines parallel lines are detected, with a line spacing wider than normally projected onto the belt, indicates the surface is tilted away from the laser projector (and vice versa). Curved laser lines indicate projection onto a curved surface. Etc.

Knowledge of whether an item on a particular location of the belt presents a curved or flat surface, or a surface tilted towards the laser projector, or away, can be used to tailor the set of DLS seeds applied in attempting detection of a watermark reference signal at such location. One set of seeds can be used when a curved surface is indicated at a particular location; a second set of seeds can be used when a planar surface tilted away from the laser projector is indicated; a third set of seeds can be used when a planer surface tilted towards the laser projector is indicated, etc.

The camera used in such embodiment can be dedicated to laser line detection. Alternatively, imagery captured by another camera, such as the camera used for watermark reading, can be analyzed for presence of the laser lines at their expected locations.

In a related arrangement, a depth sensing camera is used to image the belt, producing a depth map image from which occupied and empty regions of the belt can readily be distinguished. A suitable depth map camera is the Intel RealSense 435, a stereo vision-based system with a global shutter image sensor that can operate at speeds up to 300 frames per second. Its frame captures can be synchronized with frame captures and flash illumination from the watermark sensing camera system. The bright flash helps reduce noise in the resultant depth data. Similar to the laser line example just-discussed, the depth map image reveals which item surfaces are curved and whether they curve in the direction of belt travel or in the direction across the belt (or in between). It reveals which item surfaces are planar, and the directions towards which such surfaces tilt. Such gross classification of surface type can be used to select a corresponding set of DLS seeds that has been tailored for use with such type surface.

Black and very dark items may be difficult to detect in the detailed depth sensing arrangement, due to the low levels of light reflected to the sensor, yielding noisy depth data. The depth data can be examined for excerpts with high local variance (i.e., high local noise), and where found can be treated as possibly indicating the presence of dark items. Corresponding excerpts of the watermark imagery can then be analyzed, irrespective of the absolute values of the depth data indicated by the depth sensing system.

Similarly, specular reflection from shiny plastic surfaces can confuse stereo vision depth sensing, since the location of the reflection in the field of view can depend on the position from which a shiny surface is imaged. That is, the location of the specular reflection is not an invariant landmark in the scene. Again, such confusion can yield noisy sensor data, with one or more sudden shifts in the reported depth at locations around the specular reflection. Again, regions in the field of view having such aberrations in reported depth data can be treated as likely having items that merit watermark analysis. (Put another way, only scene regions characterized by depth data consistent with the varying distances to belt locations, with local noise below a fixed threshold value, should be trusted as truly empty, and thus safe to ignore.)

A third arrangement for identifying empty regions of the belt (or, similarly, identifying occupied regions of the belt) is based on belt occlusion.

A conveyor belt is initially homogenous in appearance, typically black. However, through use, the belt becomes scarred and stained. (Even when the belt is new there is a visible seam where the two ends of the belt are joined to form a loop.) These patterns repeat in captured imagery as the belt loops around and reappear in the camera's field of view. If a scar or stain pattern normally reappears at intervals of about ten seconds, but at one such interval does not reappear, this indicates the view of the belt is occluded, i.e., by an item on the belt. By noting the presence or absence of expected belt patterns in captured imagery, the system processor can discern whether a particular region of the belt is empty or occupied.

In a particular embodiment, the belt is "fingerprinted" when the conveyor is first turned on, and runs empty for a brief interval under illumination by the light system. As the belt travels, the camera captures image frames at the usual rate (e.g., 150 or 300 fps), "learning the belt" so to speak. The sequence of reference images captured from a full cycle of the empty belt serves as a template from which the depicted excerpts of empty belt can thereafter be recognized, e.g., by pattern matching, such as correlation.

In a brute force embodiment, a new image captured during waste processing is correlated against each of the reference images gathered in the initial fingerprinting phase of operation at different spatial alignments, to find pixel patches that exhibit high correlation. If the captured image depicts a portion of vacant belt, then pixels in that excerpt of the captured image should have a high correlation with a corresponding set of pixels in the reference imagery that depict the same portion of belt. A map of correlation strength can be produced. Where the correlation strength exceeds a threshold value, the system can infer that the corresponding region of the belt is vacant.

The brute force method need not be used. The speed of the belt is known from a belt speed monitoring arrangement, so the same excerpt of belt reappears in the camera field of view at known intervals (e.g., about every ten seconds, in the case of a 30 meter belt loop traveling at 3 meters per second). Thus, the captured image need not be correlated against all of the reference images. Instead, correlation can be checked against only a dozen or so candidate reference frames, corresponding to the excerpt of belt that is known to be within the camera field of view when the new frame of imagery is captured ("proximate images").

Moreover, the correlation operation need not consider all possible 2D alignments of candidate reference images with the new image. The belt does not move much laterally; its movement is essentially in one direction. So while the system can check for correlation between each candidate reference image and the new image at all possible spatial alignments in one dimension, it need check for zero or only a few different spatial alignments (e.g., offset by plus or minus up to a dozen pixel columns) in the other dimension.

Figure 9:
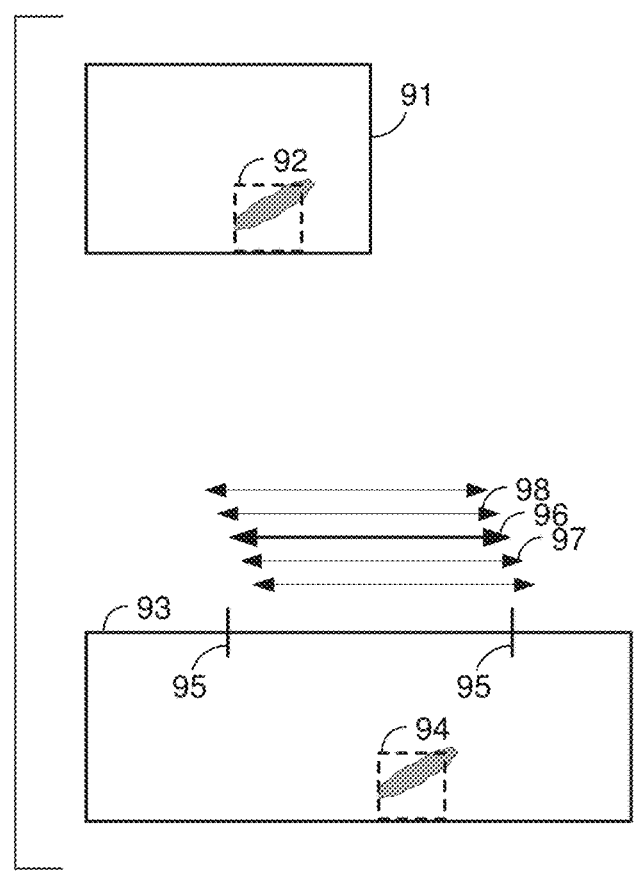
FIG. 9 illustrates how newly-captured belt imagery can be correlated against previously-captured belt imagery to identify an empty region of belt.

Such an arrangement is illustrated in FIG. 9. A newly-captured captured image frame 91 depicts a dark region, in an area 92. A dozen or so proximate images of the belt were collected during one or more previous cycles of the belt, and their image data was collected into a dataset (here shown as a panorama image 93 for convenience) depicting nearby areas of the belt. Included in the panorama 93 is an area 94 depicting a region of the same shape and appearance—apparently a marking on the belt that re-appears cyclically.

The imagery from the captured block 92 is correlated against imagery in the panorama image 93 at a variety of spatial alignments (e.g., spaced apart by one pixel), as represented by the double-ended arrows. One alignment (indicated on a frame-basis by the vertical hash marks 95) yields a peak correlation value. If this value is above a threshold value, the newly-captured image data is not regarded as depicting new waste items, but rather is classified as depicting something seen before—the belt. Such area of the newly-captured image frame 91 is consequently flagged as empty.

The correlation value may be regarded as a match metric—indicating likelihood that the area of belt being analyzed is empty. The metric may be refined by considering how "peaky" the peak correlation is. That is, whether the peak correlation is substantially above neighboring correlation values, or whether it is only modestly above. In one scenario the peak correlation value may be 0.9 (shown at the spatial alignment indicated by arrow 96 in FIG. 9), and the correlation value at an adjoining correlation (e.g., offset by one pixel, indicated by arrow 97) may be 0.6. In a second scenario the peak correlation value may again be 0.9, but the adjoining correlation may be 0.2. The latter correlation is more "peaky" than the former because the difference in adjoining correlation values is larger. This latter scenario is more strongly indicative of an empty area of belt.

In a particular embodiment, the peak correlation value is combined with the difference between the peak correlation value and the adjoining correlation value. One suitable combination is a weighted sum, with the peak correlation value given a weighting of 1.0, and the difference being given a weighting of 0.5. In such case the former scenario results in a match metric of 0.9+0.5(0.3)=1.15. The latter scenario results in a match metric of 0.9+0.5(0.7)=1.35. If the threshold is 1.25, then the image area in the latter scenario is flagged as empty, whereas the image area in the former scenario is not (and thus is eligible for analysis to identify watermark data).

In a further refinement, the peak correlation is compared against two adjoining correlation values (i.e., correlations indicated at both spatial alignments 97 and 98 in FIG. 9), and the larger difference is used in the weighted combination. If correlations are performed at offsets across the belt, not just along its length, then there may be four adjoining correlation values. Again, the larger of the resulting differences can be used in the weighted combination.

The matching operation can be aided if synchronization marks are printed on the edge of the belt, e.g., at spacings on the order of a centimeter. If such marks are visible in a newly-captured image frame, then the belt depicted in such frame can have one of only a few possible alignments with a frame of reference imagery, since the synchronization marks appear at the same positions on the belt in both depictions. This limits the search space of possible 1D alignments between the new and reference image data. (A small margin of error, on the order of a few pixels, may be applied in the search for maximum correlation.)

Still further, the correlation need not be performed on full resolution imagery. The imagery can be down-sampled in resolution and/or reduced in bit depth to reduce the computational burden. In a particular example the imagery is spatially down-sampled by a factor of four. In still other arrangements, the images are oct-axis filtered before correlation, to simplify the task. Thus, derivative data produced from the new imagery can be compared with derivative data produced from the reference imagery to determine empty/occupied regions of belt.

Yet further, the entirety of the new frame need not be considered in matching with reference data. The new frame mostly depicts belt length that was depicted in the previously-captured frame. If the belt is traveling at 3 meters/second, and is being imaged at 300 frames per second, then the belt advances just one centimeter between frames. If the frame captures a depiction of 14 cm of belt along the direction of belt travel, then 92% of the belt depicted in the frame was depicted in the prior frame. Thus, the correlation need focus only on the edge of the captured imagery that depicts belt newly-entering the camera field of view. In an exemplary embodiment, matching is performed only on the top 10% or 20% of the new imagery.

Once a match has been found, at a particular spatial alignment, between a newly-captured image and a reference image, this can simplify subsequent searches for a match. That is, once a spatial relationship (offset) is found that yields maximum correlation between a new belt image and a reference belt image, then nearly the same spatial relationship should likewise exist between the next new belt image and the next reference belt image. And so on for many future images in the respective sequences. The search for spatial alignments that yield maximum correlations for a new frame can thus be focused around the spatial alignment that yielded maximum correlation for a past frame.

(This discussion proceeds as if the reference imagery is a library of distinct reference images. Of course, such images can be stitched into a single long reference image for the entire belt if desired.)

The belt fingerprint arrangement just-described can be self-learning. Imagery captured during one cycle of the belt can be correlated with imagery captured during one or more later cycles of the belt. Regions where the correlation is high (e.g., above a threshold value) between such imagery indicate a consistent pattern on the belt—not a transient waste item. If similar correlation is not found between such imagery and the original reference imagery, this indicates that an item is present on the belt, or that a new pattern (e.g., a new stain) has appeared on the belt. If analysis of still later frames shows such pattern persists then reference imagery can be updated to include the new pattern.

In some embodiments, the initial fingerprinting of the belt by capturing imagery of the empty belt is not needed. Instead, the reference imagery is assembled on-the-fly from images of the belt carrying waste. Patches of such imagery that are found to highly correlate between different cycles of the belt can be inferred to depict the belt itself; not waste. Such patches are compiled in a data structure representing the composite empty belt.

That is, a method employing certain aspects of the technology concerns determining appearance of an empty conveyor belt from images of the belt conveying items. Such method includes capturing images of the belt during operation conveying items, where the items do not always cover the belt. An image excerpt is identified depicting a portion of the belt in one image that correlates, with a correlation value exceeding a threshold, with an image excerpt captured during a previous cycle of the belt. This identified excerpt is added to a data set indicating appearance of the empty conveyor belt. The foregoing acts are repeated to assemble a patchwork collection of image excerpts representing appearance of the empty conveyor belt.

By comparing newly-captured imagery with the reference imagery, areas of empty belt can be detected, and computational resources can be directed from such areas towards other areas of the belt.

Applicant has discovered that fixed pattern noise in the camera system, e.g., due to processing variations among photodetectors in the sensor, or local aberrations in the lens, can interfere with the foregoing correlation operations—indicating a baseline of correlation when there is none. To reduce such problem a dark frame subtraction technique can be used. For example, at recurring intervals during operation of the sorting system a frame can be captured with none of the illumination LEDs active (e.g., once or twice every five seconds). Given the short exposure intervals, ambient light has been found to have nil illumination effect, and the resulting image is akin to that which might be captured with a lens cap over the camera lens. The pixel values from this dark image frame can be subtracted from counterparts in the other captured image frames to subtract the "fixed pattern" effect.)

That is, a method employing certain aspects of the technology involves processing plural images of a conveyor belt, produced by an imaging system that captures images coincident with flashes of illumination, yielding plural arrays of illuminated pixel data. Occasionally an image is captured without any flash of illumination, yielding a relatively dark frame array of pixel data. This relatively dark frame array of pixel data is subtracted from each of the plural arrays of illuminated pixel data.

Figure 10:
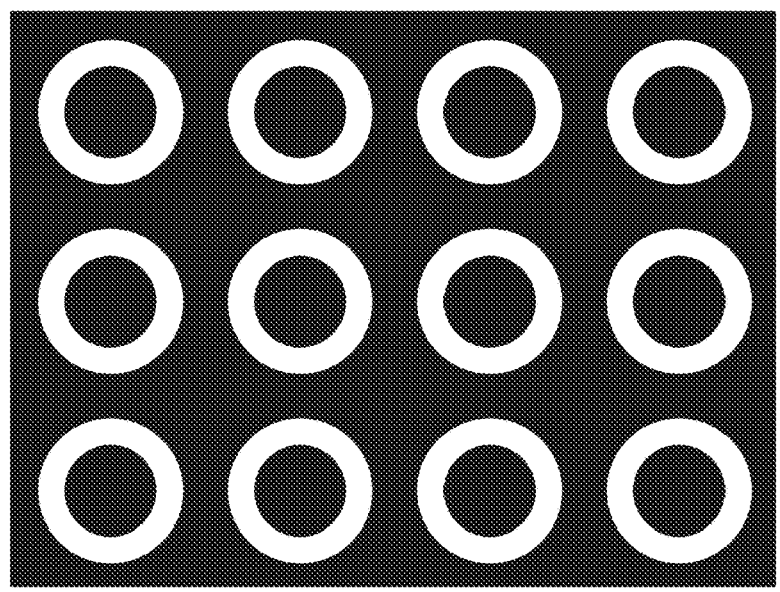
FIG. 10 illustrates a pattern of markings that can be formed on a conveyor belt to facilitate detection of empty excerpts of the belt.

Instead of fingerprinting the belt to sense where scar/stain patterns are revealed or occluded, the belt can be printed with a pattern to serve a similar effect. Indicia such as dots, circles, lines and cross-hairs may be used, which can rapidly be identified by simple pattern recognition algorithms. In a particular embodiment white circles are printed across a black belt, as illustrated by FIG. 10. The circles are centered in one inch cells, within a virtual grid of such cells covering the belt. Each circle is 0.75 inches in diameter, and is formed of a line that is 0.15 inches in width.

In this particular embodiment, imagery of the belt, e.g., captured for watermark detection, is copied and converted into a binary image by thresholding and Gaussian filtering. Edges are next found, such as by application of the Canny algorithm. Finally, the edge points are analyzed using a Hough transform to find circles of the known 0.75 inch diameter. Grid cells in which such full circles are detected are known to be empty regions of belt and thus are excluded from watermark processing (or, inversely, grid cells in which full circles are not detected are analyzed for the presence of the watermark reference signal, etc.).

In another such arrangement the belt can be fabricated or treated with reflecting particles (glitter-like)—the specular reflections from which indicate the camera is seeing bare belt, so no watermark extraction is needed.

In an illustrative embodiment, successive image frames are captured under different spectral illumination (e.g., blue, red, or infrared). Features that are visible with one illumination may be invisible with another. Groups of several (e.g., two or three) successive frames taken under different illumination spectra can be spatially-registered and combined to yield a composite greyscale image frame. A new composite frame may be produced as each new frame is captured—with the new frame replacing the oldest component frame in the earlier composite frame. In such a composite frame no belt feature is likely to remain invisible. (The differently-illuminated frames may be given equal weightings to form the composite frame, or differently-illuminated frames may be assigned different weights. Spatial registration can be performed on the basis of feature matching. Alternatively, the reference signal has been detected in each of the frames, then combination can be based registration using the reference signals.)

The just-described fingerprinting arrangement can proceed on the basis of such composite frames. Additionally or alternatively, the detection of watermark reference signals and/or reading of payload data can be performed on such composite frames. (So, too, can artificial intelligence-based recognition.)

While time is one computational resource that can be reallocated if empty belt imagery is detected, there are others, such as memory and processor cores (more generally, hardware resources). By being able to allocate hardware resources away from where they are not needed to where they are, faster and better results may be obtained.

Another circumstance—other than belt emptiness—in which computational resources can be conserved is when the item occupying a region of belt is known to not need (further) watermark processing. This can happen because, at the high frame rates typically involved, there may be a dozen or so images depicting each item as it passes across the image frame—each depiction being advanced about 1 cm from the previous depiction. If a watermark is read from an item in one frame, and the item will be depicted in the next ten frames too, that the region occupied by that item can be ignored as the location of such region steps linearly across the following frames. (Additionally or alternatively, blocks adjoining that region can be analyzed in subsequent frames to discover the extent of the watermarking, and thus learn more information about the extent of the item. Such analysis can be shortcut since pose data from the earlier watermark read is a starting point for estimating pose data for watermark reads in subsequent frames—again conserving processing resources, enabling other regions to be more intensively analyzed.)

Thus, a method employing certain aspects of the technology can include capturing a sequence of images with a stationary camera that views a moving conveyor belt carrying items in a material stream, where the items in the material stream advance a fixed distance between image captures. In one of the captured images, an attempt is made to read a 2D machine readable code from imagery corresponding to a first region on the belt, and this attempt is successful, yielding payload data. In a next of the captured images, no attempt is made read a 2D machine readable code from imagery corresponding to a second region on the belt, where the second region is the first region advanced by the fixed distance. Computational resources saved by not attempting to read a 2D code from the second region are applied to attempts to read a 2D machine readable code from other regions of the second captured image.

More generally, it will be recognized that one aspect of the present technology is determining how intensively to analyze image data in an attempt to find or recover watermark information, based on how much of the image data depicts empty or known belt Returning to DLS seeds, a further optimization is to tally how often each of the DLS seeds succeeds in yielding a successful decode. That is, count how often a successful watermark decode operation is based on reference signal pose parameters iteratively derived from each of the seeds, e.g., in the form of a histogram or other data structure. Such data can be compiled over vast numbers of image frames (e.g., ten million frames, which corresponds to about 10 hours of operation, at 300 frames/second). Seeds that yield successful watermark decodes are maintained. Seeds that don't yield successful decodes are discarded. Seeds can be applied in order of their success rates, so that if reference signal detection time must be curtailed for a block, the most promising seeds will have been applied first.

New seeds with different affine transforms can be introduced when others are discarded. The new seeds are similarly tested over millions of image frames. (The new seeds can extend the four-dimensional envelope of sampling subspace into new regions, or can more densely sample the existing sample subspace.) Over time an optimized set of seeds evolves, comprising only seeds that have a history of success.

Seeds that were earlier discarded may be tried again by the system hours, days or weeks later, on the chance that the composition of the waste may have changed so that seeds which formerly failed to lead to successful decodes may later be found to do so. The system thereby learns and adapts its operation, so that the set of seeds that is used this week is commonly different than the set of seeds that were used last week.

Thus, a method employing certain aspects of the technology concerns detecting coded markings on surfaces of items depicted in different images, where the coded markings each includes a common reference signal that has different appearances in the different images depending on the poses with which the surfaces are depicted in the images. The poses are each characterized by a respective set of pose parameters. The method includes receiving seed data including plural different sets of pose parameters, and receiving an image. Different sets of the pose parameters of the seed data are tested to determine which particular one of the tested sets of pose parameters best describes the appearance of the reference signal within the received image. A data structure, such as a pose success histogram, is updated to indicate which particular one of the tested sets of pose parameters best described the reference signal appearance. This is repeated a thousand or more times with different images, adding data to the histogram. One set of pose parameters is then identified for removal from the seed data, based on the data in said pose success histogram (e.g., the historically least-successful set of pose parameters), yielding modified seed data. A further image is then received, and different sets of pose parameters are tested from this modified seed data to determine which particular one of the tested sets of pose parameters best describes the appearance of the reference signal within the further image. This determined set of pose parameters is then refined to still better describe the appearance of the reference signal within the further image. A payload is then extracted from the further image using the just-refined pose parameters.

An increase in robustness can further be achieved by using the image sensor (e.g., the Sony IMX425) in 12-bit mode rather than the usual 8-bit mode. This provides two additional least significant bits, and two additional most significant bits.

The two additional least significant bits offer two bits of greater precision, by which very small variations in light reflection (which are not uncommon in watermark signaling) can be discerned. These extra bits sometime make the difference between a reference signal being detected from a block of imagery or not, or between a payload from being successfully decoded or not.

The two additional most significant bits extend the saturation limit of the sensor. Features that produce identical 255-value signals in an 8-bit image representation may be distinguished as different, again leading to gains in reference signal detection and watermark payload recovery. Additionally, these most significant bits enable signal recovery from item surfaces that extend high above the belt. Such surfaces are more brightly illuminated due to their proximities to the light source. Features in such regions that are washed-out by saturation in 8-bit sensors can contribute useful reference signal and payload signal information when 12-bit mode is used.

For similar reasons, sensors with 14- and higher-bit capabilities can likewise provide still further performance improvements.

Watermark extraction must typically occur in essentially real-time, if the information thereby obtained is to be used to control sorting. Some information, however, is not so time-critical. One is collection of statistics, such as counts of different products produced by a particular brand (e.g., cola, diet cola, and root beer). Another is tracking return of serialized items. Imagery can be collected as the belt is running, and archived for later, offline (perhaps cloud-based) analysis to extract this and other information that is not required near-instantly for sorting.

Additional Details

Figure 11:
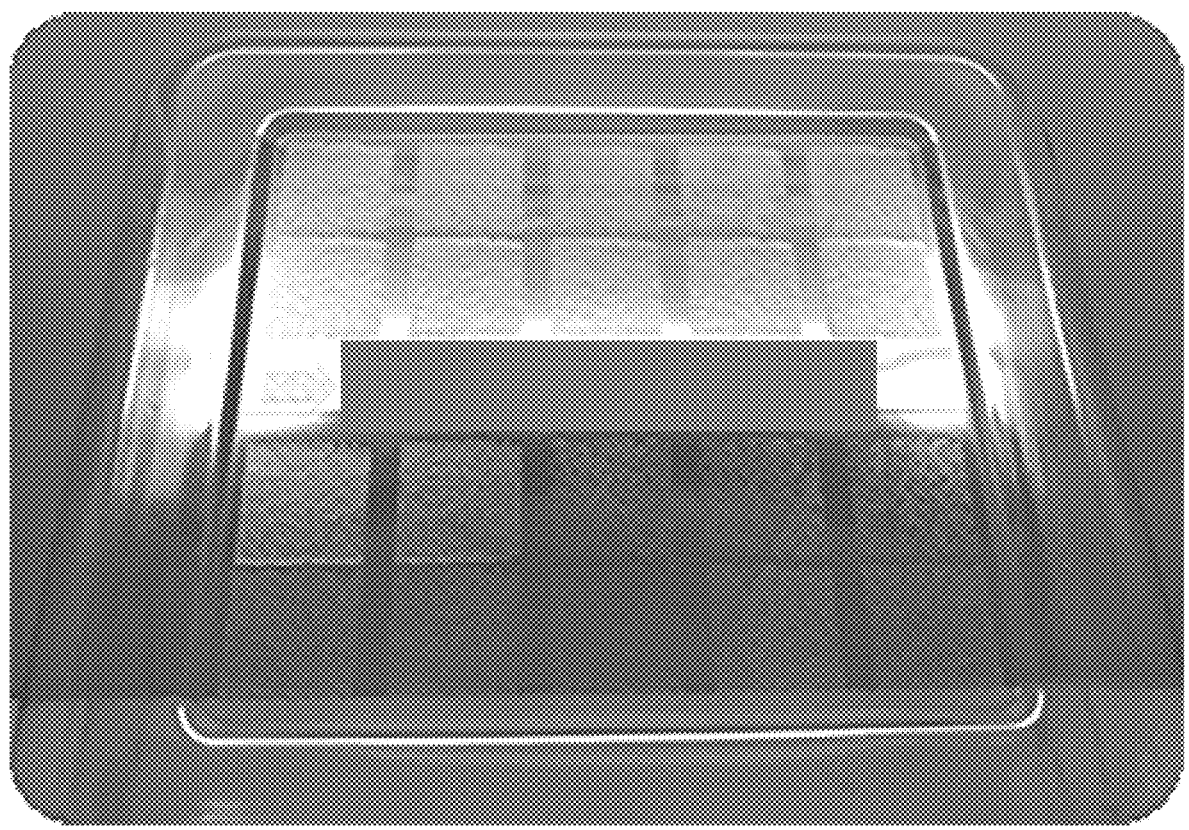
FIG. 11 shows a plastic lid thermoformed with various signal pattern patches.

Applicant conducted various tests on thermoformed plastic surfaces, formed from molds marked with signaling patterns of different varieties—both continuous (continuous tone) and sparse. FIG. 11 depicts one such test sample—a container lid made of recycled PET, which was shaped to include a multitude of test patches of sparse dot patterns (as detailed in publication 20190332840), with different dot densities and dot sizes.

Surprisingly, applicant found that more signal (i.e., more plastic deformation in accordance with watermark signal) does not lead to more detection. Instead, applicant found that sparse markings detect more reliably than continuous markings. Moreover, applicant found that fewer dots in the sparse pattern lead, to a point, to more robust signal detection.

One method of assessing signal robustness is to capture imagery of a textured surface, and then add noise to the imagery before attempting data extraction. The amount of noise that an image can tolerate, while still yielding better than 50% decoding success, is a metric of signal robustness. A related method proceeds similarly, but attempts watermark reading in the presence of increasing levels of gaussian blur, to determine at what blur level 50% decoding success is still achieved.

Figure 12A:
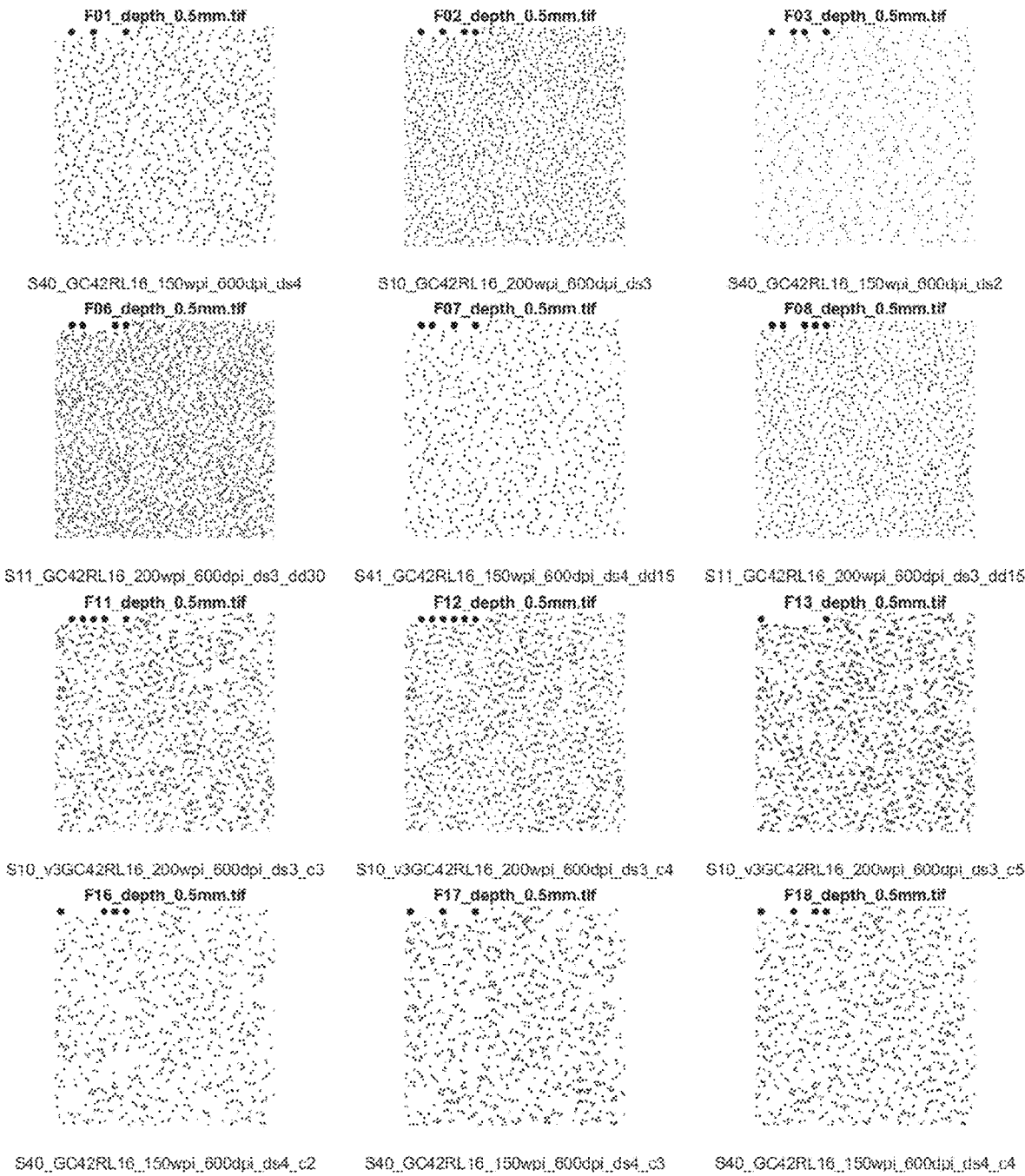
FIGS. 12A and 12B shows a variety of signal patterns, with associated parameters.
Figure 12B:
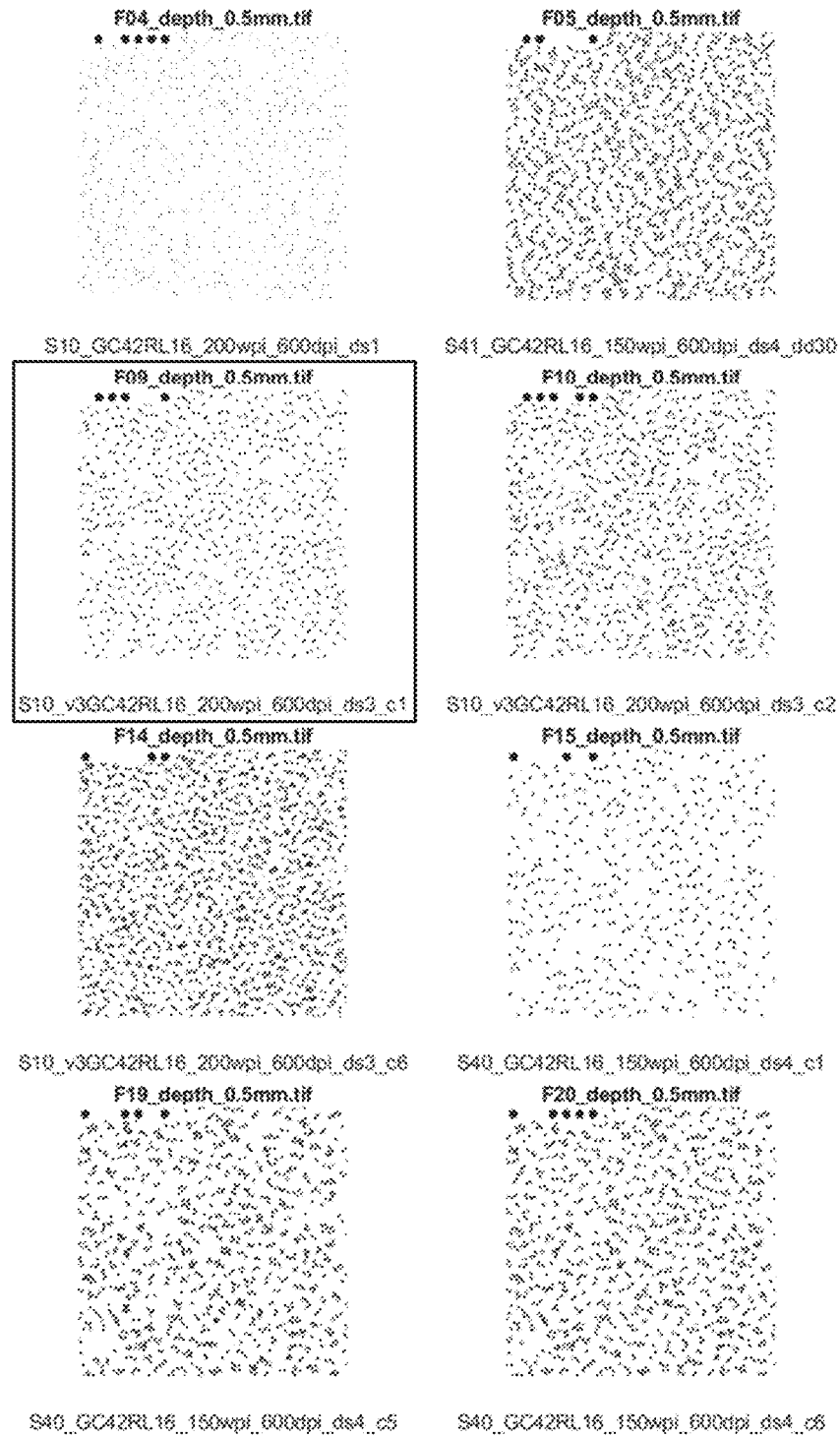

Such techniques were applied to a great number of samples, variously configured with different parameters (e.g., the percentage of available locations that are marked, the size of the dot at each marked location, and the embossing depth). An illustrative set of 20 test samples (4 rows by 5 columns) is shown in FIGS. 12A and 12B. (These figures comprise a single table of 4 rows and 5 columns when placed side by side. The patterns are not accurately depicted at this scale due to reprographic limitations, but the illustrated patches give a gross sense as to differences.)

The fourth sample in the second row (outlined with a rectangle in FIG. 12B) has a lower legend that ends with 200wpi_600dpi_ds3_c1. This indicates the sample has 200 watermark elements per inch, and is rendered with a resolution of 600 dots per inch. The "ds3" indicates that each mark approximates a circle of diameter 3 pixels at the rendering resolution, e.g., is a 3×3 square array of marks. The "c1" indicates that 10% of available marking locations are actually marked, or 5% of all locations. (The "available" marking locations are regarded as being half of the total number of locations, since the densest sparse marking is typically a checkerboard pattern with every-other location marked.)

Legends underneath many of the samples are truncated due to space constraints, e.g., lacking the "c1" data. Others abbreviate "c1" as "dd10c3" (and "c2" as "dd20," and "c3" as "dd30," etc.).

All of these patches have an embossing depth of 0.5 mm, although other depths were also tried.

Figure 13:
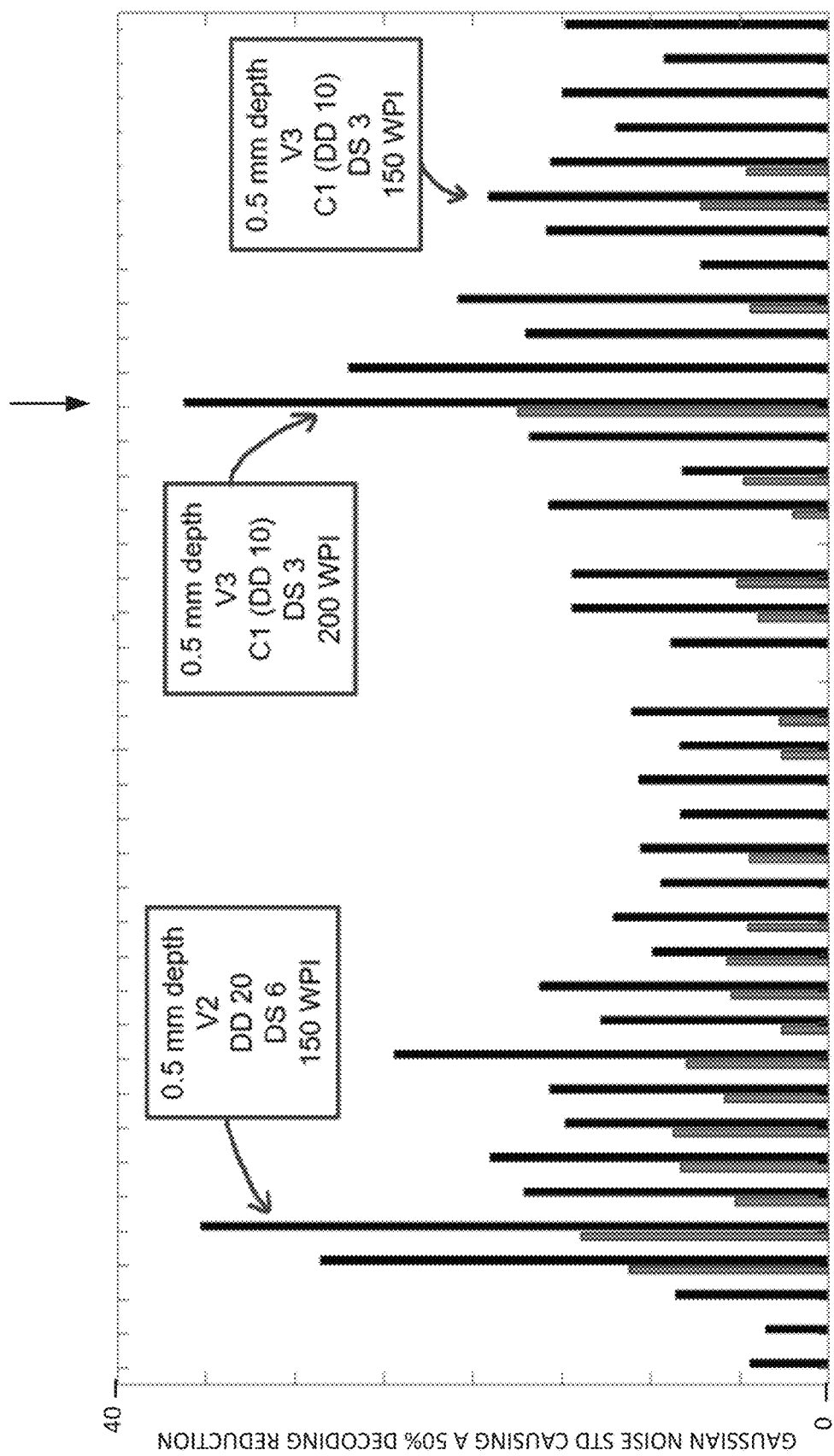
FIG. 13 details certain robustness measurements made on thermoformed signal patterns of different varieties.

FIG. 13 illustrates some of the robustness data gathered by adding Gaussian noise to imagery of various samples, and attempting decoding. Robustness data for the 20 samples of FIGS. 12A and 12B are plotted beginning mid-way along the horizontal axis, with each pair of bars corresponding to a single sample, read across row by row. Data for the rectangle-outlined sample of FIG. 12B are indicated by the downward-pointing arrow at the top of FIG.

13. The left bar of each pair indicates relative decoding robustness for a thermoformed plastic sample positioned on a neutral grey background, lying flat on a conveyor belt, embossed side up. The right (and routinely-taller) bar of each pair indicates robustness for the plastic sample similarly oriented but elevated three inches above the conveyor belt.

A few of the best-performing samples are indicated by the callout boxes in FIG. 13. Each box specifies, for the corresponding pattern, (a) the fraction of available locations that are marked (e.g., "DD10"), (b) the dot size (e.g., "DS3"), (c) the embossing depth, and (d) the WPI. (The embedding protocol, V2 or V3, is also noted. These protocols correspond to the Type 2 and Type 3 watermarking algorithms, reviewed above, by which mark locations are selected, and are further detailed in publication 20190332840 and pending application Ser. No. 16/849,288, filed Apr. 15, 2020.) Interestingly, the "DD10" ("C1") patterns, for which only 5% of the surface area is marked, were routinely among the best performers, with certain of the "DD20" patterns also performing well. Generally speaking, clumping more dots together to form marks (e.g., 3 instead of 2) increased robustness, as did providing more isolation between marks (a corollary to marking less of the surface area).

The data of FIG. 13 is presented in tabular form in the following table:

| PATCH | ON BELT | 3" ABOVE BELT |
| --- | --- | --- |
| ROW = 1; COL = 1 | 0 | 0 |
| ROW = 1; COL = 2 | 0 | 8.91 |
| ROW = 1; COL = 3 | 3.96 | 14.42 |
| ROW = 1; COL = 4 | 5.2 | 14.43 |
| ROW = 1; COL = 5 | 0 | 0 |
| ROW = 2; COL = 1 | 2.03 | 15.73 |
| ROW = 2; COL = 2 | 4.82 | 8.21 |
| ROW = 2; COL = 3 | 0 | 16.83 |
| ROW = 2; COL = 4 | 17.51 | 36.21 |
| ROW = 2; COL = 5 | 0 | 26.99 |
| ROW = 3; COL = 1 | 0 | 17.05 |
| ROW = 3; COL = 2 | 4.43 | 20.82 |
| ROW = 3; COL = 3 | 0 | 7.24 |
| ROW = 3; COL = 4 | 0 | 15.9 |
| ROW = 3; COL = 5 | 7.22 | 19.12 |
| ROW = 4; COL = 1 | 4.63 | 15.67 |
| ROW = 4; COL = 2 | 0 | 11.97 |
| ROW = 4; COL= 3 | 0 | 15 |
| ROW = 4; COL = 4 | 0 | 9.28 |
| ROW = 4; COL = 5 | 0 | 14.81 |

Tests of robustness in the presence of blur yielded similar results.

Testing also found that plastics marked with sparse patterns, rather than continuous patterns, yielded better decoding robustness in the presence of noise and blur.

FIGS. 14 and 15 show excerpts of some sample imagery captured from three inches above the conveyor belt. FIG. 12 depicts a sample marked at "DD10", and FIG. 13 depicts a sampled marked at "DD30." FIGS. 14A and 15A are counterparts that have been inverted, and contrast-altered, to better depict certain of the differences. The thermoform of FIGS. 14 (and 14A) has about 5% of the area marked, with 95% of the plastic surface following its original, nominal flat contour. The thermoform of FIGS. 15 (and 15A) has about 15% of the area with marked, with 85% of the plastic surface following its original flat contour.

As in other arrangements, the information encoded in the pattern can inform a recycling system as to the type and use of the plastic, and its preferred disposition. For example, the encoded information can identify the manufacturer and the product (for reduced extended producer responsibility, or EPR, fees), whether the item was used for food or non-food packaging, whether the plastic is recyclable or compostable, the composition of multi-layered packaging, etc.

While the just-discussed data particularly concerns thermoformed plastics, the same performance phenomena (less dots, bigger dot sizes, and more dot isolation, all typically yield better robustness) carries forward to other plastic shaping technologies, such as laser shaping. Laser shaping also makes plastic serialization practical, i.e., embedding a different signal in each different instance of, e.g., a run of 100,000 soda bottles. A payload field may be incremented, from one bottle to the next, and a corresponding pattern generated (e.g., according to one of the algorithms detailed in publication 20190332840 and pending application Ser. No. 16/849,288, filed Apr. 15, 2020) and provided to control the laser marker.

Both laser engraving and laser etching can be used to mark and serialize plastics. (Some artisans use the term "engraving" to mean cutting a cavity into the surface, typically by vaporizing the plastic, and use "etching" to refer to heating the top surface of an article to the point that its appearance changes but not to the point of vaporization. Applicant does not observe a strict distinction, but commonly uses the terms interchangeably. Likewise with laser "embossing.")

Different lasers yield different effects with different substrates. For example, a 10600 nm laser (CO2), when applied to PET, is prone to yield an engraving effect, with material vaporized and the remaining surface molten/congealed, and left chaotic from bubbling. This can make such lasers ill-suited for use in marking PET bottles with line art patterns (e.g., Voronoi and Delaunay patterns) due to potential breach of the bottle sidewall, which may be only 10 mils in thickness. In contrast, a comparably powered and focused laser that is tuned to 9300 nm is found to mark PET surfaces with a surface frosting, with minimal vaporization. The frosting provides good visual contrast—both in clear PET and in colored PET (e.g., black). The difference between lasers of such similar wavelengths is due to PET's radically-different absorption (extinction) at different wavelengths. (Of course, in some contexts, the deeper and more chaotic effect of a CO2 laser suits the application.) Other plastics (HDPE, PP, etc.) exhibit similar wavelength-dependent absorption variation.

Much laser marking of plastic is done using so-called fiber lasers, which use a flexible optical fiber to both generate and deliver the light energy, enabling high accuracy at relatively low cost. Such lasers are available for a variety of wavelengths, including 10600 and 9300 nm.

Figure 16:
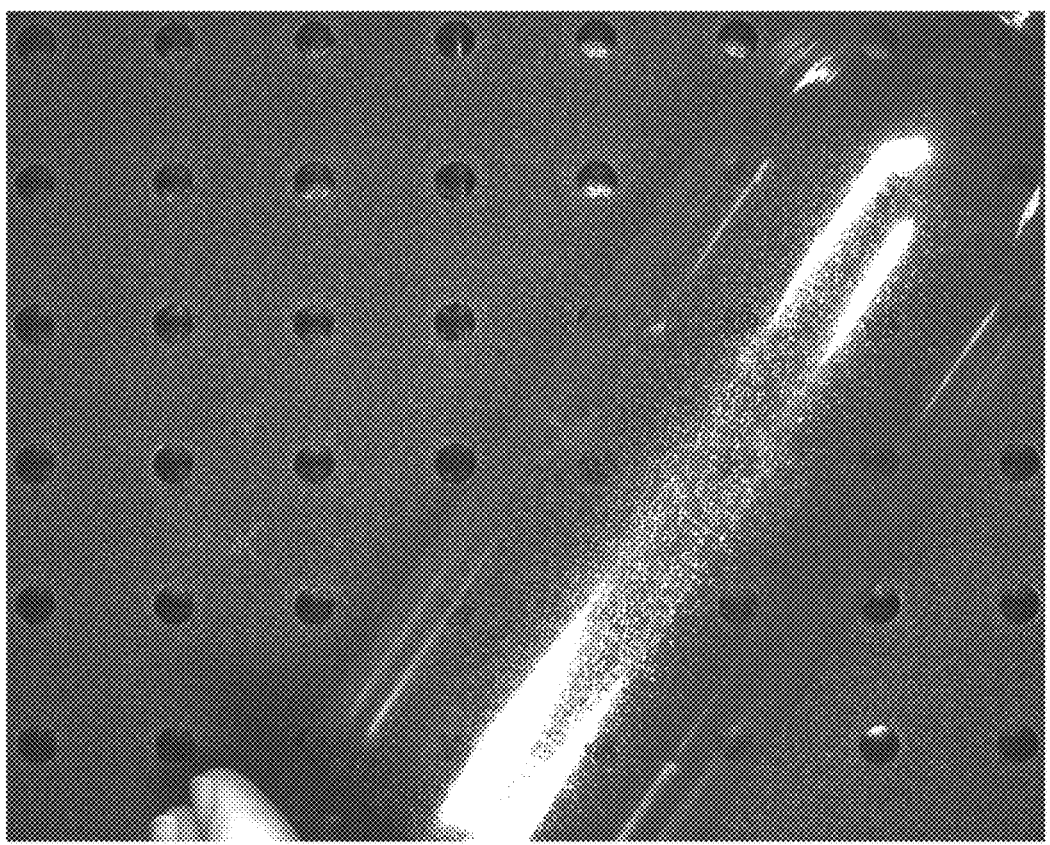
FIG. 16 shows a laser-marked plastic bottle.
Figure 16A:
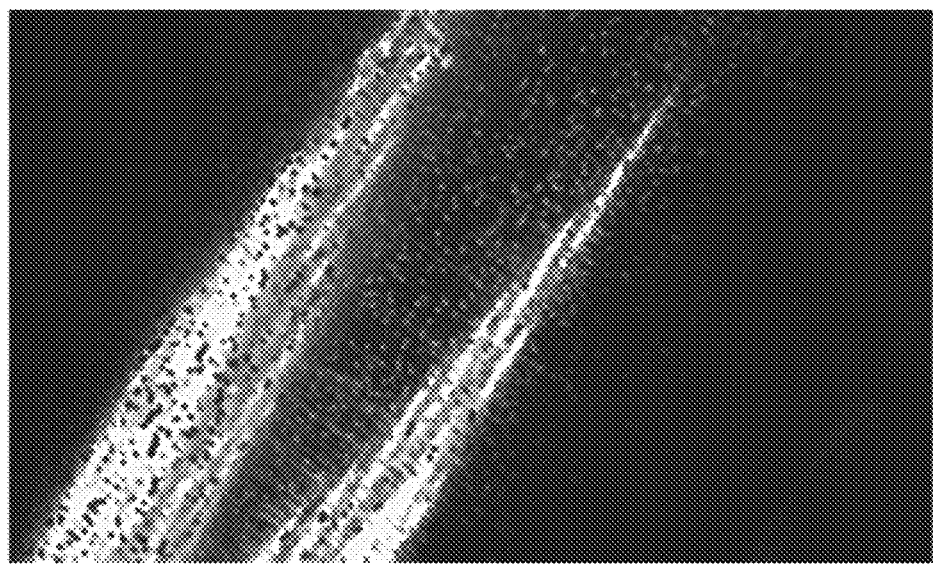
FIG. 16A is an excerpt taken from FIG. 16.

FIG. 16 shows a CO2 laser-marked PET bottle (contrast-adjusted for reproduction purposes). FIG. 16A is a close-up taken from FIG. 16, also contrast-adjusted.

Combinations of Item Identification Technologies

The technologies detailed herein can be used in conjunction with other identification technologies to advantageous effect. One such alternative technology involves spectroscopy, such as near infrared (NIR) spectroscopy.

Spectroscopy systems commonly determine a spectral signature of a plastic resin by identifying the resin's optical absorption (transmittance) at a variety of different wavelengths. Some systems correlate such a spectroscopy signature with reference signatures of known plastics to determine which known plastic provides the best match. Other systems use machine classification techniques, such as neural networks or support vector machines, to similar effect, determining which known plastic has spectral absorption attributes that most closely match those of a container being analyzed. Related techniques rely on fluorescence of plastic items under hyperspectral illumination, e.g., due to fluorescing additives included in the plastic resin. Again, resulting spectral data is compared against reference fluorescence data for known varieties of plastic. All such techniques are here referenced under the term spectroscopy.

Some such methods are further detailed in U.S. patent publications including U.S. Pat. Nos. 5,703,229, 6,433,338, 6,497,324, 6,624,417, 20040149911, 20070296956, 20190047024 and 20190128801.

Figure 17:
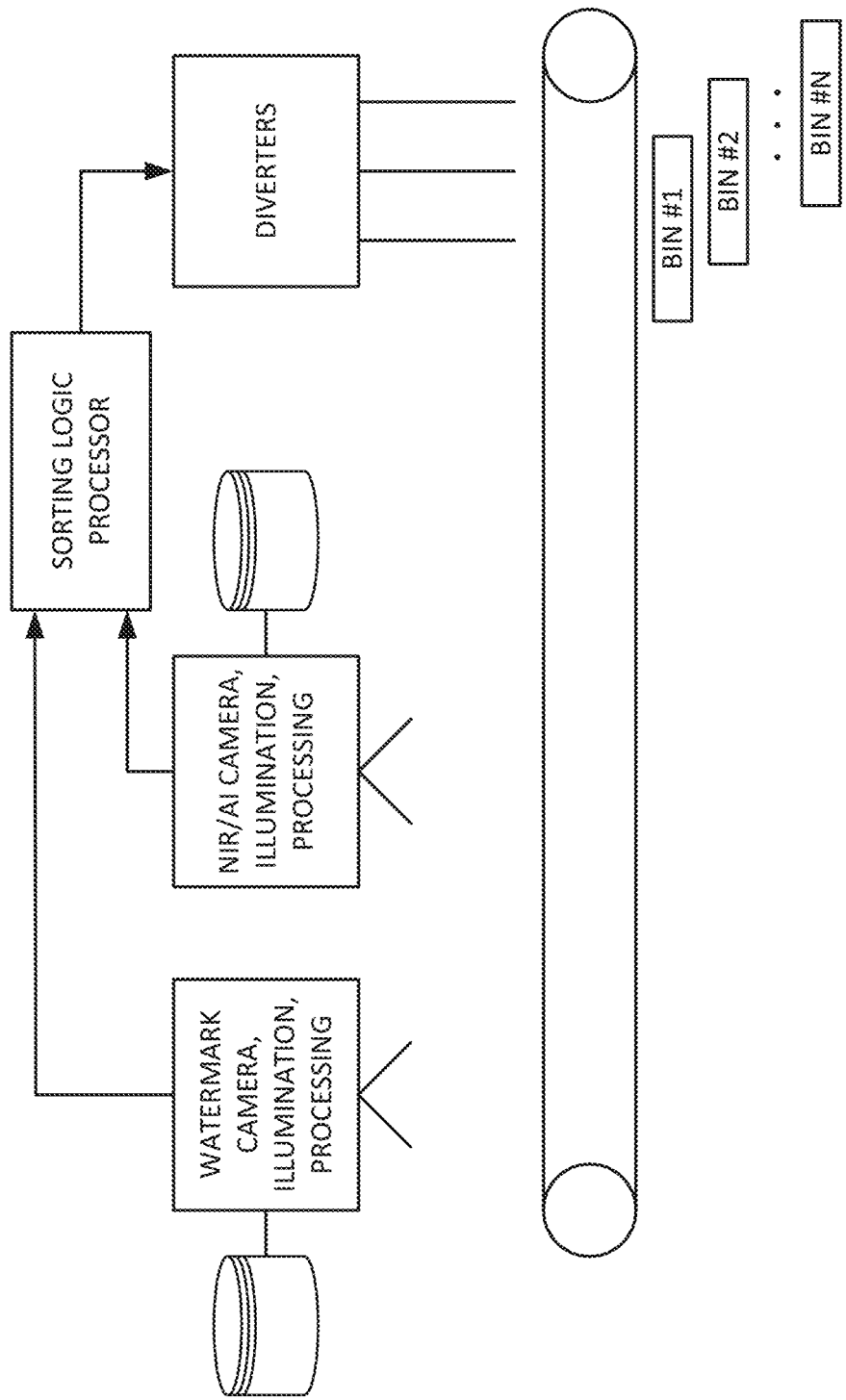
FIG. 17 illustrates a system employing employ certain aspects of the present technology.

An exemplary material sorting facility may include a first detection system adapted for identifying items by watermark data, and a second detection system adapted for identifying items by spectroscopy. Each system uses a different camera system, although this is not required. Typically, the camera system used by the first, watermark reading system is earlier in the processing line relative to the spectroscopy camera system, to permit additional time for the watermark signal to be identified and recovered from the captured imagery before items travel to the region where sorting diversion (e.g., by forced air, or "blowout") takes place. FIG. 17 shows an illustrative diagram. Each identification system is shown with an associated database, which in the watermark case is a resolver database that provides item attribute data associated with different watermark payloads, and in the spectroscopy case is a reference library of known absorption/fluorescence patterns—associating each with plastic identification data.

Each frame captured by the watermark reading camera system is tagged with a timestamp indicating its time of capture. Within each frame, any block or sub-block from which a watermark decoding succeeds is tagged with identification data (e.g., the decoded payload, or a plastic type obtained from a database based on the decoded payload, or a particular diverter that should be activated to deflect the item from the material flow, etc.). Given the fixed geometry of the camera relative to the belt, each position within a captured frame corresponds to a unique spatial belt position. The speed of the belt may be regulated at a known speed. Or the belt speed may be measured by tracking the rate at which a visible feature on the belt processes through camera frames captured at known times. Knowledge of the time an image frame was captured, the belt speed, and the position of an identified item block within the frame, enables future positions of the item to be predicted. The location of the diverter apparatus is also known, as are its timing characteristics. This enables the diverter apparatus to be activated by the sorting logic processor at the instant at which the identified item is properly in position for ejection by the diverter.

Sometimes the watermark-based system and the other (e.g., spectroscopy-based) system will recognize an item, but indicate slightly different spatial positions for it, leading to different diversion parameters (e.g., which air jet and at which instant). One approach is to then average the different spatial positions, and to base the diversion parameters on the average. Alternatively, one system may be given priority in determining the diversion parameters, with any variant parameters indicated by the other system simply ignored. Such priority may be fixed, or may depend on data collected by the systems. For example, if the watermark system reports detection of a single watermark block, then it is known that such detection occurred at just a small physical excerpt from what may be a much larger item (e.g., a watermark block may be less than an inch on a side, and yet such block may appear on a liter drink bottle that is 38 cm tall). Relatively little is thus known about the extent and orientation of the item. In such case, the diversion parameters indicated by the other technology (spectroscopy) may control diversion. In contrast, if multiple watermark blocks (which may be overlapping watermark blocks) are decoded from an item, then more complete data about the extent and orientation of the item is available, in which case the diversion parameters indicated by the watermark system can control diversion. This is illustrated by FIGS. 18A-FIG. 18D.

Figure 18A:
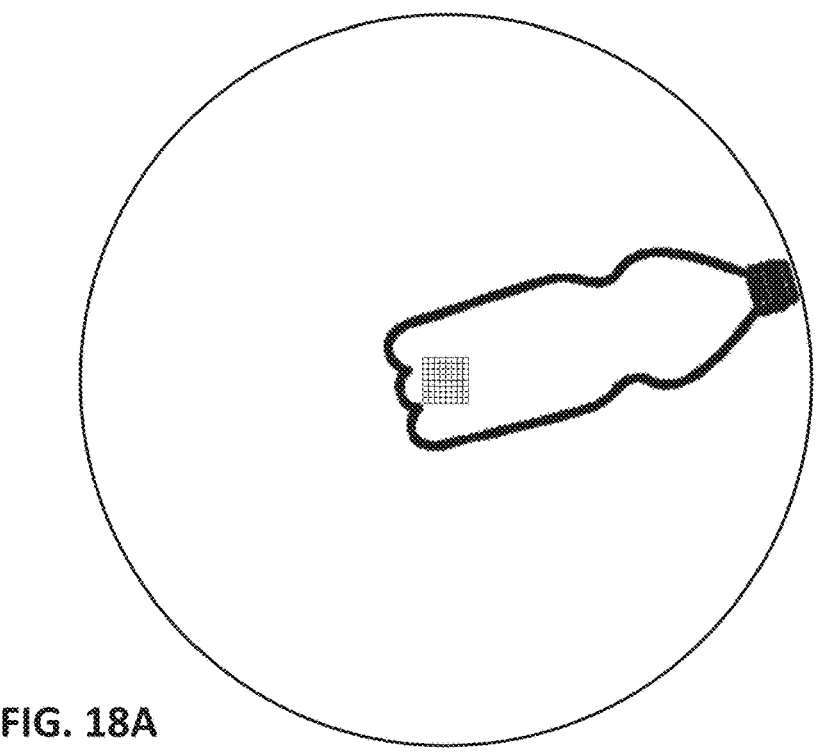
FIGS. 18A-18D illustrate how a bottle bearing a machine-readable mark that identifies the bottle and its shape, enables a range of possible bottle positions to be determined.
Figure 18B:
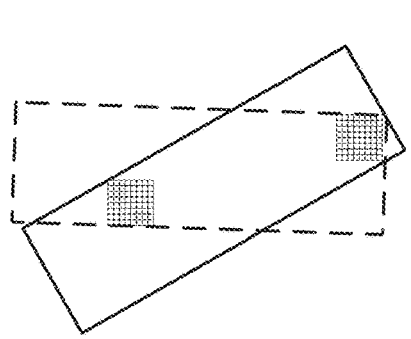
Figure 18C:
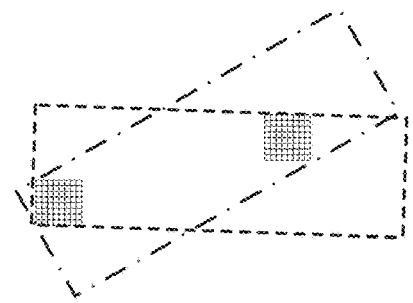
Figure 18D:
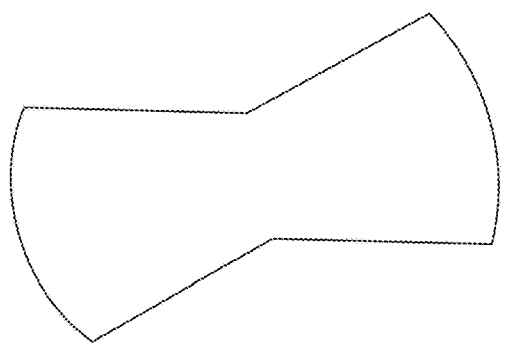

Referring to FIG. 18A, if a drink bottle is identified by data collected at one position on the belt (e.g., by a solitary block of digital watermark data), and the dimensions of the bottle are known (from metadata lookup based on an identifier decoded from the watermark) to be 23.5 cm in height by 6.5 cm in width, then the bottle—if not crushed—can occupy space anywhere within a circle 23.5 cm in diameter, centered on the identified location. If, however, the bottle is identified from watermarking detected at two patches that are 16 cm apart, this distance between the detection locations constrains possible areas on the belt occupied by the bottle; a region smaller than a circle of 23.5 cm diameter can be determined. This is shown by FIGS. 18B-18D. The solid line in FIG. 18B shows one possible position of a 23.5×6.5 cm bounding box that encompasses both locations. The dashed line shows another. FIG. 18C shows another such pair of bounding boxes that encompass both locations. In the aggregate, the geometrical constraints imposed by the two detection locations, and the known dimensions of the bottle, define an hourglass-like shape where the bottle can lie on the belt, as shown in FIG. 18D. Thus, the greater the number of watermark block detections from an item, the greater the information about its extent and orientation, and the more trustworthy such information becomes as a basis for diversion parameters, relative to spectroscopy or other alternative(s).

In still other arrangements a laser-based system for identifying locations of items on the conveyor belt is employed in conjunction with data from one or more of the item identification systems, to control diversion of items of the belt. In yet other arrangements the system can give item-locating precedence to whichever of the two systems is physically-closest to the diverters—reasoning that the item location on the belt may have changed (e.g., due to tumbling) between its sensing by the two systems.

Spectroscopy systems identify plastic type, and watermark systems identify plastic type as well as other item attribute data stored in the resolver database (information that is typically stored there at the time of the item's creation, or before). Some sorting, however, desirably involves criteria not known at the time of the item's creation, but rather describes the item's state on the conveyor. Is it dirty? Does it have a cap? Is it crumpled? Etc. Such factors may be termed state attributes. Machine learning techniques (sometimes termed "AI," "ML," or deep learning, often implemented with convolutional neural networks trained using gradient descent methods) can be employed on the processing line to gather such state information. The present technology includes joint use of AI techniques with watermark and/or spectroscopy techniques to increase the accuracy and granularity with which items are identified for sorting. (Prior art AI techniques that are suitable for such applications are detailed, e.g., in U.S. patent publications 20180016096, 20180036774, 20190130560 and 20190030571 to AMP Robotics, Inc., CleanRobotics, Inc., and ZenRobotics Oy.)

If two analysis systems (e.g., watermark and spectroscopy and/or AI) are used to identify a single container attribute, such as plastic resin type, they may sometimes give conflicting outputs. This can occur, for example, if a spectroscopy system encounters an object of unusual plastic composition for which it does not have a corresponding reference signature, or if an AI system hasn't been sufficiently trained to recognize a particular variety of container. Such a system may identify the best match as being to a different, incorrect, plastic. Conflicting outputs can also occur if a company changes the resin composition of a product container without providing updated plastic information to a watermark resolver database entry associated with that product's watermark payload.

When conflicting outputs occur, the sorting system can treat the object as unidentified, and not divert it to any resin-specific destination. Alternatively, the system may include one or more rules to arbitrate or reconcile among conflicting outputs. For example, a sorting logic processor (FIG. 17) can receive outputs from the two systems and be configured to apply a rule such as: IF watermark reading indicates a plastic type for which a spectroscopy system does not have a reference signature (perhaps polyoxymethylene), THEN the watermark-based resin identification is to be given precedence (i.e., the object is to be sorted in accordance with the watermark-indicated identification); ELSE the spectroscopy-based resin identification is to be given precedence.

Spectroscopy systems typically fare poorly in identifying black and dark plastics, due to the lack of reflected illumination. If an object is recognized to be black (or dark) in reflectance, and the spectroscopy-based system outputs a resin identification that conflicts with a resin identification provided by the watermark-based system, then a rule in the sorting system processor can cause the watermark-based resin identification to be given precedence for sorting purposes, with the spectroscopy-based identification being disregarded. (Black or dark objects can be recognized as such from imagery—which may be collected by the watermark system camera, the spectroscopy system camera or another camera—when the belt is illuminated with multispectral light. Such objects can be characterized by low average pixel intensity, e.g., having an average pixel value below a threshold value, such as 30 in an 8-bit image.)

The sorting logic processor may thus have a rule that (a) IF the watermark system identifies an object as being composed of a resin that the spectroscopy system is also capable of identifying—but did not, and (b) IF the object is not dark (e.g., if it is light or transparent), THEN sort the object in accordance with the spectroscopy-indicated resin (reasoning a brand may have changed the object composition, and the resolver database has not yet been updated); ELSE sort the item in accordance with the watermark identification.

Since spectroscopy and AI identification systems are probabilistic, such systems can produce data indicating confidence in their output identifications. For example, if measured spectral absorption data for an item closely-matches the reference absorption data for a particular plastic (e.g., correlation in excess of 0.9), then the identification can be given a high-confidence grade. If correlation is between 0.6 and 0.9, the identification can be given a mid-confidence grade. If correlation is between 0.3 and 0.6, the identification can be given a low-confidence grade. (In some embodiments, correlation is calculated and used as a confidence grade; in other embodiments a neural network derives a confidence value between 0 and 1.) The rules to arbitrate between conflicting resin identifications can depend on such confidence metrics. For example, precedence may be given to a spectroscopy-indicated resin over a watermark-indicated resin, in the rule set given above, only if the spectroscopy confidence is high- or mid-grade. That is, the rule logic becomes: (a) IF the watermark system identifies an object as being composed of a resin that the spectroscopy system is also capable of identifying—but did not, AND (b) IF the object is not dark (e.g., if it is light or transparent), AND (c) IF the spectroscopy system indicates a confidence of high or mid, THEN sort the object in accordance with the spectroscopy-indicated resin, ELSE sort the object in accordance with the watermark-indicated resin.

Some containers are "sleeved" by a thin layer of plastic (e.g., a shrink label that wraps a bottle) having a plastic composition different than that of the underlying container. When a watermark is decoded from a sleeved bottle, the watermark metadata can indicate the presence of the sleeve layer and its plastic composition, and also indicate the plastic composition of the underlying bottle. If the underlying bottle is transparent PET, for example, watermark identification permits this fact to be determined and the bottle diverted to a bin with other transparent PET bottles, even if the bottle is sleeved in an opaque, colored film of another plastic type. (The sleeve may later be removed and separated in a float tank, since common labels such as polypropylene and polyethylene have a specific gravity less 1.0 and thus float, while PET has a specific gravity greater than 1.0—typically 1.4—and thus sinks.)

Here again, sleeving is a factor that can be employed in reconciling different resin identifications indicated by a watermark (WM) and other (e.g., spectroscopy) identification systems. A sample system may apply the following sequentially-applied rules of reconciliation logic:

IF the watermark indicates a sleeved container, THEN sort per watermark indication of underlying plastic, and end;

IF the watermark indicates the container is composed of a resin that the spectroscopy system is also capable of identifying—but did not, AND IF the container is not dark, AND IF the spectroscopy system indicates a confidence of high or mid, THEN sort the object in accordance with the spectroscopy-indicated resin, and end;

ELSE sort the object in accordance with the watermark-indicated resin.

Figure 19:
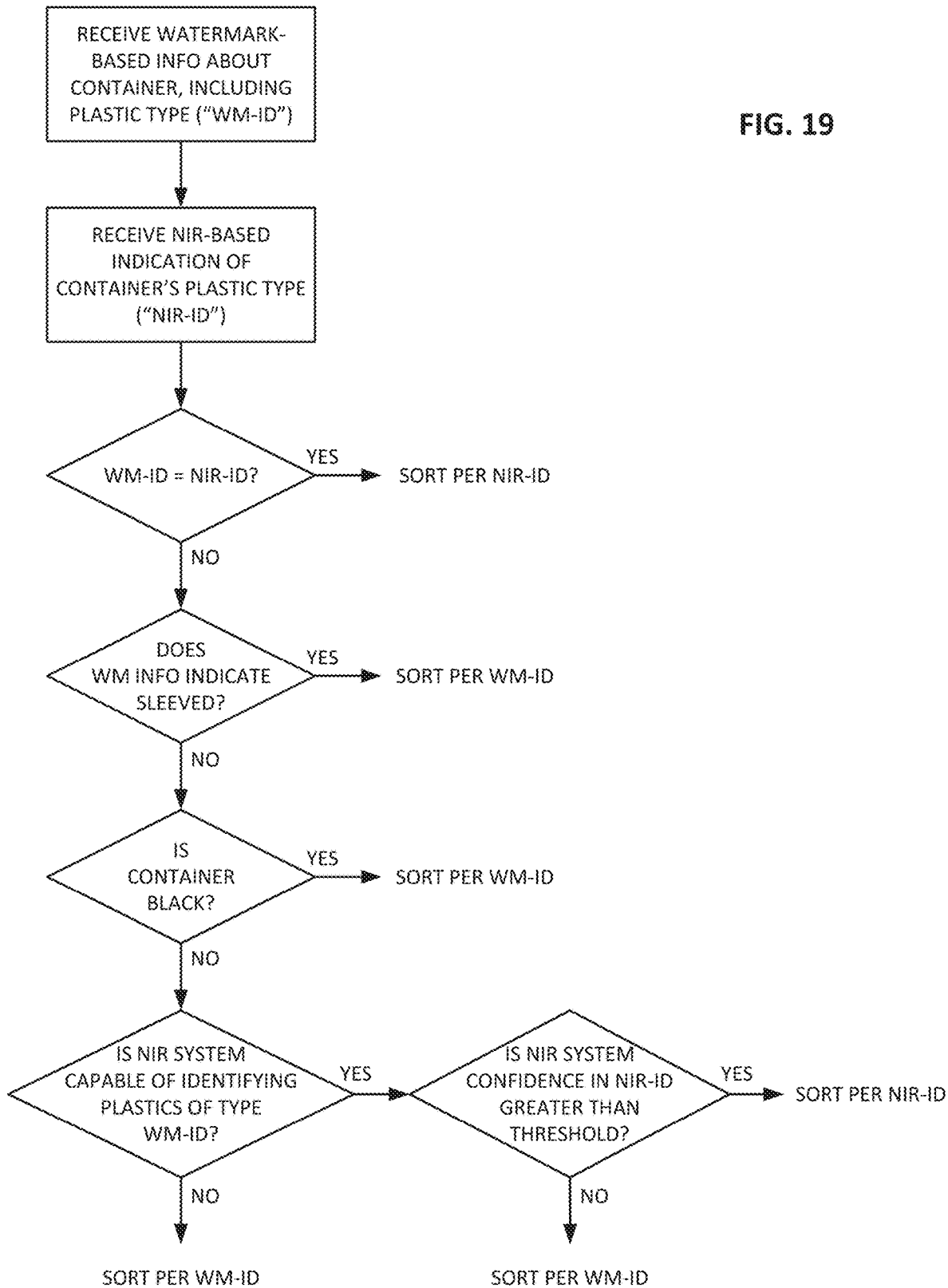
FIG. 19 shows a flowchart of an exemplary embodiment employing an aspect of the present technology.

A variant of this process is shown by the flow chart of FIG. 19.

That is, a method employing certain aspects of the technology can include receiving imagery depicting a container on a conveyor, where the container comprises a first, substrate material, wrapped by a second, sleeve material. A 2D code depicted on the sleeve material is decoded to yield a payload, which indicates a plastic type of the first, substrate material. The container is then diverted into a repository with other containers comprised of said first substrate material, through use of this payload.

(Some items are composites of plastic with non-plastic materials. Examples includes certain disposable coffee cups, which have a plastic interior, and a fibrous paper exterior. The fibrous material provides thermal isolation from the cup's hot contents, while the plastic interior provides water-tightness. The non-plastic exterior of such article can be watermarked—by printing or texturing—to convey a container code which indicates the resin composition of the interior plastic. When encountered in a material flow, such article can thereby be sorted for recovery of the plastic interior, based on imagery depicting the exterior non-plastic medium.)

As indicated, sorting can be based on a combination of item attributes, rather than on plastic type alone. In one such system, spectroscopy is used to identify the object's plastic type. Watermark decoding is employed to determine other object information, such as whether a container was used for food or non-food. A PET food container can then be diverted to a bin for food containers made of PET (bin #1), while a PET container for tennis balls can be diverted to a bin for non-food containers made of PET (bin #2). The contents of the first bin can be sent to a processor for recovery of food-grade PET recyclate, and contents of the second bin can be sent to a processor for recovery of non-food-grade PET recyclate.

In another such arrangement, watermark decoding is used to identify both a container's plastic composition and its food/non-food status. A second system, using a trained AI classifier, visually grades containers as appearing to have more or less than a threshold degree of contamination (e.g., external soiling or residual contents within). Containers that are judged by the watermark system to be of PET resin and food-type, and which are judged by the neural network classifier to have less than the threshold degree of contamination ("clean"), are diverted to one bin. Containers that are judged to be PET and food, but are classified as dirty, are diverted to a second bin. Containers that are judged to be PET and non-food, and are classified as clean, are diverted to a third bin. Containers that are judged to be PET and non-food, and are classified as dirty, are diverted to a fourth bin. Four further bins may be allocated to HDPE containers of the various types. Etc. Each bin of containers can then be processed separately, assuring that recyclates of the highest possible purities and economic values are produced.

Other container attributes on which sorting can be based, jointly with plastic type and/or other factors, include color, whether HDPE is natural or pigmented, whether the plastic is virgin or recycled, whether the container is sleeved, whether the container is a multi-layer structure, age and/or refill count of a serialized refillable container, and whether a cap is present on a container.

As noted, the presence of a cap on a container is an item of metadata that an AI system can be trained to discern. To assure the highest purity recyclate, some recycling processors want to avoid accepting PET bottles with caps attached, as the caps may be made from a different, contaminating plastic. In one particular arrangement, such a capped bottle-discerning AI system is positioned before the watermark reading system, and the former communicates map data to the latter, indicating those positions on the approaching belt where capped bottles have been identified. The watermark reading system can then ignore corresponding areas of imagery captured by the watermark system camera(s). The watermark reading system, or the AI system, can flag the capped bottle's location on the belt so that the bottle is ejected into a collection bin with other capped bottles. Alternatively, the capped bottle can be permitted to travel the length of the conveyor and be discharged with unsorted items. The computational effort saved by the watermark reading system in not processing imagery depicting an item unsuitable for recycling can be applied elsewhere, as discussed earlier in connection with empty regions of the conveyor belt.

Figure 20:
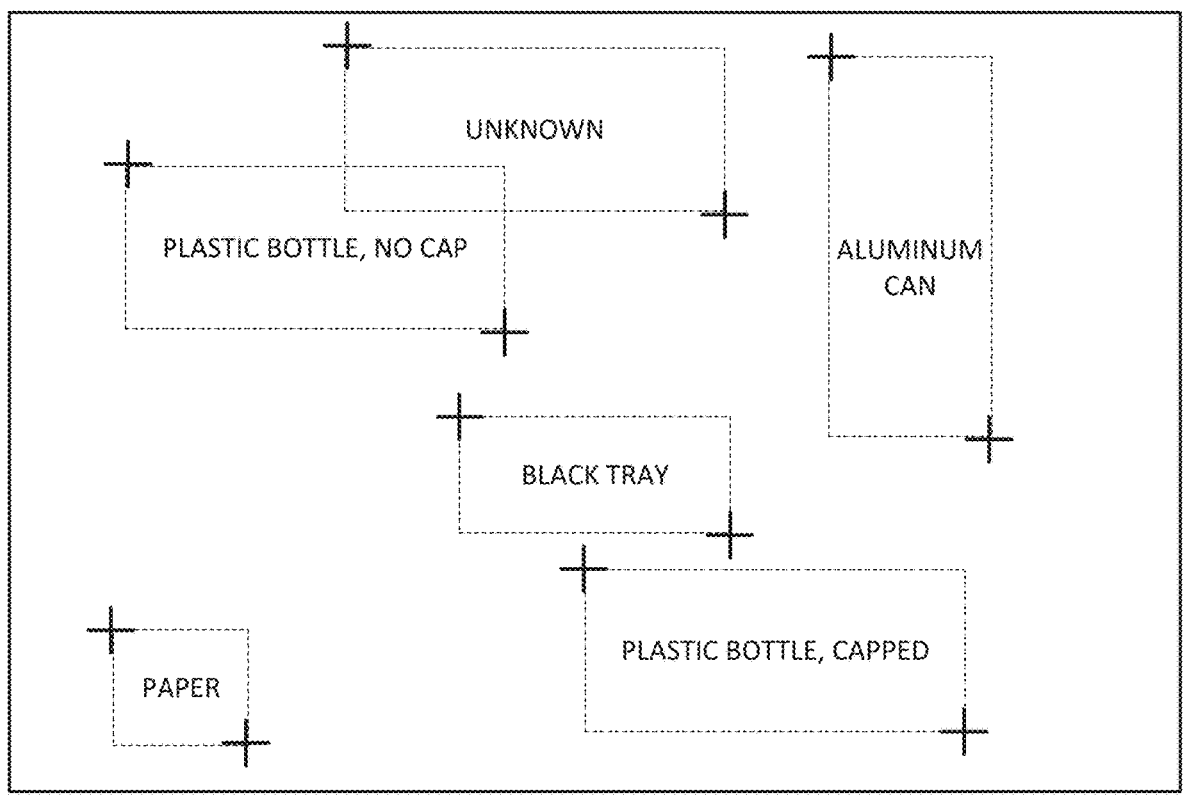
FIG. 20 shows an annotated map of an image frame produced by a trained classifier.

More generally, an AI system can be trained to classify a dozen or more categories of items likely to be encountered on the belt, and label corresponding areas on a map of the belt. FIG. 20 shows such an arrangement, in which different areas (each identified by a pair of corner coordinates) are respectively identified as having an aluminum can, a capped plastic bottle, an uncapped plastic bottle, a black tray, and a wad of paper. One technology for such spatial labeling of multiple items within an image frame employs so-called "R-CNN" techniques (region-based convolutional neural networks), such as that by Girshick detailed in "Fast R-CNN," 2015 IEEE Conference on Computer Vision and Pattern Recognition, pages 1440-1448, and elaborated in Girshick's paper with Ren, et al, "Faster R-CNN: Towards Real-Time Object Detection with Region Proposal Networks," arXiv preprint arXiv:1506.01497, Jun. 4, 2015, and in patent document US20170206431.

Figure 21:
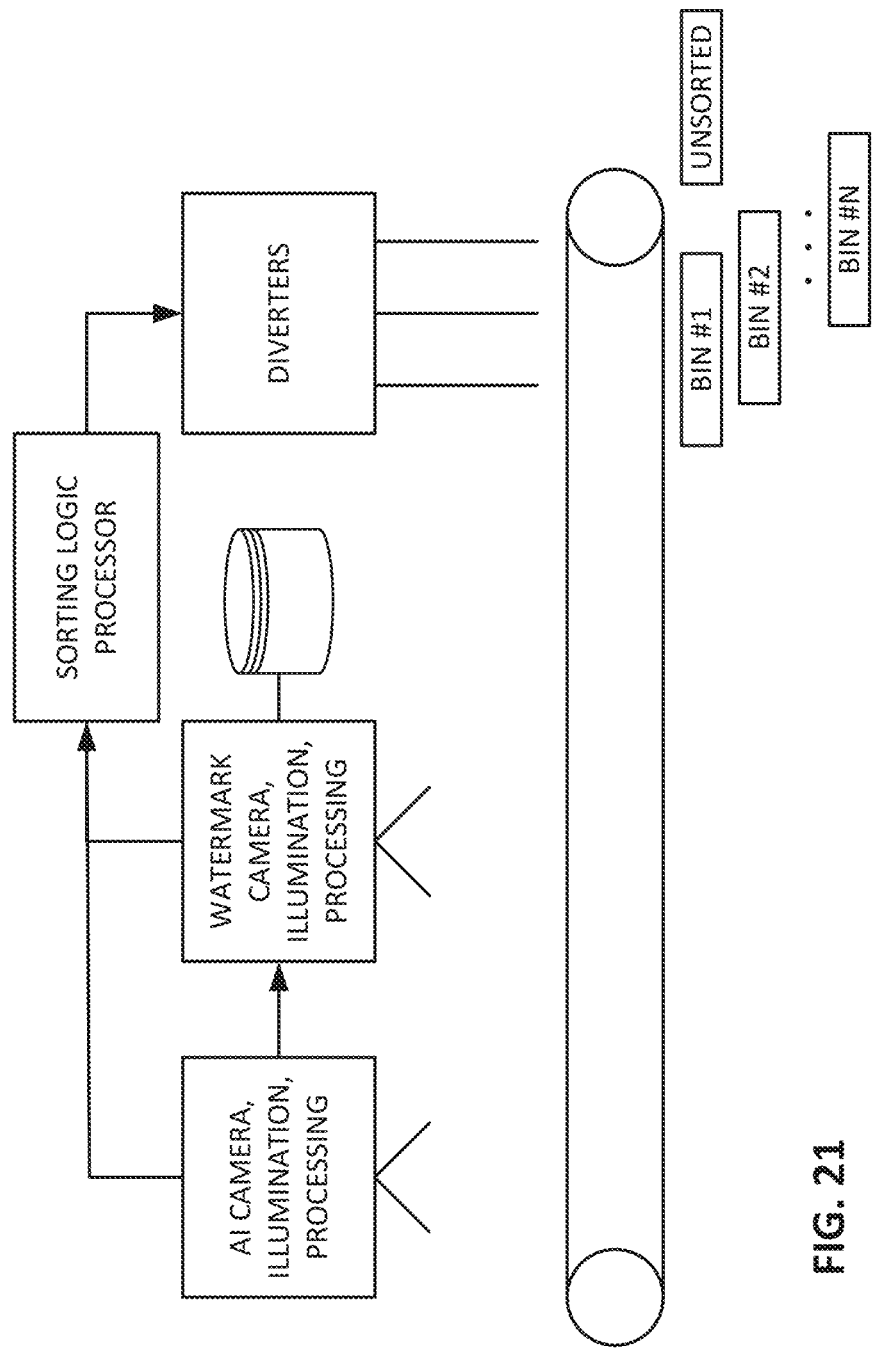
FIG. 21 illustrates a system employing employ certain aspects of the present technology.

In an illustrative plastic recycling system, there is no need to attempt watermark decoding of an aluminum can, or a capped bottle, or a wad of paper. The AI system provides map data reporting these objects and their locations to the watermark reading system, which then can disregard these areas and focus its analysis on other areas. The watermark reading system can additionally, or alternatively, limit its analysis efforts to those regions of the belt indicated, by the AI system, as occupied by the uncapped bottle and the black tray. Such an arrangement is shown in FIG. 21.

Still further, such an AI system may be trained, through use of labeled training images and gradient descent methods, to identify locations of fold contours in depictions of crushed plastic objects, and/or the less-disturbed surfaces between fold contours. Again, such map data can be passed to a watermark reading system, which can sample image blocks for analysis on the less-disturbed surfaces between the fold contours and can apply less or no analysis efforts on regions encompassing the fold contours (where watermark reading may be less successful).

The map data generated by the AI system and communicated to the watermark system can be specified in terms of pixel locations within the AI system camera field of view. Alternatively, such pixel locations can be mapped to corresponding physical coordinates on the conveyor belt (such as at a position 46.5 feet from a start-of-belt marker, and 3 inches left of belt center line.) Given a known belt speed and a known distance between the AI and watermark system cameras, the mapping of either to corresponding pixel locations within the watermark system camera field of view is straightforward.

Some or all of the data obtained by watermark decoding may not be used for sorting, but rather is used for statistical or other analysis. For example, a soft drink brand may bottle all of its various 12-ounce drinks (cola, root beer, iced tea, etc.) in containers of identical plastic composition, all of which are sorted into a common bin for recycling. But watermark data printed on the container labels, or textured on the container surfaces, allows the different products to be distinguished. Such data can be compiled into statistical reports, e.g., tallying counts of each different product processed by the sorting facility, by day, week, month, etc. Additionally, or alternatively, the facility can tally waste delivered from different sources (e.g., different neighborhoods, sporting stadiums, etc.) as separate batches. For each batch a report can be generated, e.g., counting the number of each product within a brand family, and/or the aggregate number of items for each brand, etc. Such information is a data product for which a marketplace may develop. (In some embodiments, items that are identical in resin type, color, food/non-food, virgin/recycled, etc., may actually be sorted into different bins on the basis of their brand family, e.g., if a particular brand wishes to use recyclate sourced from its own plastic bottles.) Such concepts are further detailed in application Ser. No. 16/944,136.

In another variant embodiment, watermark information conveyed by containers is serialized, with each container bearing a different identifier. The processing facility can generate a log of which serialized items are encountered in waste flows and processed for recycling (or re-use). See, e.g., patent publications US20200193462 and WO2020136379. Containers bearing serialization information can be diverted into a bin for cleaning and re-use rather than processing into recyclate.

In a further aspect, watermark-indicated data from the resolver database is used to train an AI system. In an exemplary arrangement a watermark payload is decoded from an item in a material stream, and the payload is resolved by a database lookup to obtain one or more metadata attributes about the item (e.g., that the item is an Acme brand 500 ml water bottle, made of PET plastic bearing a transparent polypropylene 4 mil thick printed label, originally-capped with a green PVC cap, which leaves a green PVC tamper-evident band (security ring) around the neck after the cap is removed). One or more images of the bottle, captured by the watermark camera system (or spectroscopy camera system, or AI camera system) are archived and labeled with the watermark-determined metadata. This process is repeated for some or all of the items watermark-identified from the material stream. These labeled images depict items in various states of contamination and crushing, yet their attributes are deterministically identified through use of watermarking. Over time a vast library of thousands (or millions) of such accurately-labeled images of items in material steams is accumulated. Such library can be used as training data for an image classifier (e.g., a convolutional neural network as described in US20160063359 or U.S. Pat. No. 10,664,722), enabling the trained classifier to then provide probabilistic estimates of such attribute metadata for an item depicted in a future image, based on imagery alone, without reliance on watermarking. Initially the probabilistic estimates provided by such a trained classifier may be correct less than 90% of the time. But by training with increasing amounts of labeled imagery, the estimates gain in accuracy, perhaps reaching 90% or 95% or better, at least for soil/crush presentations of items that are similar to those found in the training data.

To review:

An apparatus employing certain aspects of the technology comprises a conveyor, one or more cameras, and one or more light sources, to produce imagery of items on the conveyor. A first identification system applies watermark decoding to the imagery to obtain first information about an item on the conveyor. A second identification system applies spectroscopy or neural network classification to said imagery to obtain second information about said item on the conveyor. A sorting logic processor is coupled to both the first and second identification systems and configured to control one or more diverters in accordance with output data provided by said first and second identification systems.

In some embodiments the control unit of the apparatus is configured to respond to conflicting information provided by the first and second identification systems, by giving precedence to the first information in a first circumstance (e.g., when the item is black in color), and by giving precedence to the second information in a second circumstance (e.g., when the item is not black in color).

Relatedly, another apparatus employing certain aspects of the technology can comprise a first camera with associated light source that captures image data depicting items on a conveyor. The apparatus further includes a neural network classifier trained to identify a sub-region depicted in the captured image data as belonging to one of plural classes, and configured to produce map data corresponding thereto. The apparatus still further includes a second camera and associated light source, to capture further image data depicting items on the conveyor. A code reader system (e.g., a watermark reader) is configured to analyze the further image data for coded data, and is responsive to the map data from the neural network classifier to limit its analysis to a sub-part of the further image data. The apparatus also includes a sorting logic processor coupled to at least the code reader system, configured to control one or more diverters in accordance with output data provided by said code reader system.

As indicated, another waste sorting facility employing certain aspects of the technology can comprise a near infrared imaging system including one or more processors configured to discern a spectral signature produced by a plastic container, and to identify a plastic resin of the container based on the spectral signature. The facility further includes a watermark imaging system including one or more processors configured to extract an encoded watermark payload formed in a surface of the plastic container, or printed on a label of the plastic container, and to determine information from said watermark payload. The facility further includes a processing system configured to make a sorting decision for the plastic container based on the plastic resin identified by the near infrared imaging system, and based on the information determined from the watermark payload.

In such arrangement the information determined from the watermark payload can include whether the container was used for food or non-food, and the system is configured to sort the container based on both the identified plastic resin, and whether the container was used for food or non-food.

In another such arrangement the information determined from the watermark payload can include whether the container was formed of virgin plastic or recycled plastic, and the system is configured to sort the container based on both the identified plastic resin, and whether the container was formed of virgin or recycled plastic.

Similarly, a further waste sorting facility employing certain aspects of the technology can include an artificial intelligence system (e.g., comprising a convolutional neural network) that processes data, including image data, to make a judgment about an item in a waste stream. The facility also includes a watermark system including a camera and one or more processors configured to extract an encoded watermark payload formed in a surface of the item, or printed on a label applied to the item, and to determine information from said watermark payload. The facility further includes a diverter (e.g., a robotic arm) that sorts the item from the waste stream based on the judgment made by the artificial intelligence system and based on the information determined from said watermark payload.

A method employing aspects of the present technology can include capturing a first image depicting a first item in a waste stream on a conveyor, and reading a first digital watermark payload encoded on the first item and depicted in the first image. A database is then accessed to determine, using the first digital watermark payload, that the first item is formed of polyethylene terephthalate, and was used to package food. Based on such information the first item is sorted into a first collection bin. The method further includes capturing a second image depicting a second item in the waste stream, and reading a second digital watermark payload encoded on the second item and depicted in the second image. The database is then accessed to determine, using the second digital watermark payload, that the second item is formed of polyethylene terephthalate, and was used to package non-food contents. Based on such information the second item is sorted into a second collection bin different than the first collection bin. Items in the first bin are sent for recovery of food-grade polyethylene terephthalate recyclate, and items in the second bin are sent for recovery of non-food-grade polyethylene terephthalate recyclate.

A further apparatus employing certain aspects of the technology can comprise a conveyor belt for moving a material stream of items past one or more cameras that generate imagery. This imagery is input to first and second identification systems that each produces one or more attribute data about an item in said material stream. The first identification system comprises a watermark reading system. The second identification system comprises a spectroscopy identification system or an artificial intelligence identification system. The apparatus is characterized in that the one or more attribute data produced by the watermark reading system includes food/non-food attribute data indicating whether the item is a food container or a non-food container. The apparatus also includes a diverter system that directs items into different repositories depending on a combination of plural attribute data. The plural attribute data includes attribute data provided by both the first and second identification systems, including the food/non-food attribute data produced by the watermark reading system.

A further method employing certain aspects of the technology can employ first and second image processing systems that operate on imagery captured by one or more cameras viewing a waste stream on a conveyor belt. The first system comprises a convolutional neural network classification system. The second system comprises a watermark detection system. The method includes the convolutional neural network classification system classifying a first item on the conveyor belt and providing data to the watermark detection system including location information for the first item. The watermark detection system responds to this data by not attempting a watermark reading operation on image data corresponding to said location information.

Warping

A tiled watermark signal can be warped prior to printing on a planar plastic sheet, in anticipation of the 3D shape that the sheet will finally take. For example, warping can be applied to a tiled watermark signal that is printed on a planar plastic sheet, which will later be shrunk-fit to a container, so that the finished diameter of the resulting sleeve will have a diameter that varies with height.

Figure 22:
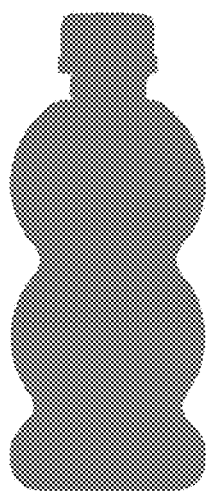
FIG. 22 shows the profile of an exemplary bottle that may be labeled with a shrink-fit plastic sleeve.

Consider the bottle profile depicted in FIG. 22. It has three bulges along its height, each with one or two adjoining waists. A planar sheet is wrapped to form a cylindrical sleeve large enough to fit the bulges. Heat is then applied to shrink the sleeve, in places, to conform to the bottle shape.

This shrinking of the sleeve at the waists reduces the horizontal extent of any watermark blocks printed in these areas. To avoid differential scaling of the watermark, applicant pre-warps the watermark blocks to reduce their vertical extent in such areas. By such arrangement, when shrunk at the waist, the sleeve will present watermark blocks that are again square. The blocks' side dimensions will be smaller than elsewhere on the bottle, but their lack of differential scaling simplifies decoding.

Figure 23:
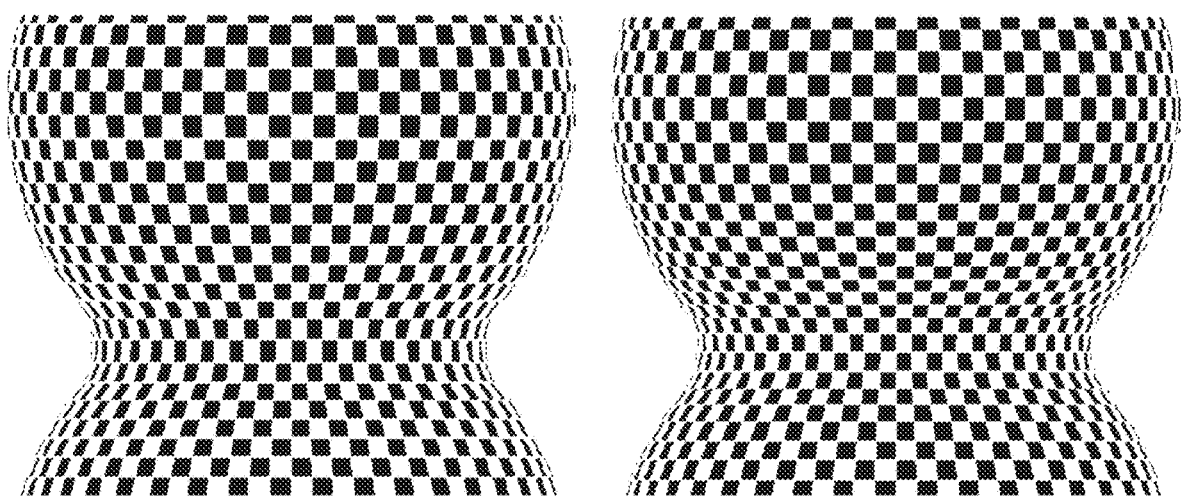
FIG. 23 shows how a waist of the FIG. 22 bottle profile changes the aspect ratio of watermark blocks, when a uniform array of blocks is employed (on the left), and when a vertically pre-warped array of blocks is employed (on the right).

FIG. 23 shows this effect. The left side shows a uniform checkerboard pattern, shrunk-fit to a bottle waist. As can be seen, the horizontal shrinkage of the pattern at the waist leads to blocks that are vertically elongated. The right side shows applicant's technique. By pre-warping the pattern to vertically-compress the blocks—in proportion to the bottle diameter—while the sleeve is still in its unshrunk state, the pattern after shrinking will present square blocks at the waist (albeit of smaller size than at the bulges).

Figure 24A:
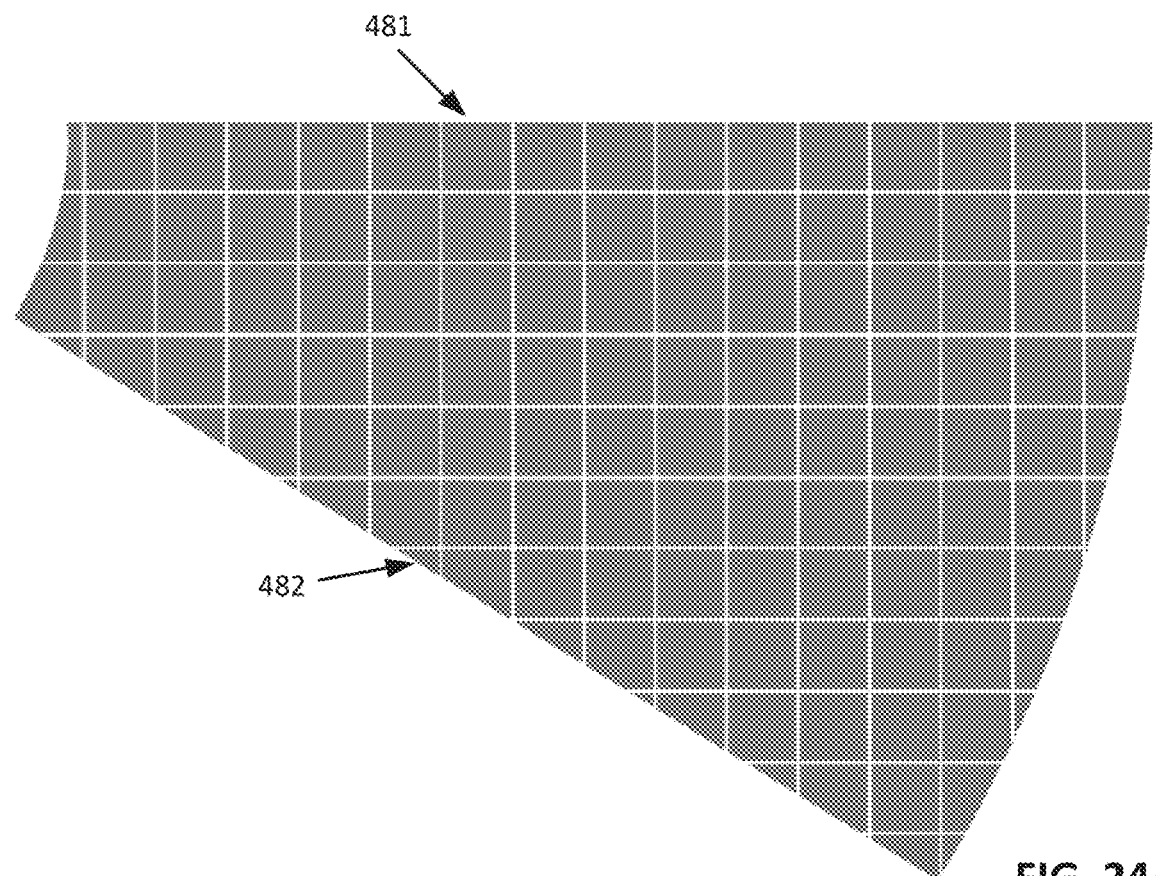
FIGS. 24A and 24B show two alternative ways of marking a sector of an annulus with an array of signal tiles.

A different problem arises if the watermark-printed substrate is not, at some point, rectangular, yet wraps around a volume. Consider a plastic drinking cup having a tapered shape. The diameter at the top is larger than the diameter at the bottom. If unwrapped and laid flat, the sidewall has the shape of a sector of an annulus, e.g., as partially-represented by FIG. 24A. If a pattern of square watermark blocks spans such an annular sector, then at some point a troublesome pattern seam arises where the edges of the pattern meet. At this seam the partial blocks do not transition smoothly—each to the next. Instead, the pattern abruptly stops at one boundary 481 (defined by a line through the pattern at a first angle), and meets a second boundary 482 (defined by a line through the pattern at a second, different, angle). A trouble with such a seam is that a watermark decoder—presented with imagery depicting such region of the cup—gets conflicting signals about the orientation of the watermark. Is it oriented as suggested by the signal on one side of the seam, or the other? Whichever decision is made, the imagery on the opposite side of the seam contributes nothing to the decoding operation—except possible confusion. Decoding suffers.

Figure 24B:
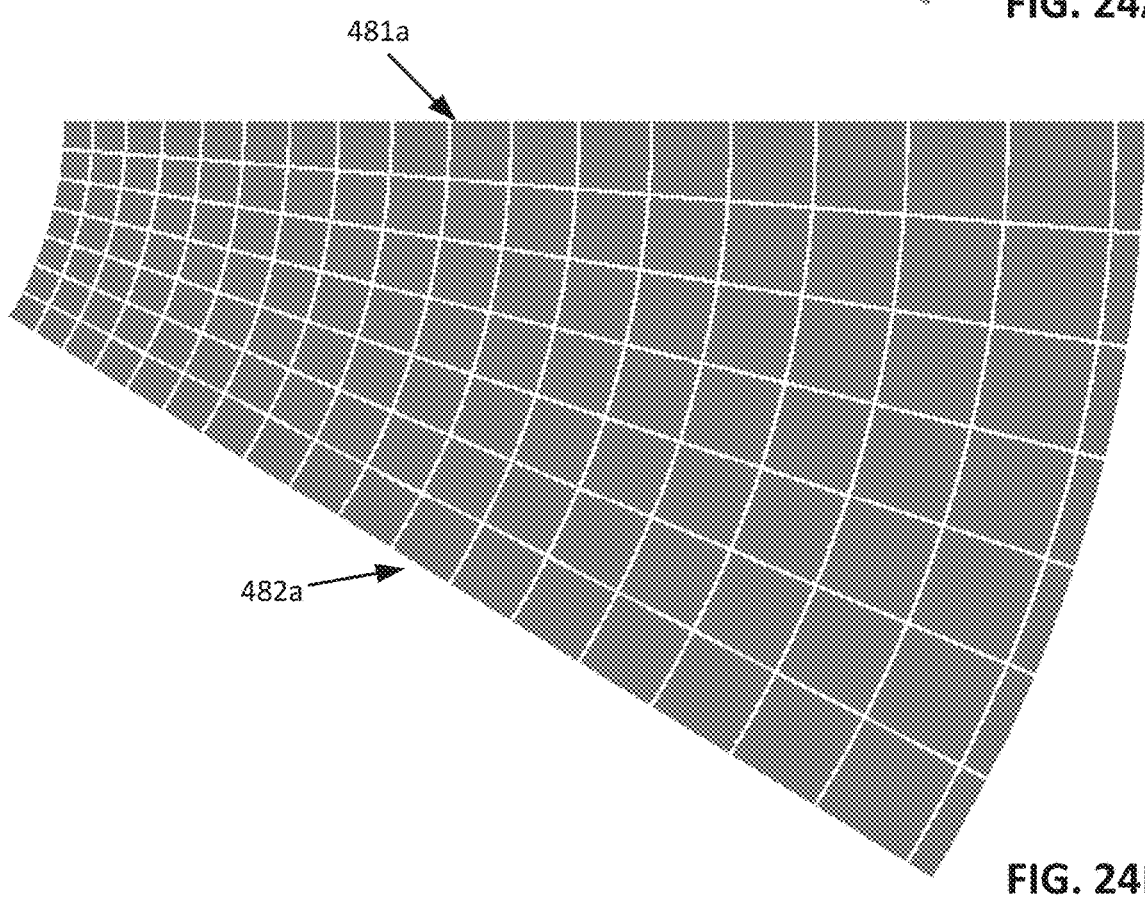

In such instances, it is preferable to apply a polar warp to the watermark signal blocks, as shown in FIG. 24B. Each square watermark block becomes a patch shaped as a sector of an annulus, with two straight sides and two curved sides (the straight sides being opposite each other). This enables the edges 481a, 482a, to seamlessly transition, provided that an integral number of watermark blocks are placed around the circumference. Such polar warping avoids the decoding difficulties of the FIG. 24A arrangement. The tradeoff is that the scale of the watermark varies, e.g., from 160 to 193 WPI in an exemplary cup, with a 10 degree taper. However, existing watermark detectors cope well with such ranges of scale state variations, and they likewise have been found to cope well with polar distortions of this magnitude.

The mapping between locations in a repeating watermark block, and locations in an annular sector, is detailed in the paper by Holub attached as an appendix to cited application U.S. 63/011,195.

Efficiently Handling Visual Code Transformations

Artisans understand that 2D codes on smooth surfaces can appear inverted (dark for light, etc.) when viewed in certain lighting conditions, and decoding imagery of such codes can be attempted on both the original and inverted (re-inverted) forms of the imagery to address such possibility. (See, e.g., US patent documents 5,811,777, 20070295814 and 20090242649.)

Left-for-right mirroring is also a possibility, when a 2D code is formed on a first side of a plastic container and is sensed from the second, opposite side. This can occur if 3D texture marking of the first surface is strong enough to also deform the opposite surface. This can also occur if the container is transparent, and a marking formed on the first side is viewed through the plastic from the opposite side.

A combination of inversion and mirroring can also arise.

Together with the normal presentation of a 2D mark on a surface, there are thus four variants that may arise (normal, inverted, mirrored, and mirrored+inverted). Four attempts at decoding may thus be made, starting with the original image. If no payload is recovered from the normal image the image can be inverted, and a second attempt tried. If that fails the original image can be mirrored and a third attempt tried. If that fails the original image can be mirrored and inverted and a fourth attempt tried.

That is, a method employing aspects of the technology includes attempting a first time to locate a 2D code signal in captured image, failing the first time, and attempting a second time to locate an inverted code signal in the imagery. After failing in this attempt too, the method continues by attempting to locate a code signal that is mirrored, or both mirrored and inverted, in the imagery.

A naïve, brute force application of watermark decoding to the various cases can be laborious. For example, following the method of our patent U.S. Pat. No. 9,959,587 to determine affine pose of a watermark within captured imagery requires that various operations, including 2D FFTs, be performed four times for the four cases. However, much of the computational work performed for the first, normal, case can be adapted and re-used for the other cases. This is because mathematical identities generally relate various of the computations involved in the different cases.

Figure 2B:
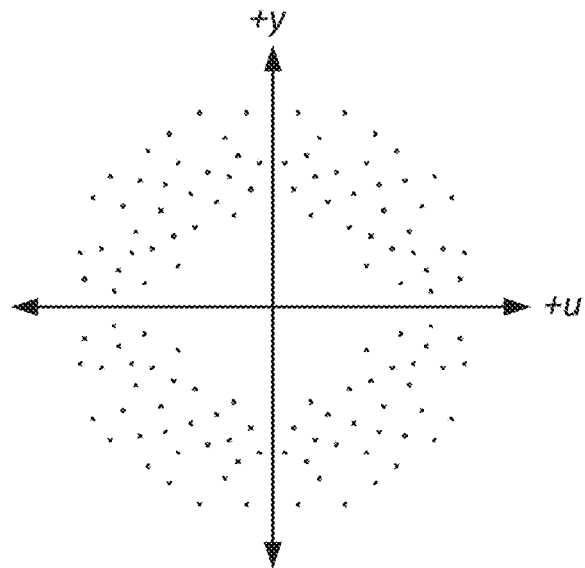
FIG. 2B shows the same signal expressed in the Fourier magnitude domain.

For example, the watermark reference signal is a constellation of dozens of spatial frequency domain magnitude peaks of various phases. (As noted, FIG. 2B shows an illustrative magnitude peak constellation.) Applicant recognized the frequencies of these peaks are invariant through inversion and mirroring, so such frequency data does not need to be computed four times. The frequencies of the reference signal peaks can be computed once, for the normal case, and the scale and rotation of the peaks' constellation reveals scale and rotation of the watermark for all four possible cases. This effects a substantial simplification.

After establishing scale and rotation of the watermark, the task of establishing (x,y) translation of the watermark block remains. Using the phase deviation approach detailed in the above-cited patent requires estimating phases of each of the spatial frequency peaks, and then calculating 1D phase deviation data, followed by calculating 2D phase deviation data, and then iteratively refining.

The image in the left-for-right mirrored case is the same as the image in the original case, except the x-coordinate of each pixel value is negated. (For example, a pixel of value 103 found at pixel {72,176} in the original image is now found at pixel (−72,176) in the mirrored image, assuming the center pixel in the image block is given a coordinate of x=0.) This means that the phase $\theta_N(-u,v)$ of a particular peak located at (−u,v) in the normal case becomes the phase $\theta_M$ (u,v) at location (u,v) in the mirrored case (i.e., $\theta_M(u,v)=\theta_N(-u,v)$), it being understood that the (u,v) notation denotes coordinates in the Cartesian spatial frequency space within which the reference signal magnitude peaks are located.

The phase $\theta_I(u,v)$ of a particular peak (u,v) in the inverted case is the phase of the same peak in the normal case, $\theta_N(u,v)$, plus π radians. That is $\theta_I(u,v)=\theta_N(u,v)+\pi$. (Care should be taken with wrapping to assure the phase remains between bounds of −π and π.)

By applying the negation of x coordinate to the spatial coordinates of pixels in the mirrored case, and working through the math (e.g., applying familiar identities such as $\sin(\theta+\pi)=-\sin\theta$), straightforward relationships can be likewise derived relating the peak phases in the normal case to the peak phases for the mirrored, and mirrored+inverted cases.

By adopting such shortcuts, all four geometrical cases can be processed in about the time a naïve implementation handles the normal and inverted cases alone.

Furthermore, use of the above relations and the symmetry of the reference signal allows us to reuse the results of the 1D phase deviation in the (non-inverted, non-mirrored) case with that in the (non-inverted, mirrored) case. Similarly, it allows us to reuse the results of the 1D phase deviation in the (inverted, non-mirrored) case in the (inverted, mirrored) case.

Thus, a further aspect of applicant's technology involves analyzing imagery for multiple possible transformed presentations of a watermark pattern, by analyzing one possible presentation of the watermark pattern, and adapting intermediate results of that analysis to produce results corresponding to one or more other of the possible presentations.

CONCLUDING REMARKS

It bears repeating that this specification builds on work detailed in the earlier-cited patent filings, such as publications US20190306385 and WO2020186234. This application should be read as if those filings are bodily included here. (Their omission shortens the above text and the drawings considerably, in compliance with guidance that patent applications be concise.) Applicant intends, and hereby expressly teaches, that the improvements detailed herein are to be applied in the context of the methods and arrangements detailed in the cited documents, and that such combinations form part of the teachings of the present disclosure.

While the focus of this disclosure has been on plastic containers, the technology is more broadly applicable. The detailed arrangements can be applied to items formed of metal, glass, paper, cardboard and other fibrous materials, etc. Similarly, while reference has often been made to bottles, it will be recognized that the technology can be used in conjunction with any items, e.g., trays, tubs, pouches, cups, transport containers, etc.

Moreover, while the emphasis of the specification has been on recycling, it should be appreciated that the same technology can be used to sort items for other purposes (e.g., for packages on a conveyor in a warehouse or shipping facility)

Although the described embodiments employ a reference signal comprised of peaks in the Fourier magnitude domain, it should be recognized that reference signals can exhibit fixed features in different transform domains by which geometric synchronization can be achieved.

Relatedly, it is not necessary for a digital watermark signal to include a distinct reference signal for geometrical synchronization purposes. Sometimes the payload portion of the watermark signal, itself, has known aspects or structure that enables geometrical synchronization without reliance on a separate reference signal.

The term "watermark" commonly denotes an indicia that escapes human attention, i.e., is steganographic. While steganographic watermarks can be advantageous, they are not essential. Watermarks forming overt, human-conspicuous patterns, can be employed in embodiments of the present technology.

For purposes of this patent application, a watermark is a 2D code produced through a process that represents a message of N symbols using K output symbols, where the ratio N/K is less than 0.2. (In convolutional coding terms, this is the base rate, where smaller rates indicate greater redundancy and thus greater robustness in conveying information through noisy "channels"). In preferred embodiments the ratio N/K is 0.1 or less. Due to the small base rate, a payload can be decoded from a watermark even if half of more (commonly three-quarters or more) or the code is missing.

In a particular embodiment, 47 payload bits are concatenated with 24 CRC bits, and these 71 bits ("N") are convolutionally encoded at a base rate of 1/13 to yield 924 bits ("K"). A further 100 bits of version data are appended to indicate version information, yielding the 1024 bits referenced earlier (which are then scrambled and spread to yield the 16,384 values in a 128×128 continuous tone watermark).

Some other 2D codes make use of error correction, but not to such a degree. A QR code, for example, encoded with the highest possible error correction level, can recover from only 30% loss of the code.

Preferred watermark embodiments are also characterized by a synchronization (reference) signal component that is expressed where message data is also expressed. For example, every mark in a sparse watermark is typically a function of the synchronization signal. Again in contrast, synchronization in QR codes is achieved by alignment patterns placed at three corners and at certain intermediate cells. Message data is expressed at none of these locations.

While a GTIN payload data field from a label watermark can be used to access attribute metadata (e.g., plastic type) from a database, this is not required. Other fields of the label watermark can be used for this purpose. Indeed, the use of a database in conjunction with label watermarks is not essential; the payload can convey plastic data directly, such as in one of the Application Identifier key value pairs supported by the standard governing GTINs ("GS1 General Specifications, Release 21.0.1, January 2021").

Similarly, although GTIN information is commonly encoded in the label watermark only, in some embodiments the plastic texture watermark can encode this information as well. In such case, information about the component plastic—or a destination sorting bin—can be obtained by use of a data structure (such as a table) that associates the GTIN with such other information.

In instances in which a shrink sleeve wraps a plastic bottle, the bottle substrate may be printed or textured to encode a first payload, while the sleeve may be printed or textured to encode a second payload. The two payloads may be the same or different. If the same, the payload may indicate the plastic composition of the underlying bottle, and may additionally indicate the plastic composition of the sleeve. If different, the payloads may indicate the plastic composition of the plastic to which they are respectively applied.

Some recycling systems employ shredders to break down plastics into small pieces (e.g., on the order of 2, 1 or 0.5 cm across). In such process a sleeve layer may separate from the substrate layer that it formerly wrapped. Shredding permits imaging of substrate surfaces that were formerly concealed, e.g., due to being adjacent the sleeve, or forming the interior of a bottle. From such imagery the encoded information (or parts thereof, such as a registration signal) can be detected. Separation of pieces of different materials can be controlled (e.g., using air deflection systems) based on such information.

Other systems may sense the payload information encoded on sleeve layers, and route items having particular sleeve types to a stripping line for removal of such sleeves. Removal may there be accomplished by mechanical or chemical techniques. The underlying substrate can then be imaged, and routed or sorted as appropriate based on information decoded from its encoding.

While a RealSense 3D camera, based on stereovision principles, was cited above, it will be understood that other 3D sensors, based on other technologies, can naturally be employed. These include structured light-based sensors, LIDAR and other time-of-flight sensors, etc.

Although the specification particularly details use of 2D and 3D image sensors, 2D and 3D sensors are not required. Image sensing can instead be performed by a linear array sensor that captures line scan images at a suitably-high rate. (Some NIR spectroscopy systems employ such 1D image sensors.)

The noted Sony sensors, and others, have modes permitting image capture within only identified regions of interest (ROIs) within the field of view. In applications in which the watermark reader knows it can disregard certain areas of the belt (e.g., based on information from an AI system, or a system that identifies vacant areas of the belt), such ROI feature can be used to capture pixel data over only a subset of the sensor field of view. Subsequent processing can then be applied just to the ROI data provided by the sensor, improving efficiency.

Different ROIs can also be captured with different exposure intervals concurrently. Thus, if an AI system identifies both a dark object and a light object that will be within the watermark camera field of view, ROIs allocated by the watermark camera to the corresponding areas can differ in exposure intervals, e.g., capturing data for 75 microseconds in the darker area and 25 microseconds in the lighter area. The exposure intervals overlap in time, rather than being time-sequential. In still other arrangements, two ROIs are defined over a common area within the field of view and capture two sets of image data over two different exposure intervals, e.g., 25 microseconds and 75 microseconds, where again the two different exposure intervals overlap in time. Depending on the reflectance of the item within the common area, one of the two exposures is likely to be either underexposed or overexposed. But the other of the two may depict the item with better watermark code contrast than would be possible with a single intermediate exposure, e.g., of 50 microseconds. The two exposures can be combined in known fashion to yield a high dynamic range image from which the watermark signal can be read.

Different exposures may also be captured in systems with less sophisticated sensors, with similar opportunities and benefits. For example, a first frame can be captured with red light and a short exposure, followed by a second frame captured with blue light and a short exposure, followed by a third frame captured with red light and a long exposure, followed by a fourth frame captured with blue light and a long exposure, and then this cycle repeats. One of these frame captures starts every two milliseconds. (Long and short exposures are relative to each other and can be, e.g., 75 and 25 microseconds.) Each captured frame can be tagged with metadata indicating the illumination color and exposure interval, permitting the watermark detector to apply parameters optimized to each circumstance.

In addition to gathering imagery for watermark decoding, spectroscopy identification, neural network analysis, empty belt detection, etc., the camera(s) noted above (or additional camera(s)) can detect bottles and other items that are rolling (tumbling) relative to the moving conveyor belt. Uncrumpled bottles are susceptible to rolling in the circumstances of the high belt speeds, induced winds, and generally chaotic dynamics of waste stream conveyors, and such rolling interferes with accurate diversion of identified bottles by air-jets, robotic arms, etc. By analysis of imagery captured by a camera at two or more instants a known interval apart (or multiple cameras at two or more different instants), the speed and direction at which an item is tumbling—within the building frame of reference—can be determined.

The artisan will recognize that this is an exercise in photogrammetry, i.e., relating depicted positions of an item in image frames to corresponding physical locations in the building by a projection function specific to the camera system, and determining the time rate of change of such positions in two dimensions. If a bottle's speed thereby indicated is different than the belt speed, then the bottle is known to be rolling. Given the known bottle rolling speed and direction, the diverter system can estimate the bottle's position at future instants, and can adapt the ejection timing or other parameters accordingly so the bottle is correctly diverted despite its rolling. Usually, the diverter system will delay the moment of ejection, in accordance with the difference between the bottle's speed and the belt speed.

That is, a method employing certain aspects of the technology includes capturing first imagery depicting waste on a conveyor, including a particular item. The method further includes capturing second imagery depicting the waste, including said particular item, on the conveyor. The captured imagery is processed to discern that the particular item is moving at a different rate than said conveyor. As a consequence, a diverter is operated to remove the particular item from the waste on the conveyor, taking into account its moving at a different rate.

The belt speed can be detected by various means. One is to measure the time interval with which a known mark on the top or bottom of the belt periodically returns to a mark sensing station. Given such time increment, and the known length of the belt, the belt speed can be computed. Alternatively, two images of the belt, captured by the watermark reading camera, can be correlated to determine the pixel distance traveled by the belt between the two image captures. This pixel distance can be translated into a physical distance in the plane of the belt by the camera system's projection function. Knowing this distance, and the interval between the two image captures, the belt speed again can be computed.

Some embodiments are described as employing correlation as a method of pattern matching (e.g., to determine vacant regions of belt). It will be understood that there are many variations of, and alternatives to, correlation, so the technology should be understood as encompassing other pattern matching techniques as well.

In certain of the embodiments, empty locations on the belt are detected, and processing resources that would normally be applied to detecting a watermark reference signal at such locations can be applied elsewhere. Naturally, such concept can be applied to other computationally intensive tasks, such as recognizing items by artificial intelligence techniques (e.g., convolutional neural networks, deep learning, etc.), by fingerprinting (e.g., SIFT and other feature point recognition arrangements), optical character recognition, etc.

Reference was made to processing patches of captured imagery of specified sizes in waxels. While the exact waxel-size of a patch cannot be determined until its scale is assessed (e.g., using the cited direct least squares method), the encoding scale of each watermark that the system might encounter is known in advance, and the imaging distance is fixed, so the scale-correspondence between captured pixels and encoded waxels is roughly known, which is adequate for the present purposes.

As noted, captured imagery can be submitted to a convolutional neural network that has been trained to classify input imagery to identify depicted object type. The object type can inform parameters of the diversion operation in addition to timing, such as the force to be applied. For example, a flat object (e.g., a padded shipping envelope) can serve as a sail—capturing air, so less air is applied to divert a flat than is applied to divert a bottle (the curved surface of which generally diverts the air around the bottle).

There is a short interval of time between the moment an item is imaged by the camera(s), and the moment the item is positioned for diversion from the conveyor. This interval may be sufficient to enable cloud processing. For example, captured imagery (or derivatives of such imagery) can be transmitted to a remote cloud computer, etc. such as Microsoft Azure, Google Cloud, Amazon AWS. The cloud processor(s) can perform some or all of the processing detailed herein, and return result data to the material processing system—in time to control the diverters accordingly.

Likewise, in a material stream in which some items require a database lookup to determine attribute metadata from an encoded container identifier, time may be adequate to permit a cloud database lookup prior to diversion.

Various references were made, above, to certain information encoded in the watermark payload (e.g., identifying the plastic resin, the product brand or the bottle manufacturer). It should be understood that such information is often not literally encoded into the watermark payload itself but is available from a database record that can be accessed using an identifier that is literally encoded into the watermark payload. Applicant means language such as "information encoded in the watermark" in this sense of "available from," i.e., encompassing use of a database to store the indicated information. (Applicant uses the phrase "literally encoded" to mean encoded in the stricter sense, i.e., with certain information expressed by the watermark pattern on the bottle itself.)

This specification also frequently references "waste." This is meant to refer simply to a material flow of used items. Some may be recycled; others may be re-used.

It will be recognized that recycling systems employing aspects of the present technology do not require a conveyor belt per se. For examples, articles can be transported past the camera system and to diverter systems otherwise, such as by rollers or by free-fall. All such alternatives are intended to be included by the terms "conveyor belt," "conveyor" or "belt."

While reference was made to a few particular convolutional neural network architectures, it will be recognized that other CNN architectures suited for image classification can likewise be used. These include network arrangements known to artisans as AlexNet, VGG, Inception, ResNet, XCeption and DenseNet. Some image sensors include integrated neural network circuitry and can be trained to classify different objects by their appearance, thus making such sensors suitable for use in embodiments detailed above.

Although most of the detailed arrangements operate using greyscale imagery, certain performance improvements (e.g., more reliable identification of empty belt, and certain modes of watermark decoding) may be enabled by the greater-dimensionality of multi-channel imagery. RGB sensors can be used. However, half of the pixels in RGB sensors are typically green-filtered (due to prevalence of the common Bayer color filter). Still better results can be achieved with sensors that output four (or more) different channels of data, such as R/G/B/ultraviolet. Or R/G/B/infrared. Or R/G/B/polarized. Or R/G/B/white.

Artisans will understand that the capture and distribution of imagery at the high frame rates contemplated above is best performed by frame grabbers and other interface hardware adapted to such tasks. Exemplary embodiments may include, e.g., the Kaya Predator frame grabber, and the Mellanox Connect X5 Ethernet card. Such details are within the skill of the artisan so are not belabored here.

While the technology has been described in the context of digital watermarks, it will be recognized that any other machine-readable marking can be used, such as DotCode and dot peen markings (although certain benefits, such as readability from different viewpoints, may be impaired). U.S. Pat. No. 8,727,220 teaches twenty different 2D codes that can be embossed or molded into an outer surface of a plastic container. If desired, an item may be marked with multiple instances of a watermark or other 2D code block, with random noise interspersed between the blocks (e.g., as in publication US20110240739).

Although many consumer product companies may want texture markings to be subtle and easily overlooked, other may want such markings to be immediately apparent and overt, e.g., to promote the fact that the container was designed with recycling in mind.

While reference is often made to watermark blocks that are square in shape, it will be recognized that printed or textured surfaces can likewise be tiled with watermark blocks of other shapes. For example, a hexagonal honeycomb shape may be composed of triangularly-shaped waxels.

Similarly, while repeated reference was made to watermark data encoded in a 128×128 waxel block, it will be recognized that such dimensions are exemplary. Larger or smaller blocks can naturally be used.

As reviewed above, watermark detection and synchronization in an exemplary embodiment employs a direct least squares (and phase deviation) approach. Other techniques, however, can also be used. One example is a coiled all-pose arrangement, as detailed in patent publication US20190266749. Another option is to use an impulse matched filter approach, (e.g., correlating with a template comprised of peaks), as detailed in U.S. patent documents 10,242,434 and 6,590,996.

It will be recognized that processing a surface to effect a matte, or frosted, finish is a form of 3D surface shaping/texturing, albeit on a very small scale. Generally, any non-inked treatment that changes a surface's bidirectional reflectance distribution function (BDRF) or surface roughness is regarded as a 3D shaping/texturing operation herein.

While LED illumination is detailed, it is noted that some lighting applications are transitioning to laser diodes (e.g., automotive headlamps). Laser diodes are similarly useful in embodiments of the present technology (e.g., with diffusor sheets or lenses), because they offer increased light output relative to LEDs, with consequent improvements in exposure intervals, depth of field, etc.

Reference was made to forced air blowout as one means for diverting an item from a material flow, such as from a conveyor belt. A particular air blowout arrangement is detailed patent publication US20190070618 and comprises a linear array of solenoid-activated air jet nozzles positioned below the very end of a conveyor belt, from which location items on the belt start free-falling under the forces of gravity and their own momentum. Without any air jet activity, items cascade off and down from the end of the belt, and into a receptacle or onto another belt positioned below. Items acted-on by one or more jets are diverted from this normal trajectory, and are diverted into a more remote receptacle—typically by a jet oriented to have a horizontal component away from the belt, and a vertical component upwards. Other systems use robotic arms to pick items from a material stream and toss them into bins or onto other conveyors. These and other separation and sorting mechanisms are known to the artisan, e.g., from U.S. patent publications U.S. Pat. Nos. 5,209,355, 5,485,964, 5,615,778, 20040044436, 20070158245, 20080257793, 20090152173, 20100282646, 20120031818, 20120168354, 20170225199 and 20200338753. Operation of such diverters is controlled in accordance with the type of item identified, as detailed earlier.

The discussions involving sparse watermarks describe them as dark marks on a lighter background, but this is not essential. In other arrangements light marks on a darker background can be employed. In the case of thresholded binary watermarks, for example, a continuous tone watermark can be thresholded to identify the lightest elements of the watermark, and spatially-corresponding white elements can be copied into a dark signal block until a desired density of dots is achieved. Similarly, while applicant generally follows a practice in which smaller signal levels correspond to darker marks, the opposite practice can naturally be used. More generally, the light/dark conventions observed in the detailed embodiments are not essential but are merely exemplary, with inverted arrangements being similarly possible, as will be recognized by the artisan.

In some embodiments imagery is locally inverted on a patchwork basis to counteract specular reflection inversion prior to watermark decoding. Such work is detailed in application 63/156,866, filed Mar. 4, 2021.

From the foregoing examples it will be recognized that the earlier-detailed embodiments of our inventive work are exemplary only, and that the technology is not so limited.

Attention is particularly-drawn to cited application Ser. No. 16/944,136. That application details work by a different team at the present assignee but dealing with the same recycling, etc., subject matter. That application details features, methods and arrangements which applicant intends be incorporated into embodiments of the present technology. That application and this one should be read in concert to provide a fuller understanding of the subject technology.

It will be understood that the methods and algorithms detailed above can be executed using computer devices employing one or more processors, one or more memories (e.g. RAM), storage (e.g., a disk or flash memory), a user interface (which may include, e.g., a keypad, a TFT LCD or OLED display screen, touch or other gesture sensors, together with software instructions for providing a graphical user interface), interconnections between these elements (e.g., buses), and a wired or wireless interface for communicating with other devices.

The methods and algorithms detailed above can be implemented in a variety of different hardware processors, including a microprocessor, an ASIC (Application Specific Integrated Circuit) and an FPGA (Field Programmable Gate Array). Hybrids of such arrangements can also be employed.

By microprocessor, applicant means a particular structure, namely a multipurpose, clock-driven integrated circuit that includes both integer and floating point arithmetic logic units (ALUs), control logic, a collection of registers, and scratchpad memory (aka cache memory), linked by fixed bus interconnects. The control logic fetches instruction codes from an external memory, and initiates a sequence of operations required for the ALUs to carry out the instruction code. The instruction codes are drawn from a limited vocabulary of instructions, which may be regarded as the microprocessor's native instruction set.

A particular implementation of one of the above-detailed processes on a microprocessor—such as discerning affine pose parameters from a watermark reference signal in captured imagery, or decoding watermark payload data—involves first defining the sequence of algorithm operations in a high level computer language, such as MatLab or C++

(sometimes termed source code), and then using a commercially available compiler (such as the Intel C++ compiler) to generate machine code (i.e., instructions in the native instruction set, sometimes termed object code) from the source code. (Both the source code and the machine code are regarded as software instructions herein.) The process is then executed by instructing the microprocessor to execute the compiled code.

Many microprocessors are now amalgamations of several simpler microprocessors (termed "cores"). Such arrangement allows multiple operations to be executed in parallel. (Some elements—such as the bus structure and cache memory may be shared between the cores.)

Examples of microprocessor structures include the Intel Xeon, Atom and Core-I series of devices, and various models from ARM and AMD. They are attractive choices in many applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data. Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

GPUs are attractive structural choices for execution of certain of the detailed algorithms, due to the nature of the data being processed, and the opportunities for parallelism.

While microprocessors can be reprogrammed, by suitable software, to perform a variety of different algorithms, ASICs cannot. While a particular Intel microprocessor might be programmed today to discern affine pose parameters from a watermark reference signal, and programmed tomorrow to prepare a user's tax return, an ASIC structure does not have this flexibility. Rather, an ASIC is designed and fabricated to serve a dedicated task. It is purpose-built.

An ASIC structure comprises an array of circuitry that is custom-designed to perform a particular function. There are two general classes: gate array (sometimes termed semi-custom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied—permanently linking certain of the gates in a fixed topology. (A consequence of this hardware structure is that many of the fabricated gates—commonly a majority—are typically left unused.)

In full-custom ASICs, however, the arrangement of gates is custom-designed to serve the intended purpose (e.g., to perform a specified algorithm). The custom design makes more efficient use of the available substrate space—allowing shorter signal paths and higher speed performance. Full-custom ASICs can also be fabricated to include analog components, and other circuits.

Generally speaking, ASIC-based implementations of watermark detectors and decoders offer higher performance, and consume less power, than implementations employing microprocessors. A drawback, however, is the significant time and expense required to design and fabricate circuitry that is tailor-made for one particular application.

A particular implementation of any of the above-referenced processes using an ASIC, e.g., for discerning affine pose parameters from a watermark reference signal in captured imagery, or decoding watermark payload data, again begins by defining the sequence of operations in a source code, such as MatLab or C++. However, instead of compiling to the native instruction set of a multipurpose microprocessor, the source code is compiled to a "hardware description language," such as VHDL (an IEEE standard), using a compiler such as HDLCoder (available from MathWorks). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

A third hardware structure that can be used to execute the above-detailed algorithms is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, an external memory. By such arrangement, the linking of the logic gates—and thus the functionality of the circuit—can be changed at will, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included. Likewise with A/D and D/A converters. Again, the reconfigurable interconnect that characterizes FPGAs enables such additional elements to be incorporated at desired locations within a larger circuit.

Examples of FPGA structures include the Stratix FPGA from Intel, and the Spartan FPGA from Xilinx.

As with the other hardware structures, implementation of the above-detailed processes on an FPGA begins by describing a process in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to perform the detailed algorithms. One employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Still another type of processor hardware is a neural network chip, e.g., the Intel Nervana NNP-T, NNP-I and Loihi chips, the Google Edge TPU chip, and the Brainchip Akida neuromorphic SOC.

Software instructions for implementing the detailed functionality on the selected hardware can be authored by artisans without undue experimentation from the descriptions provided herein, e.g., written in C, C++, Visual Basic, Java, Python, Tcl, Perl, Scheme, Ruby, Caffe, TensorFlow, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. Different tasks can be performed exclusively by one device or another, or execution can be distributed between devices. In like fashion, description of data being stored on a particular device is also exemplary; data can be stored anywhere: tc.al device, remote device, in the cloud, distributed, etc.

Other recycling arrangements are taught in U.S. patent documents U.S. Pat. Nos. 4,644,151, 5,965,858, 6,390,368, 20060070928, 20140305851, 20140365381, 20170225199, 20180056336, 20180065155, 20180349864, and 20190030571. Alternate embodiments of the present technology employ features and arrangements from these cited documents.

This specification has discussed various embodiments. It should be understood that the methods, elements and concepts detailed in connection with one embodiment can be combined with the methods, elements and concepts detailed in connection with other embodiments. While some such arrangements have been particularly described, many have not—due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the technology.

The invention claimed is:

1. A waste sorting apparatus comprising:
a conveyor;
one or more cameras, and one or more light sources, to produce imagery of items on the conveyor;
a first identification system that applies watermark decoding to said imagery to obtain first information about an item on the conveyor;
a second identification system that applies spectroscopy or neural network classification to said imagery to obtain second information about said item on the conveyor;
one or more diverters; and
a sorting logic processor coupled to both the first and second identification systems, configured to control the one or more diverters in accordance with output data provided by said first and second identification systems;
wherein the sorting logic processor is configured to respond to conflicting information provided by the first and second identification systems, by giving precedence to the first information in a first circumstance, and by giving precedence to the second information in a second circumstance.

2. The apparatus of claim 1 in which the second identification system is a neural network classifier configured to determine capping status of a bottle on the conveyor, that is to classify a bottle as being capped or as being uncapped, wherein the sorting logic processor is configured to control the one or more diverters in accordance with output data including said capping status determined by said neural network classifier.

3. The apparatus of claim 1 in which the second identification system is a neural network classifier configured to determine contamination status of a container on the conveyor, that is to classify a container as clean or not clean, wherein the sorting logic processor is configured to control the one or more diverters in accordance with output data including said contamination status determined by said neural network classifier.

4. The apparatus of claim 1 in which the second identification system is a neural network classifier configured to determine state information about a container on the conveyor, wherein the sorting logic processor is configured to control the one or more diverters in accordance with output data including said state information determined by said neural network classifier.

5. The apparatus of claim 1 in which the second identification system provides a confidence metric for the second information, wherein the sorting logic processor is configured to respond to conflicting information provided by the first and second identification systems by giving precedence to the first information when the confidence metric has a first state, and by giving precedence to the second information when the confidence metric has a second state.

6. The apparatus of claim 1 in which the sorting logic processor is configured to give precedence to the first information when the first information indicates the item is a sleeved container comprising a first substrate material wrapped by a second, different, sleeve material.

7. A waste sorting apparatus comprising:
    a near infrared imaging system including one or more processors configured to discern a spectral signature produced by a plastic container, and to identify a plastic resin of the container based on said spectral signature;
    a watermark imaging system including one or more processors configured to extract an encoded watermark payload formed in a surface of said plastic container, or printed on a label of said plastic container, and to determine information from said watermark payload; and
    a processing system configured to make a sorting decision for said plastic container based on the plastic resin identified by the near infrared imaging system, and based on the information determined from the watermark payload;
    wherein the processing system is further configured to resolve a conflict between the plastic resin identified by the near infrared imaging system, and a plastic resin determined from said watermark payload.

8. An apparatus for sorting plastic items in a waste stream, comprising:
    a crusher that serves to reduce height variations of plastic surfaces in the waste stream;
    an artificial intelligence system that processes data, including image data, to make a judgment about a plastic item in the waste stream;
    a watermark system including a camera and one or more processors configured to extract an encoded watermark payload formed as a texture in a surface of said item and to determine information from said watermark payload; and
    a diverter that sorts said item from the waste stream based on the judgment made by the artificial intelligence system and based on the information determined from said watermark payload.

9. The waste sorting apparatus of claim 8 in which the artificial intelligence system comprises a convolutional neural network that processes said image data.

10. The waste sorting apparatus of claim 8 in which said diverter comprises a robotic arm.

* * * * *